United States Patent
Huang et al.

(10) Patent No.: US 10,942,529 B2
(45) Date of Patent: Mar. 9, 2021

(54) AIRCRAFT INFORMATION ACQUISITION METHOD, APPARATUS AND DEVICE

(71) Applicant: Tencent Technology (Shenzhen) Company Limited, Shenzhen (CN)

(72) Inventors: Ying Huang, Shenzhen (CN); Dajun Zhou, Shenzhen (CN)

(73) Assignee: TENCENT TECHNOLOGY (SHENZHEN) COMPANY LIMITED, Shenzhen (CN)

(*) Notice: Subject to any disclaimer, the term of this patent is extended or adjusted under 35 U.S.C. 154(b) by 147 days.

(21) Appl. No.: 16/296,073

(22) Filed: Mar. 7, 2019

(65) Prior Publication Data
US 2019/0206073 A1    Jul. 4, 2019

Related U.S. Application Data

(63) Continuation of application No. PCT/CN2017/111577, filed on Nov. 17, 2017.

(30) Foreign Application Priority Data

Nov. 24, 2016  (CN) .......................... 201611045197.6
Dec. 1, 2016   (CN) .......................... 201611100232.X
Dec. 1, 2016   (CN) .......................... 201611100259.9

(51) Int. Cl.
*G05D 1/10*      (2006.01)
*G06T 7/593*     (2017.01)
(Continued)

(52) U.S. Cl.
CPC ............. *G05D 1/106* (2019.05); *G01C 11/02* (2013.01); *G06K 9/0063* (2013.01);
(Continued)

(58) Field of Classification Search
None
See application file for complete search history.

(56) References Cited

U.S. PATENT DOCUMENTS 6,405,975 B1 *  6/2002  Sankrithi ............... B64D 47/08
                                                    244/1 R
9,047,771 B1 *  6/2015  Thoreen ................. G08G 5/045
(Continued)

FOREIGN PATENT DOCUMENTS

CN    101251379 A    8/2008
CN    101419055 A    4/2009
(Continued)

OTHER PUBLICATIONS

Y. Deng, N. Xian and H. Duan, "A binocular vision-based measuring system for UAVs autonomous aerial refueling," 2016 12th IEEE International Conference on Control and Automation (ICCA), Kathmandu, 2016, pp. 221-226, doi: 10.1109/ICCA.2016.7505279 (Year: 2017).*

(Continued)

*Primary Examiner* — Andrae S Allison
(74) *Attorney, Agent, or Firm* — Morgan, Lewis & Bockius LLP

(57) ABSTRACT

The present disclosure discloses an aircraft (e.g., unmanned aerial obstacle detection method and apparatus, to reduce aircraft obstacle detection errors, and improve aircraft obstacle detection precision. The apparatus performs image collection on a target obstacle by using a binocular camera, to obtain a first image and a second image. After determining a first pixel location obtained by projecting the target obstacle in the first image, and a second pixel location obtained by projecting the target obstacle in the second image, the apparatus calculates a disparity between the first pixel location and the second pixel location and a depth value between the binocular camera and the target obstacle (Continued)

— 101A
An aircraft performs real-time image collection on a target obstacle by using a binocular camera equipped on the aircraft, to obtain a first image and a second image — 102A
The aircraft determines a first pixel location obtained by projecting the target obstacle in the first image, and a second pixel location obtained by projecting the target obstacle in the second image, and calculates a disparity between the first pixel location and the second pixel location according to the first pixel location and the second pixel location — 103A
Calculate a depth value between the binocular camera and the target obstacle according to the disparity between the first pixel location and the second pixel location, and a preset disparity depth mapping matrix, to detect whether a flight direction of the aircraft is blocked by an obstacle according to the disparity and a preset disparity-to-depth mapping matrix, to detect whether a flight direction of the aircraft is blocked by an obstacle.

17 Claims, 22 Drawing Sheets

(51) Int. Cl.
    *G08G 5/04* (2006.01)
    *H04N 13/239* (2018.01)
    *G06K 9/00* (2006.01)
    *G06T 3/40* (2006.01)
    *G06T 7/80* (2017.01)
    *G06K 9/32* (2006.01)
    *G01C 11/02* (2006.01)

(52) U.S. Cl.
    CPC .............. *G06K 9/3241* (2013.01); *G06T 3/40* (2013.01); *G06T 7/593* (2017.01); *G06T 7/85* (2017.01); *G08G 5/045* (2013.01); *H04N 13/239* (2018.05); *G06T 2207/10028* (2013.01); *G06T 2207/10032* (2013.01); *G06T 2207/20021* (2013.01)

(56) References Cited

U.S. PATENT DOCUMENTS

| | | | |
|---|---|---|---|
| 9,583,012 B1* | 2/2017 | Loftis | G06K 9/3241 |
| 9,870,617 B2* | 1/2018 | Piekniewski | G06K 9/3241 |
| 2014/0142838 A1* | 5/2014 | Durand | G08G 5/045 |
| | | | 701/301 |
| 2016/0277650 A1* | 9/2016 | Nagaraja | G06T 7/33 |
| 2017/0031369 A1* | 2/2017 | Liu | B64D 47/08 |
| 2017/0076616 A1* | 3/2017 | Kanade | G08G 5/045 |
| 2017/0193830 A1* | 7/2017 | Fragoso | G05D 1/102 |
| 2017/0314930 A1* | 11/2017 | Monterroza | G06N 3/0454 |
| 2018/0032040 A1* | 2/2018 | Sweet, III | H04N 7/181 |
| 2018/0053427 A1* | 2/2018 | Cherepinsky | G05D 1/0669 |

FOREIGN PATENT DOCUMENTS

| | | | |
|---|---|---|---|
| CN | 101504287 A | | 8/2009 |
| CN | 101527046 A | | 9/2009 |
| CN | 102313536 A | | 1/2012 |
| CN | 102435174 A | | 5/2012 |
| CN | 102779347 A | | 11/2012 |
| CN | 102939763 A | | 2/2013 |
| CN | 103679707 A | | 3/2014 |
| CN | 105222760 A | * | 1/2016 |
| CN | 105787447 A | | 7/2016 |
| CN | 105807786 A | | 7/2016 |
| CN | 105913474 A | | 8/2016 |
| CN | 105974938 A | | 9/2016 |
| CN | 106020232 A | | 10/2016 |
| CN | 106127788 A | | 11/2016 |
| CN | 106529495 A | | 3/2017 |
| CN | 106767682 A | | 5/2017 |
| CN | 106767817 A | | 5/2017 |
| EP | 2 235 711 | * | 12/2011 |
| JP | 5145585 | * | 2/2013 |
| WO | WO 2007047953 A2 | | 4/2007 |

OTHER PUBLICATIONS

Duan et al, "A binocular vision-based UAVs autonomous aerial refueling platform", May 2016, vol. 59 053201:1-053201: (Year: 2016).*

China Press, Binocular vision-based UAVs autonomous aerial refueling platform—pilots are no longer needed, May 16, 2016, https://phys.org/news/2016-05-binocular-vision-based-uavs-autonomous-aerial.html (Year: 2016).*

Z. Chen, X. Luo and B. Dai, "Design of Obstacle Avoidance System for Micro-UAV Based on Binocular Vision," 2017 International Conference on Industrial Informatics—Computing Technology, Intelligent Technology, Industrial Information Integration (ICIICII), Wuhan, 2017, pp. 67-70 (Year: 2017).*

Andert, Franz, Gordon Strickert, and Frank Thielecke. "Depth image processing for obstacle avoidance of an autonomous vtol uav." Deutscher Luft-und Raumfahrtkongress. 2006. (Year: 2006).*

Tenent Technology, ISR, PCT/CN2017/111577, Feb. 14, 2018, 6 pgs.

Tencent Technology, Written Opinion, PCT/CN2017/111577, dated Feb. 14, 2018, 6 pgs.

Tencent Technology, IPRP, PCT/CN2017/111577, May 28, 2019, 7 pgs.

* cited by examiner

AIRCRAFT INFORMATION ACQUISITION METHOD, APPARATUS AND DEVICE

CROSS-REFERENCE TO RELATED APPLICATIONS

This application is a continuation application of PCT/CN2017/111577, entitled "AIRCRAFT INFORMATION ACQUISITION METHOD, APPARATUS AND DEVICE" filed on Nov. 17, 2017, which claims priority to (i) Chinese Patent Application No. 201611045197.6, entitled "AIRCRAFT OBSTACLE DETECTION METHOD AND APPARATUS" filed with the Chinese Patent office on Nov. 24, 2016, (ii) Chinese Patent Application No. 201611100259.9, entitled "FLIGHT POSITIONING INFORMATION OBTAINING METHOD AND AIRCRAFT" filed with the Chinese Patent office on Dec. 1, 2016, and (iii) Chinese Patent Application No. 201611100232.X, entitled "FLIGHT HEIGHT INFORMATION OBTAINING METHOD AND AIRCRAFT" filed with the Chinese Patent office on Dec. 1, 2016, all of which are incorporated by reference in their entireties.

FIELD OF THE TECHNOLOGY

The present disclosure relates to the field of computer technologies, and in particular, to aircraft obstacle detection and obtaining of flight positioning information and height information.

BACKGROUND OF THE DISCLOSURE

An unmanned aerial vehicle is briefly referred to as an aircraft. Aircrafts are widely applied to national economy and military. Currently, aircrafts are already widely applied to fields such as aerial photography, power patrol and inspection, environment monitoring, forest fire prevention, disaster patrol and inspection, anti-terrorism and lifesaving, military reconnaissance, and battlefield assessment. An aircraft is an unmanned aerial vehicle manipulated by using a radio remote control device and a program control apparatus equipped on the unmanned aerial vehicle. The vehicle has no cockpit, but is equipped with devices such as an autopilot, a program control apparatus, and an information collection apparatus. A person in a remote control station tracks, positions, remotely controls, remotely measures, and performs digital transmission with the vehicle by using a device such as a radar.

The aircraft usually performs obstacle detection by using the following two solutions: 1. The aircraft performs obstacle detection based on a laser radar. 2. The aircraft performs obstacle detection based on an ultrasonic wave. In the method 1, the aircraft needs to be equipped with a laser radar, obstacle detection by the laser radar is vulnerable to solar light, and the laser radar cannot accurately perform obstacle detection under strong light, thereby reducing obstacle detection precision. In the method 2, the aircraft needs to be equipped with an ultrasonic generator, and obstacle detection is performed by using an ultrasonic wave transmitted by the ultrasonic generator. This ultrasonic wave detection manner has a very large error in detection of a non-perpendicular plane or a deformed object.

In conclusion, in the foregoing solutions, the aircraft needs to be equipped with an additional device configured to perform obstacle detection. This does not facilitate aircraft miniaturization development, and further has a problem of low obstacle detection precision.

SUMMARY

In view of this, embodiments of the present disclosure provide the following technical solutions:

A first aspect of the present disclosure provides an aircraft obstacle detection method performed at a computing device having one or more processors and memory storing programs to be executed by the one or more processors, the method comprising:

performing real-time image collection on a target obstacle by using a binocular camera equipped on an aircraft, to obtain a first image and a second image, where the first image is shot by a left eye of the binocular camera, and the second image is shot by a right eye of the binocular camera;

determining a first pixel location obtained by projecting the target obstacle in the first image, and a second pixel location obtained by projecting the target obstacle in the second image, and calculating a disparity between the first pixel location and the second pixel location according to the first pixel location and the second pixel location; and calculating a depth value between the binocular camera and the target obstacle according to the disparity between the first pixel location and the second pixel location, and a preset disparity-to-depth mapping matrix, to detect whether a flight direction of the aircraft is blocked by an obstacle.

In the foregoing process, the binocular camera built in the aircraft implements real-time detection on a front obstacle, no additional device needs to be added to the aircraft, neither of a flight scenario of the aircraft and a shape of the obstacle needs to be limited, and the depth value between the binocular camera and the target obstacle can be accurately calculated by image analysis and calculation, to reduce aircraft obstacle detection errors, and improve aircraft obstacle detection precision.

A second aspect of the present disclosure provides a computing device having one or more processors, memory coupled to the one or more processors, and a plurality of programs stored in the memory that, when executed by the one or more processors, cause the computing device to perform the aforementioned aircraft obstacle detection method.

A third aspect of the present disclosure provides a non-transitory computer readable storage medium storing a plurality of instructions in connection with a computing device having one or more processors for aircraft obstacle detection. The plurality of instructions, when executed by the one or more processors, cause the computing device to perform the aforementioned aircraft obstacle detection method.

BRIEF DESCRIPTION OF THE DRAWINGS

To describe the technical solutions in the embodiments of the present disclosure more clearly, the following briefly introduces the accompanying drawings required for describing the embodiments. Apparently, the accompanying drawings in the following description show merely some embodiments of the present disclosure, and a person skilled in the art may still derive other drawings from these accompanying drawings.

DESCRIPTION OF EMBODIMENTS

To make invention objectives, features, and advantages of the present disclosure more obvious and comprehensible, the technical solutions in the embodiments of the present disclosure are clearly and completely described in the following with reference to the accompanying drawings in the embodiments of the present disclosure. It is obvious that the embodiments described below are only a part rather than all of the embodiments of the present disclosure. All other embodiments obtained by a person skilled in the art based on the embodiments of the present disclosure shall fall within the protection scope of the present disclosure.

Terms "include", "comprise", and any variation thereof in the specification, claims, and the accompanying drawings of the present disclosure are intended to cover non-exclusive inclusion, so that processes, methods, systems, products, or devices including a series of units are not limited to the units, and may include other units not clearly listed or intrinsic to the processes, methods, products, or devices.

Details descriptions are separately provided below.

An embodiment of the aircraft obstacle detection method provided in the present disclosure may specifically be applied to a target obstacle avoiding scenario in an aircraft flight process.

An unmanned aerial vehicle (UAV) is an aircraft performing a particular aviation task by using wireless remote control or program control, and refers to a powered aerial aircraft without an operation person. A required lifting force is provided to the aircraft by using air power, and the aircraft can automatically fly or provide remote guidance, can be not only used one-off but also recycled, and can carry deadly and non-deadly effective load.

Figure 1:
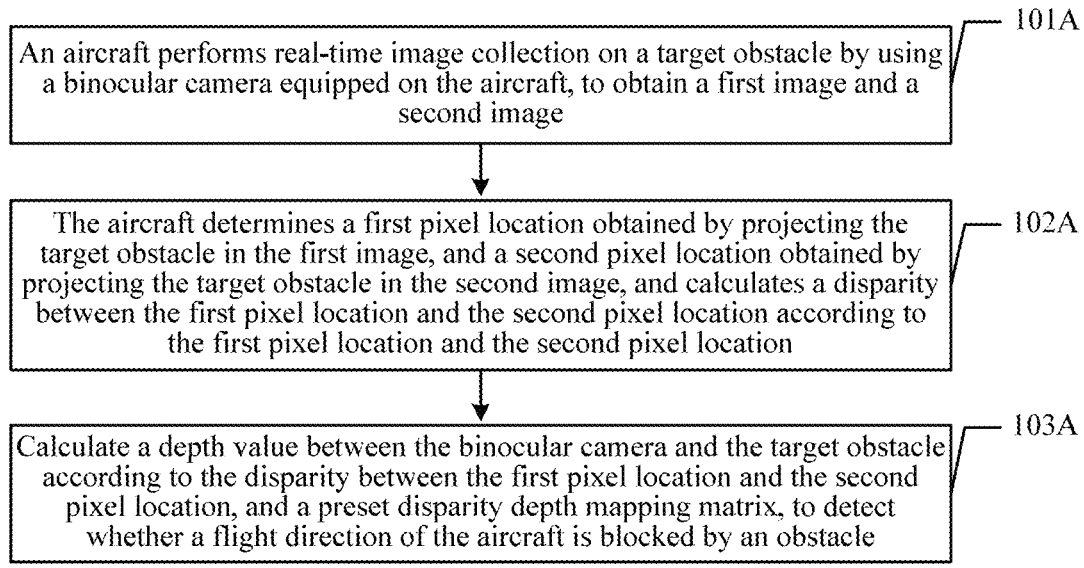
FIG. 1 is a schematic flowchart of an aircraft obstacle detection method according to an embodiment of the present disclosure.

It should be noted that the aircraft specifically may be an unmanned aerial vehicle, or may be a remotely controlled plane, a model plane, or the like. In this embodiment, a binocular camera equipped on an aircraft shoots images of a target obstacle, a disparity and a depth value of images shot by the left and right eyes are calculated, a depth value between the obstacle and the aircraft can be determined, the obstacle can be detected by image analysis and calculation, and no additional device needs to be built in the aircraft, thereby facilitating miniaturization development of the aircraft. Referring to FIG. 1, FIG. 1 shows an aircraft obstacle detection method according to an embodiment. The method may include the following steps:

101A: An aircraft performs real-time image collection on a target obstacle by using a binocular camera equipped on the aircraft, to obtain a first image and a second image.

The first image is shot by the left eye of the binocular camera, and the second image is shot by the right eye of the binocular camera.

In this embodiment, the aircraft may perform real-time detection on the target obstacle appearing ahead, and the aircraft is equipped with the binocular camera. The left and right eyes (that is, two cameras) of the binocular camera shoot the target obstacle in real time, and generate images shot at different moments. In this embodiment, the aircraft may shoot the target obstacle by using the existing binocular camera of the aircraft. The binocular camera equipped on the aircraft may inactively receive visible light, and therefore is not interfered by strong light. In a complex scenario, object depth information can be estimated very desirably, and defects of a laser radar and an ultrasonic wave are overcome desirably. Besides, because the binocular camera used in this embodiment is an ordinary camera, hardware costs thereof are much lower than that of a laser radar.

Each pair of cameras in this embodiment collect the same target obstacle at the same moment, to obtain two images. To distinguish the two images, an image shot by the left eye of the binocular camera is defined as "the first image", and an image shot by the right eye of the binocular camera is defined as "the second image". The first image and the second image are used only to distinguish the images separately shot by the two cameras.

102A: The aircraft determines a first pixel location obtained by projecting the target obstacle in the first image, and a second pixel location obtained by projecting the target obstacle in the second image, and calculates a disparity between the first pixel location and the second pixel location according to the first pixel location and the second pixel location.

In this embodiment, the first image and the second image are two images obtained by the binocular camera by shooting the same target obstacle at the same moment, and the same target obstacle has slightly different locations when being projected to the left and right cameras of the binocular camera. To distinguish the two projected locations, a projected location of the target obstacle in the first image is defined as a "first pixel image location", and a projected location of the target obstacle in the second image is defined as a "second pixel image location". There is a pixel location when the same target obstacle is projected to a camera, pixel locations of the left and right cameras have an offset, and the offset is the disparity between the first pixel location and the second pixel location.

In this embodiment, a disparity between two pixel locations can be calculated by using binocular stereoscopic vision. Based on a disparity principle, the camera may be used to obtain two images of the detected target obstacle at different locations, and a location offset between corresponding points of the images is calculated to obtain three-dimensional geometric information of the object. The images obtained by the two cameras are blended and a difference between the images is observed by using binocular stereoscopic vision. In this way, an obvious sense of depth can be obtained. A correspondence between features is established, a correspondence between image points of a same spatial physical point in different images is established, and the difference may also be referred to as a disparity image.

In some possible implementations, 102A of determining a first pixel location obtained by projecting the target obstacle in the first image, and a second pixel location obtained by projecting the target obstacle in the second image includes:

A1: Determine an image selection window according to an aircraft body size image formed by the aircraft in the binocular camera, where a total pixel value of the image selection window is greater than a total pixel value of the aircraft body size image, and is less than a total pixel value of the first image and less than a total pixel value of the second image.

A2: Select a first sub-image and a second sub-image corresponding to the image selection window separately from the first image and the second image by using the image selection window.

A3: Perform, by using a semi-global block matching SGBM algorithm, image point matching on the target obstacle shot in the first sub-image and the second sub-image separately, and determine, by using a successfully matched image point, a first pixel location obtained by projecting the target obstacle in the first sub-image, and a second pixel location obtained by projecting the target obstacle in the second sub-image.

To improve an image processing speed and satisfy a real-time calculation requirement of the aircraft, the image selection window may be determined according to the aircraft body size image formed by the aircraft in the binocular camera. An obstacle outside a flight track does not affect flight of the aircraft, and real-time detection only on an obstacle directly in front of a flight direction of the aircraft needs to be ensured. Therefore, in this embodiment of the present disclosure, the image selection window may be determined in advance according to the aircraft body size of the aircraft. The image selection window is used to tailor the first image and the second image and select the first sub-image and the second sub-image corresponding to the image selection window. The first sub-image is image content that is in the first image and that has the same size as that of the image selection window, and the second sub-image is image content that is in the second image and that has the same size as that of the image selection window. The size of the image selection window only needs to be greater than the actual size of the aircraft, to ensure that the aircraft does not encounter an obstacle when no obstacle is detected. In step A3, only a disparity within the image selection window needs to be calculated, and a disparity outside the image selection window does not need to be calculated, to greatly reduce overheads of image processing resources.

In this embodiment, in step A3, image point matching may be performed, by using the SGBM algorithm, on the target obstacle separately shot in the first sub-image and the second sub-image. The SGBM algorithm may complete image point matching in the two images based on Open CV. In combination with window selection of the original image in step A1 and step A2, only the disparity within the image selection window needs to be calculated in the SGBM algorithm. It should be noted that in some other possible implementations, other three-dimensional matching algorithms may also be used, for example, a BM algorithm and a GC algorithm in OpenCV2.1. This is not limited herein.

In some possible implementations, after step 101A of performing real-time image collection on a target obstacle by using a binocular camera equipped on the aircraft, to obtain a first image and a second image, the aircraft obstacle detection method provided in this embodiment further includes:

B1: Perform scaling processing and tailoring processing on the first image and the second image separately.

B2: Convert the processed first image and the processed second image to a first greyscale image and a second greyscale image separately, and perform equalization processing on the first greyscale image and the second greyscale image separately.

In an implementation scenario of performing step B1 and step B2, 102 of determining a first pixel location obtained by projecting the target obstacle in the first image, and a second pixel location obtained by projecting the target obstacle in the second image includes:

B3: Determine the projected first pixel location of the target obstacle in the first greyscale image on which equalization processing has been performed, and determine the projected second image location of the target obstacle in the second greyscale image on which equalization processing has been performed.

If there is interference for the image of the target object collected by the binocular camera, the image may be further preprocessed, for example, scaling processing, tailoring processing, and grayscale histogram equalization processing may be performed.

When scaling processing is performed on the images, the images of the target object collected by camera may be separately scaled to a proper proportion for recognition of the target obstacle, for example, the images may be scaled up or scaled down. When tailoring processing is performed on the images, multiple pixels on the edges of the left and right images may be cut out to reduce a computing amount of visual processing. In some implementations, if pixels of an image occupy many grayscales and are evenly distributed, the image usually has a high contrast and diverse greyscale tones. Therefore, equalization processing or histogram equalization may be performed on the greyscale image. In an example, a conversion function that can automatically achieve this processing effect only by inputting image histogram information may be used for implementation. A basic idea is to expand grayscales having many pixels in the images and contract greyscales having few pixels in the images, to extend a dynamic pixel value range, increase changes of contrasts and greyscale tones, and make the images clearer. In the foregoing image preprocessing, illumination of the images may be further equalized, and an image size is suitable for processing on a mobile device.

In this embodiment, in an implementation scenario of performing step B1 and step B2, for the images of the target obstacle collected by the target cameras of the aircraft in real time, if equalization processing is first performed on the greyscale images obtained by converting the images, an image required in disparity calculation is the greyscale image on which equalization processing has been performed. The first pixel location and the second pixel location may be obtained by detecting the target obstacle projected to the greyscale images collected by the left and right cameras.

In some possible implementations, after step 101 of performing real-time image collection on a target obstacle by using a binocular camera equipped on the aircraft, to obtain a first image and a second image, the aircraft obstacle detection method provided in this embodiment of the present disclosure further includes:

C1: Obtain intrinsic parameter information and extrinsic parameter information of the binocular camera, where the intrinsic parameter information includes: a radial distortion parameter and a tangential distortion parameter of the left eye, and a radial distortion parameter and a tangential distortion parameter of the right eye, and the extrinsic parameter information includes: a rotation matrix and an offset matrix of the left eye and the right eye of the binocular camera.

C2: Perform distortion compensation on the first image and the second image separately according to the intrinsic parameter information, to obtain the first image on which distortion compensation has been performed and the second image on which distortion compensation has been performed.

C3: Perform, in a same horizontal plane according to the extrinsic parameter information, image correction processing on the first image on which distortion compensation has been performed and the second image on which distortion compensation has been performed.

To improve image calculation accuracy, if the binocular camera is not calibrated in advance, the images collected by the binocular camera may be further corrected, including image distortion correction and image alignment. For example, after the images are tailored, distortion correction and alignment may be performed on the images by using a remap function of Open CV and according to the intrinsic parameter and the extrinsic parameter previously obtained by calibrating the camera. The images of the left and right eyes after the remap function satisfy that the images are on a same horizontal line in mathematical meanings. The extrinsic parameter information of the binocular camera includes a rotation matrix and an offset matrix. By correcting the first image and the second image by using the rotation matrix and the offset matrix, alignment correction may be performed on the first image and the second image, so that the first image and the second image satisfy that the first image and the second image are images on the same horizontal line.

103A: Calculate a depth value between the binocular camera and the target obstacle according to the disparity between the first pixel location and the second pixel location, and a preset disparity-to-depth mapping matrix, to detect whether a flight direction of the aircraft is blocked by an obstacle.

In this embodiment, after the disparity between the first pixel location and the second pixel location is calculated, a camera parameter of the binocular camera may be calculated to determine the disparity-to-depth mapping matrix of the left and right cameras in advance, and then, the depth value between the binocular camera and the target obstacle may be calculated according to an inverse proportion relationship between the disparity and the depth value. The depth value of the target obstacle refers to a perpendicular distance between a plane in which the target obstacle is located and the binocular camera. The calculated depth value may be used to determine a distance between the aircraft and an obstacle in the flight direction of the aircraft.

In some possible implementations, after step 103A of calculating a depth value between the binocular camera and the target obstacle according to the disparity between the first pixel location and the second pixel location, and a preset disparity-to-depth mapping matrix, this embodiment further may include:

D1: Send the depth value between the binocular camera and the target obstacle to a flight control module of the aircraft, so that the flight control module determines, according to the depth value between the binocular camera and the target obstacle, whether the flight direction of the aircraft is blocked by an obstacle.

After the depth value between the binocular camera and the target obstacle is calculated in step 103A, the flight control module may determine, according to the depth value, whether an obstacle blocks in the flight direction of the aircraft, and when the obstacle blocks in the flight direction of the aircraft, determine a distance between the aircraft and the target obstacle.

In an exemplary implementation, in an implementation scenario of performing step A1 to step A3, step 103A of calculating a depth value between the binocular camera and the target obstacle according to the disparity between the first pixel location and the second pixel location, and a preset disparity-to-depth mapping matrix may include the following steps:

E1: Separately calculate depth values of all pixels corresponding to the image selection window according to a disparity between the first pixel location and the second pixel location, and the preset disparity-to-depth mapping matrix.

E2: Divide the image selection window into multiple image sub-windows, and separately calculate a depth value of each image sub-window according to the depth values of all the pixels corresponding to the image selection window.

E3: Select an image sub-window with a minimum depth value according to the depth value of each image sub-window, and determine the depth value of the image sub-window with the minimum depth value as the depth value between the binocular camera and the target obstacle.

In an implementation scenario of performing step A1 to step A3, the image selection window is determined according to the aircraft body size image formed by the aircraft in the binocular camera, and the first image and the second image are separately divided by using the image selection window to obtain the first sub-image and the second sub-image. Therefore, in step E1, only the depth value of each pixel of the first sub-image and the second sub-image needs to be calculated, and depth values of pixels outside the image selection window in the first image and the second image do not need to be calculated, to greatly reduce computing resource overheads required to calculate the depth values, for example, reduce computing load of a central processing unit (CPU).

When a depth value of a pixel in the image selection window is calculated in step E1, matrix multiplication may be performed by using a disparity and a disparity-to-depth mapping matrix (Disparity-to-Depth Mapping Matrix) to obtain an actual three-dimensional point location. In an example, a stereorectify function provided by OpenCV may be used to obtain the mapping matrix and the depth value of the pixel. After depth values of all pixels corresponding to the image selection window are calculated, the image selection window is divided into multiple image sub-windows, for example, equally divided into 4×4 sub-windows.

When the depth value of each image sub-window is calculated in step E2, the minimum depth value may be selected from depth values of all pixels of the image sub-window to serve as the depth value of image sub-window. It indicates a distance between the aircraft and a nearest obstacle in the sub-window.

In some possible implementations, after step E3 of determining the depth value of the image sub-window with the minimum depth value as the depth value between the binocular camera and the target obstacle, this embodiment further may include:

E4: Send the depth value of each image sub-window to the flight control module of the aircraft, so that the flight control module selects an obstacle avoiding direction according to the depth value of each image sub-window and then adjusts a flight posture of the aircraft.

In an implementation scenario of performing step E1 to step E3, depth values of the multiple image sub-windows obtained by dividing the image selection window are all calculated, the depth values of all the image sub-windows may be sent to the flight control module, and the flight control module selects an obstacle avoiding direction according to the depth value of each image sub-window and then adjusts a flight posture of the aircraft. The flight posture of the aircraft may refer to an orientation, a height, and a location of the aircraft. In an implementation process in which the aircraft flies while avoiding an obstacle, the aircraft is mainly controlled to be properly away from the target obstacle in location movement. For example, adjusting the flight posture may be only controlling the aircraft to fly forward, or may be controlling the aircraft to perform a flight action such as rolling.

As can be known from descriptions of the foregoing embodiments, the binocular camera equipped on the aircraft first perform real-time image collection on the target obstacle to obtain the first image and the second image, where the first image is shot by a left eye of the binocular camera, and the second image is shot by a right eye of the binocular camera, a first pixel location obtained by projecting the target obstacle in the first image, and a second pixel location obtained by projecting the target obstacle in the second image are then determined, a disparity between the first pixel location and the second pixel location is calculated according to the first pixel location and the second pixel location, and finally the depth value between the binocular camera and the target obstacle is calculated according to the disparity between the first pixel location and the second pixel location, and the preset disparity-to-depth mapping matrix. In the foregoing process, the binocular camera built in the aircraft implements real-time detection on a front obstacle, no additional device needs to be added to the aircraft, neither of a flight scenario of the aircraft and a shape of the obstacle needs to be limited, and the depth value between the binocular camera and the target obstacle can be accurately calculated by image analysis and calculation, to reduce aircraft obstacle detection errors, and improve aircraft obstacle detection precision.

For ease of better understanding and implementing the technical solution in this embodiment of the present disclosure, an application scenario is used as an example below for specific description.

Figure 2:
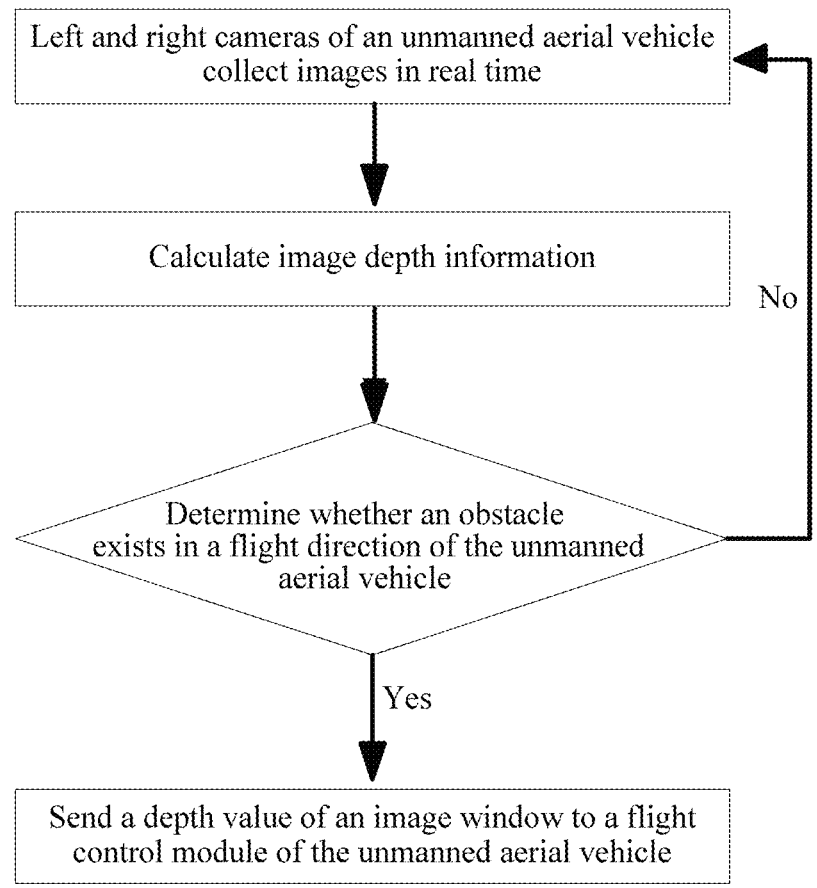
FIG. 2 is a schematic flowchart of entire working of binocular stereoscopic vision obstacle detection according to an embodiment of the present disclosure.

An example in which the aircraft is specifically an unmanned aerial vehicle is used to describe the obstacle detection method in this embodiment. Referring to FIG. 2, FIG. 2 is a schematic flowchart of entire working of binocular stereoscopic vision obstacle detection according to an embodiment of the present disclosure.

It should be noted that after the binocular camera is installed on the unmanned aerial vehicle, the camera may be calibrated. A single camera needs to be calibrated to obtain radial distortion (for example, barrel distortion) and tangential distortion parameters of the camera that are referred to as intrinsic parameters (essential parameters). Obstacle avoiding of binocular stereoscopic vision requires that cameras of left and right eyes are installed on the same horizontal line, and an interval is around 6 cm to 10 cm. When the interval is less than 6 cm, an image disparity is excessively small, and a proper depth value cannot be obtained. When the interval is excessively large, a nearby object cannot be matched. Because an installed camera cannot mathematically implement a precisely same horizontal line, stereo calibration needs to be performed on the camera. In an example, a Zhengyou Zhang calibration method may be used in stereo calibration, to obtain a rotation matrix and an offset matrix of two lenses. This group of values become extrinsic parameters (extrinsic parameters) of the camera. After the images are collected, distortion compensation is performed on the images by using the intrinsic parameter, and then, the images are rotated and translated by using the extrinsic parameter, so that the images are on the same horizontal line required mathematically.

The following describes a working procedure of binocular stereoscopic vision obstacle detection.

The unmanned aerial vehicle collects real-time images of the left and right eyes by using the binocular camera equipped on the unmanned aerial vehicle. A corresponding depth value is generated for the real-time images of the left and right eyes by using an image depth calculation module. The unmanned aerial vehicle determines, according to the depth value, whether an obstacle blocks in the flight direction of the unmanned aerial vehicle. If an obstacle blocks, a depth value from the current obstacle is sent to the flight control module of the unmanned aerial vehicle. In this embodiment, the calculated depth value of the obstacle refers to a perpendicular distance between a plane in which the obstacle is located and the binocular camera.

Figure 3:
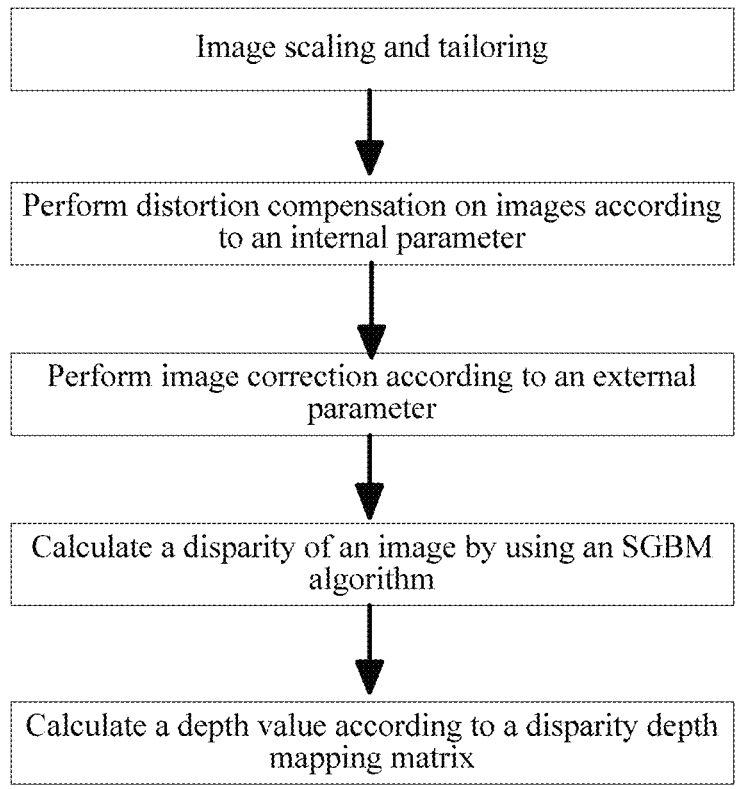
FIG. 3 is a schematic flowchart of image processing of binocular stereoscopic vision obstacle detection according to an embodiment of the present disclosure.

Referring to FIG. 3, FIG. 3 is a schematic flowchart of image processing of binocular stereoscopic vision obstacle detection according to an embodiment of the present disclosure. A stereoscopic vision module in the unmanned aerial vehicle may be responsible for calculating scenario depth information, and a working procedure thereof is image scaling and tailoring, image distortion compensation, image alignment, disparity calculation, and depth value calculation. The following respectively describes the processes by using an example.

Image scaling and tailoring is first described. When the unmanned aerial vehicle performs obstacle detection by using binocular vision, no highly precise image is required. Therefore, the images collected by the binocular camera may be scaled to a 320×240 format. Because the left and right eyes have a disparity, it is difficult to match the edges of the left and right images. Around 20 pixels on the edges of the left and right images may be cut off in processing, to reduce a calculation amount of vision processing.

Then, image correction is performed. Image correction includes image distortion correction and image alignment. After the images are tailored, a remap function of openCV may be used to perform distortion correction and alignment on the images according to the intrinsic parameter and the extrinsic parameter previously obtained by calibrating the camera. The images of the left and right eyes after the remap function are images on the same horizontal line in mathematical meanings. In one aspect, distortion correction is performed on a single image. In another aspect, the two images are translated and rotated so that the two images are on the same horizontal plane in mathematical meanings.

The following describes a disparity calculation process. In depth value calculation of binocular vision, a disparity between corresponding points of the left and right images needs to be first obtained. When a same object is projected to the left and right cameras in the real world, pixel locations thereof are slightly different. When a same point in actual space is projected to a camera, there is a pixel location, pixel locations of the left and right cameras have an offset value, and the value is a disparity.

Figure 4:
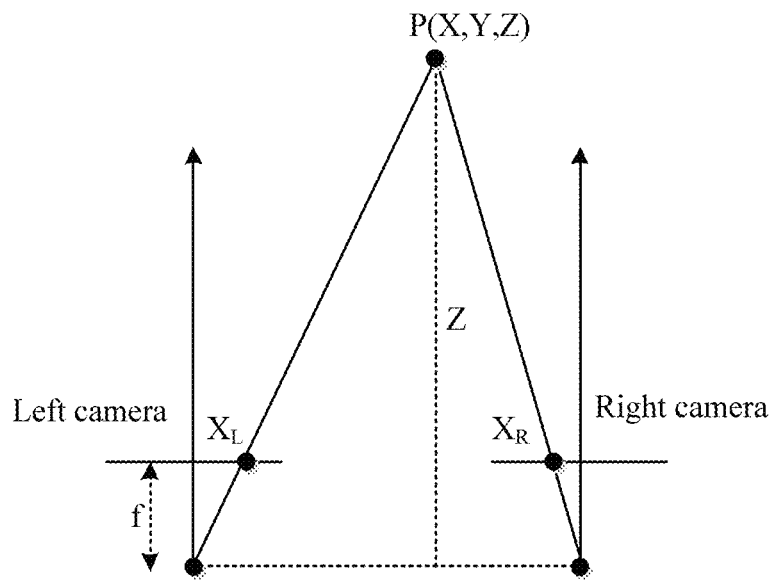
FIG. 4 is a schematic flowchart of disparity calculation of binocular stereoscopic vision obstacle detection according to an embodiment of the present disclosure.

Referring to FIG. 4, FIG. 4 is a schematic flowchart of disparity calculation of binocular stereoscopic vision obstacle detection according to an embodiment of the present disclosure. Projections of a physical point P in the left and right cameras are respectively points XL and XR. Because the binocular vision requires a same horizontal line, Y values thereof are all the same. A disparity (disparity) is XL−XR. In FIG. 4, f indicates a focal point location of left and right cameras, Tx indicates a displacement between the two cameras, and Z is a depth value of the point P. In this embodiment, an SGBM algorithm provided by OpenCV is used as an example to describe image point matching and disparity calculation.

To reduce a computing amount of the SGBM algorithm, improve a processing speed, and ensure real-time quality of image processing and calculation on a built-in device, in this embodiment, SGBM is not performed on the entire image. According to a motion feature of the unmanned aerial vehicle, because an obstacle outside a flight track does not affect flight of the unmanned aerial vehicle, obstacle detection may be performed only directly in front of the flight track of the unmanned aerial vehicle. In an example, a three-dimensional projection calculation method may be used. The image selection window may be obtained. The size of the image selection window needs to be greater than only the actual size of the unmanned aerial vehicle, to ensure that the unmanned aerial vehicle does not encounter an obstacle when no obstacle is detected. Only a disparity inside the window needs to be calculated, and a disparity outside the window does not need to be calculated, to greatly reduce CPU overheads.

The depth value is to obtain an actual three-dimensional point location by performing matrix multiplication by using a disparity and a disparity-to-depth mapping matrix, and a calculation formula thereof is as follows:

$$[X\ Y\ Z\ W]^T = Q*[xy\text{disparity}(x,y)1]^T.$$

x and y are projection coordinates of an actual point in three-dimensional space in the image, and a unit is pixel. Disparity (x,y) indicates a disparity at a pixel (x,y), and the matrix Q is the disparity-to-depth mapping matrix and is calculated by using the intrinsic parameter and the extrinsic parameter of the camera. A form of Q is as follows: Tx, f, Cx, and Cy. Q is obtained by calibration and alignment of the camera. Tx is a horizontal offset between the two cameras, f is a focal length, and Cx and Cy are intrinsic parameters and are used to indicate a location offset of an optical center and a focal point.

In this embodiment, a stereorectify function provided by OpenCV may be used to obtain the mapping matrix. Homogeneous coordinates of an actual three-dimensional point are obtained by matrix multiplication, and a calculated depth value is Zc=Z/W.

Finally, obstacle detection by the unmanned aerial vehicle is described. A binocular vision module is used to obtain depth values (a unit is a physical value unit, for example, meter) of all pixels in the image selection window, and the image selection window is equally divided into 3×3 image sub-windows. A minimum value of a depth value of each sub-window is obtained, the minimum value of depth values of all pixels in a sub-window is a minimum depth value of the sub-window, the minimum depth value indicates a distance between the unmanned aerial vehicle and a nearest obstacle in the sub-window, and the distance between the obstacle and the camera is a connection line parallel to a main optical axis and perpendicular to a plane of the obstacle. If the distance is less than a threshold (for example, 1 meter), it indicates that the unmanned aerial vehicle encounters the obstacle. The minimum depth value of each sub-window may be different, and may help a flight control system of the unmanned aerial vehicle to determine a direction for obstacle avoiding. In an example, depth values of all sub-windows may all be sent to the flight control system.

An obstacle detection process is described by using an example as follows: a threshold may be set, for example, 1.5 meters, and as long as a depth value of an image sub-window is less than 1.5 meters, it indicates that the unmanned aerial vehicle encounters an obstacle if flying by 1.5 meters. A turning direction may be determined according to statuses of other image sub-windows to avoid the obstacle. For example, a left sub-window is 3 meters, the obstacle may be avoided by turning to the left. If all image sub-windows are 1.5 meters, the obstacle is avoided by turning to a random direction. The foregoing obstacle avoiding policy is only a simplest obstacle avoiding policy, and the obstacle avoiding policy further may be implemented in combination with artificial intelligence, positioning, maps, and the like.

In this embodiment, the built-in binocular camera of the unmanned aerial vehicle is used to perform real-time detection of an obstacle in the front. The image selection window is set to reduce a computing amount of a binocular matching algorithm, and satisfy a real-time quality requirement of obstacle detection of the unmanned aerial vehicle. Image sub-windows are obtained by division to obtain depth values of different locations in front of the unmanned aerial vehicle, to help the flight control module of the unmanned aerial vehicle to control direction turning of the unmanned aerial vehicle.

It should be noted that the foregoing method embodiments are expressed as a series of action combinations for the purpose of brief description, but a person skilled in the art should know that because some steps may be performed in other sequences or simultaneously according to the present disclosure, the present disclosure are not limited to a described action sequence.

In addition, a person skilled in the art should also know that the embodiments described in this specification are all preferred embodiments; and therefore, an action and a module involved are not necessarily mandatory in the present disclosure. To better implement the solution in this embodiment of the present disclosure conveniently, the following further provides a related apparatus configured to implement the solution.

Figure 5A:
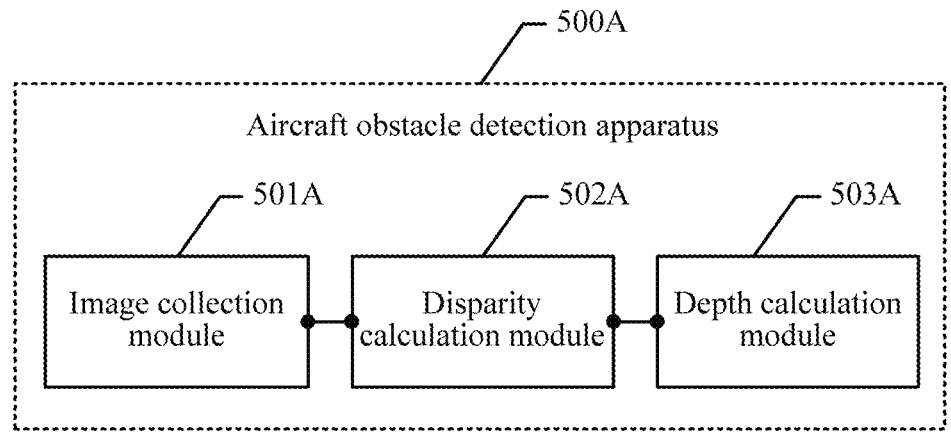
FIG. 5a is a schematic structural composition diagram of an aircraft obstacle detection apparatus according to an embodiment of the present disclosure.

Referring to FIG. 5a, an embodiment of the present disclosure provides an aircraft obstacle detection apparatus 500A. The apparatus may include: an image collection module 501A, a disparity calculation module 502A, and a depth calculation module 503A.

The image collection module 501A is configured to perform real-time image collection on a target obstacle by using a binocular camera equipped on an aircraft, to obtain a first image and a second image, where the first image is shot by a left eye of the binocular camera, and the second image is shot by a right eye of the binocular camera.

The disparity calculation module 502A is configured to: determine a first pixel location obtained by projecting the target obstacle in the first image, and a second pixel location obtained by projecting the target obstacle in the second image, and calculate a disparity between the first pixel location and the second pixel location according to the first pixel location and the second pixel location.

The depth calculation module 503A is configured to calculate a depth value between the binocular camera and the target obstacle according to the disparity between the first pixel location and the second pixel location, and a preset disparity-to-depth mapping matrix, to detect whether a flight direction of the aircraft is blocked by an obstacle.

Figure 5B:
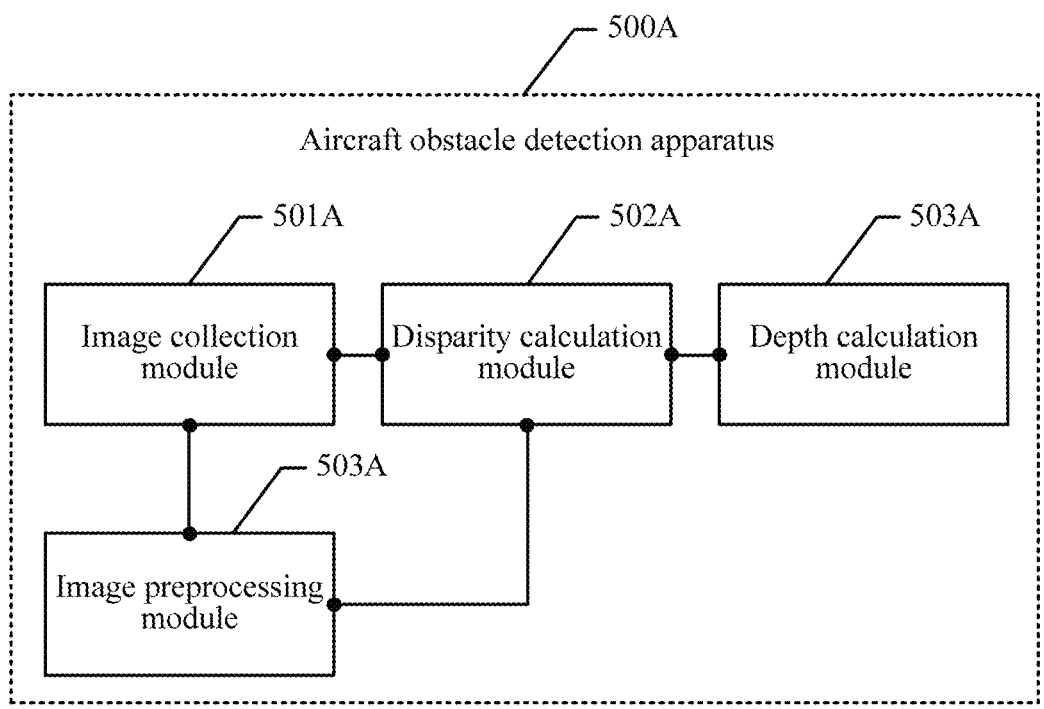
FIG. 5b is a schematic structural composition diagram of another aircraft obstacle detection apparatus according to an embodiment of the present disclosure.

In some possible implementations, referring to FIG. 5b, the aircraft obstacle detection apparatus 500A further includes: an image preprocessing module 504A.

The image preprocessing module 504A is configured to: after the image collection module 501A performs real-time image collection on the target obstacle by using the binocular camera equipped on the aircraft, to obtain the first image and the second image, perform scaling processing and tailoring processing on the first image and the second image separately; and convert the processed first image and the processed second image to a first greyscale image and a second greyscale image separately, and perform equalization processing on the first greyscale image and the second greyscale image separately.

The disparity calculation module 502A is specifically configured to: determine the projected first pixel location of the target obstacle in the first greyscale image on which equalization processing has been performed, and determine the projected second image location of the target obstacle in the second greyscale image on which equalization processing has been performed.

Figure 5C:
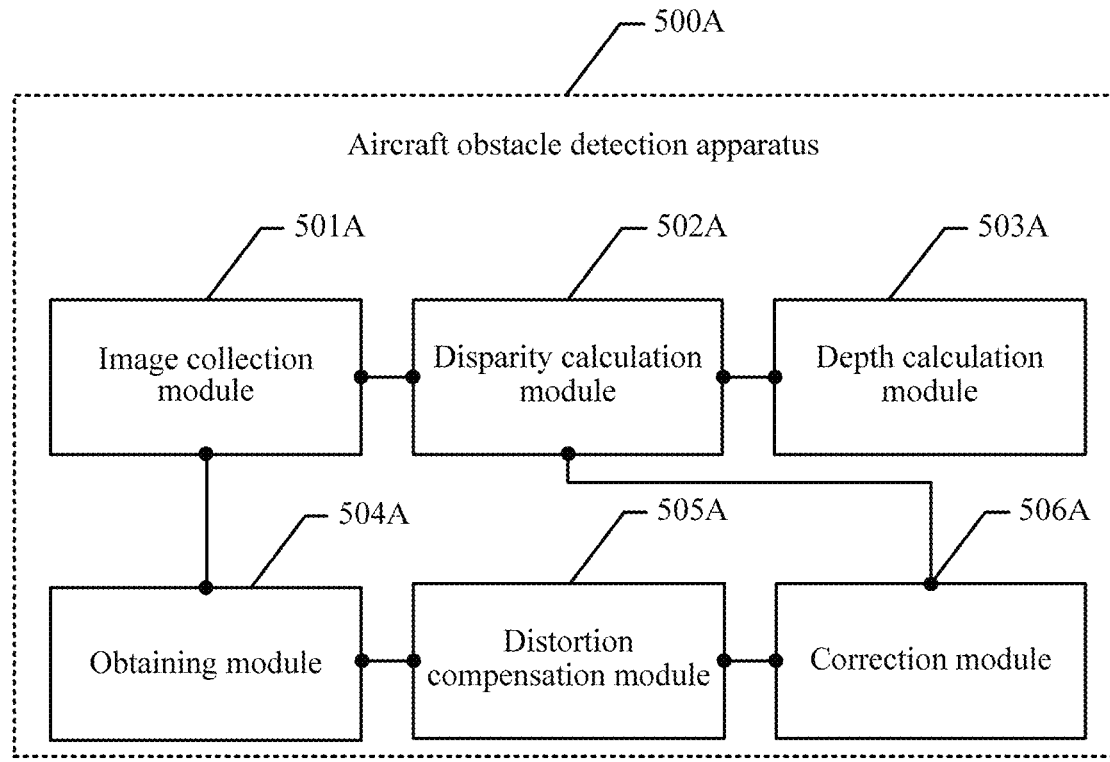
FIG. 5c is a schematic structural composition diagram of another aircraft obstacle detection apparatus according to an embodiment of the present disclosure.

In some embodiments of the present disclosure, referring to FIG. 5c, based on FIG. 5a, the aircraft obstacle detection apparatus 500A further includes:

an obtaining module 504A, configured to: after the image collection module 501 performs real-time image collection on the target obstacle by using the binocular camera equipped on the aircraft, to obtain the first image and the second image, and obtain intrinsic parameter information and extrinsic parameter information of the binocular camera, where the intrinsic parameter information includes: a radial distortion parameter and a tangential distortion parameter of the left eye, and a radial distortion parameter and a tangential distortion parameter of the right eye, and the extrinsic parameter information includes: a rotation matrix and an offset matrix of the left eye and the right eye of the binocular camera;

a distortion compensation module 505A, configured to: perform distortion compensation on the first image and the second image separately according to the intrinsic parameter information, to obtain the first image on which distortion compensation has been performed and the second image on which distortion compensation has been performed; and a correction module 506A, configured to perform, in a same horizontal plane according to the extrinsic parameter information, image correction processing on the first image on which distortion compensation has been performed and the second image on which distortion compensation has been performed.

Figure 5D:
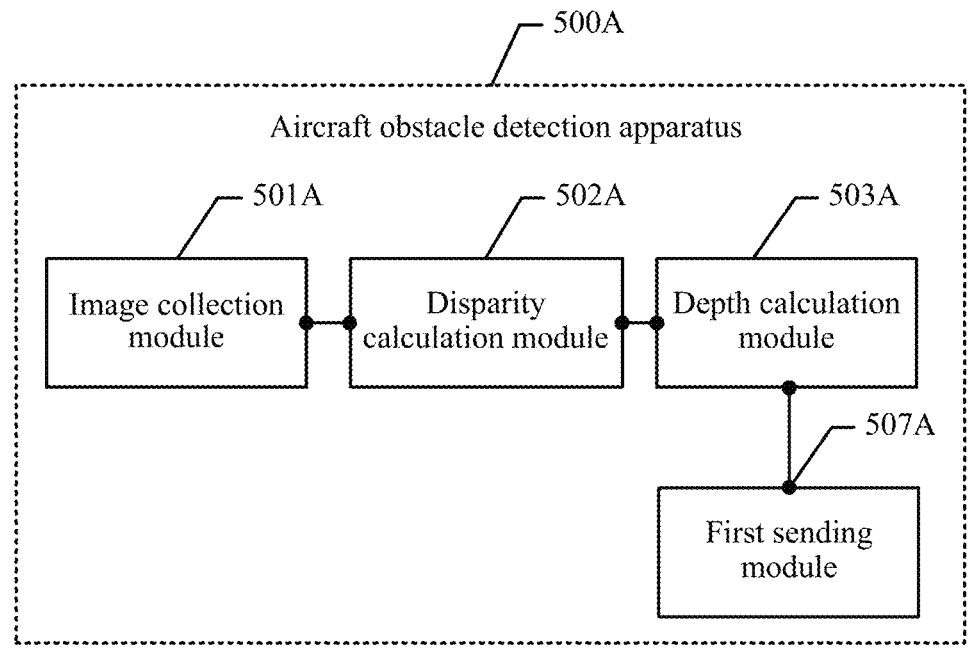
FIG. 5d is a schematic structural composition diagram of another aircraft obstacle detection apparatus according to an embodiment of the present disclosure.

In some possible implementations, referring to FIG. 5d, based on FIG. 5a, the aircraft obstacle detection apparatus 500A further includes:

a first sending module 507A, configured to: after the depth calculation module 503A calculates the depth value between the binocular camera and the target obstacle according to the disparity between the first pixel location and the second pixel location, and the preset disparity-to-depth mapping matrix, send the depth value between the binocular camera and the target obstacle to a flight control module of the aircraft, so that the flight control module determines, according to the depth value between the binocular camera and the target obstacle, whether the flight direction of the aircraft is blocked by an obstacle.

Figure 5E:
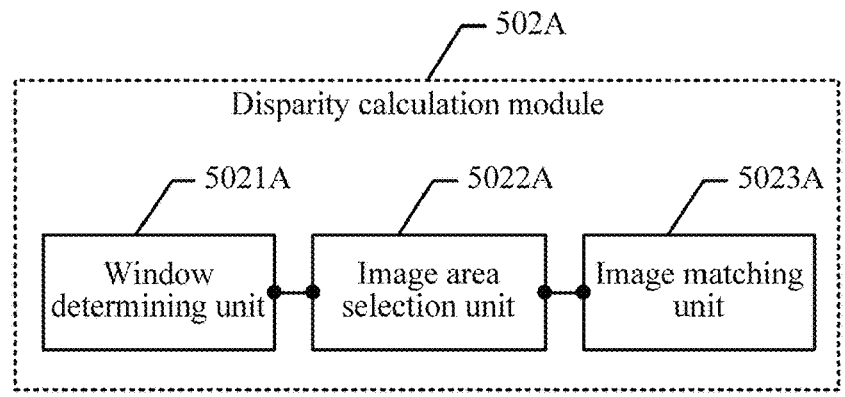
FIG. 5e is a schematic structural composition diagram of a disparity calculation module according to an embodiment of the present disclosure.

In some possible implementations, referring to FIG. 5e, the disparity calculation module 502A includes:

a window determining unit 5021A, configured to determine an image selection window according to an aircraft body size image formed by the aircraft in the binocular camera, where a total pixel value of the image selection window is greater than a total pixel value of the aircraft body size image, and is less than a total pixel value of the first image and less than a total pixel value of the second image;

an image area selection unit 5022A, configured to select a first sub-image and a second sub-image corresponding to the image selection window separately from the first image and the second image by using the image selection window; and an image matching unit 5023A, configured to: perform, by using a semi-global block matching SGBM algorithm, image point matching on the target obstacle shot in the first sub-image and the second sub-image separately, and determine, by using a successfully matched image point, a first pixel location obtained by projecting the target obstacle in the first sub-image, and a second pixel location obtained by projecting the target obstacle in the second sub-image.

Figure 5F:
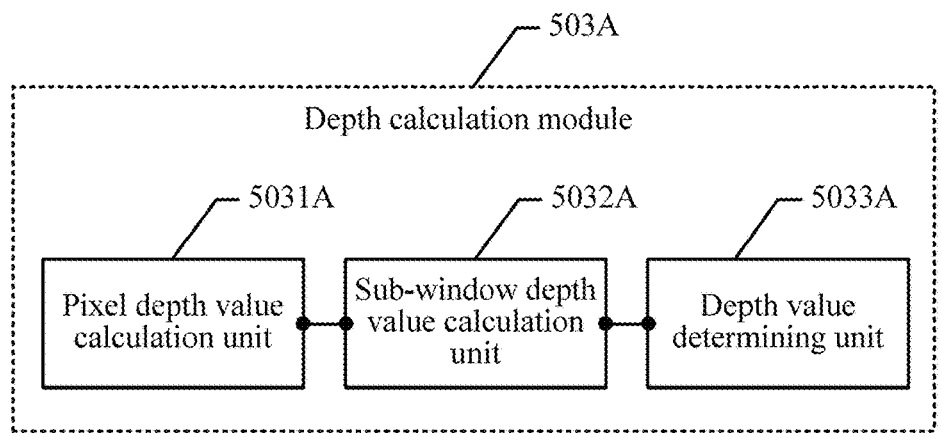
FIG. 5f is a schematic structural composition diagram of a depth calculation module according to an embodiment of the present disclosure.

In some possible implementations, referring to FIG. 5f, the depth calculation module 503A includes:

a pixel depth value calculation unit 5031A, configured to separately calculate depth values of all pixels corresponding to the image selection window according to a disparity between the first pixel location and the second pixel location, and the preset disparity-to-depth mapping matrix;

a sub-window depth value calculation unit 5032A, configured to: divide the image selection window into multiple image sub-windows, and separately calculate a depth value of each image sub-window according to the depth values of all the pixels corresponding to the image selection window; and a depth value determining unit 5033A, configured to: select an image sub-window with a minimum depth value according to the depth value of each image sub-window, and determine the depth value of the image sub-window with the minimum depth value as the depth value between the binocular camera and the target obstacle.

Figure 5G:
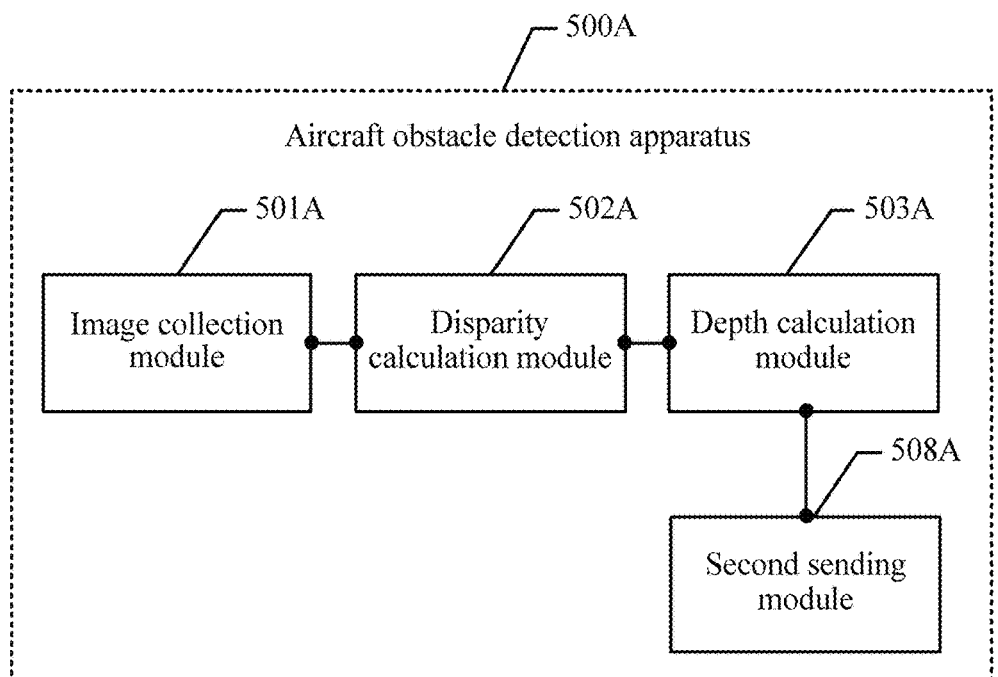
FIG. 5g is a schematic structural composition diagram of another aircraft obstacle detection apparatus according to an embodiment of the present disclosure.

In some possible implementations, the depth calculation module 503A is in the implementation scenario shown FIG. 5f. Referring to FIG. 5g, based on FIG. 5a, the aircraft obstacle detection apparatus 500A further includes:

a second sending module 508A, configured to: after the depth value determining module determines the depth value of the image sub-window with the minimum depth value as the depth value between the binocular camera and the target obstacle, send the depth value of each image sub-window to the flight control module of the aircraft, so that the flight control module selects an obstacle avoiding direction according to the depth value of each image sub-window and then adjusts a flight posture of the aircraft.

As can be known from descriptions of the foregoing embodiments, the binocular camera equipped on the aircraft first perform real-time image collection on the target obstacle to obtain the first image and the second image, where the first image is shot by a left eye of the binocular camera, and the second image is shot by a right eye of the binocular camera, a first pixel location obtained by projecting the target obstacle in the first image, and a second pixel location obtained by projecting the target obstacle in the second image are then determined, a disparity between the first pixel location and the second pixel location is calculated according to the first pixel location and the second pixel location, and finally the depth value between the binocular camera and the target obstacle is calculated according to the disparity between the first pixel location and the second pixel location, and the preset disparity-to-depth mapping matrix. In this embodiment of the present disclosure, the binocular camera built in the aircraft implements real-time detection on a front obstacle, no additional device needs to be added to the aircraft, neither of a flight scenario of the aircraft and a shape of the obstacle needs to be limited, and the depth value between the binocular camera and the target obstacle can be accurately calculated by image analysis and calculation, to reduce aircraft obstacle detection errors, and improve aircraft obstacle detection precision.

Figure 6:
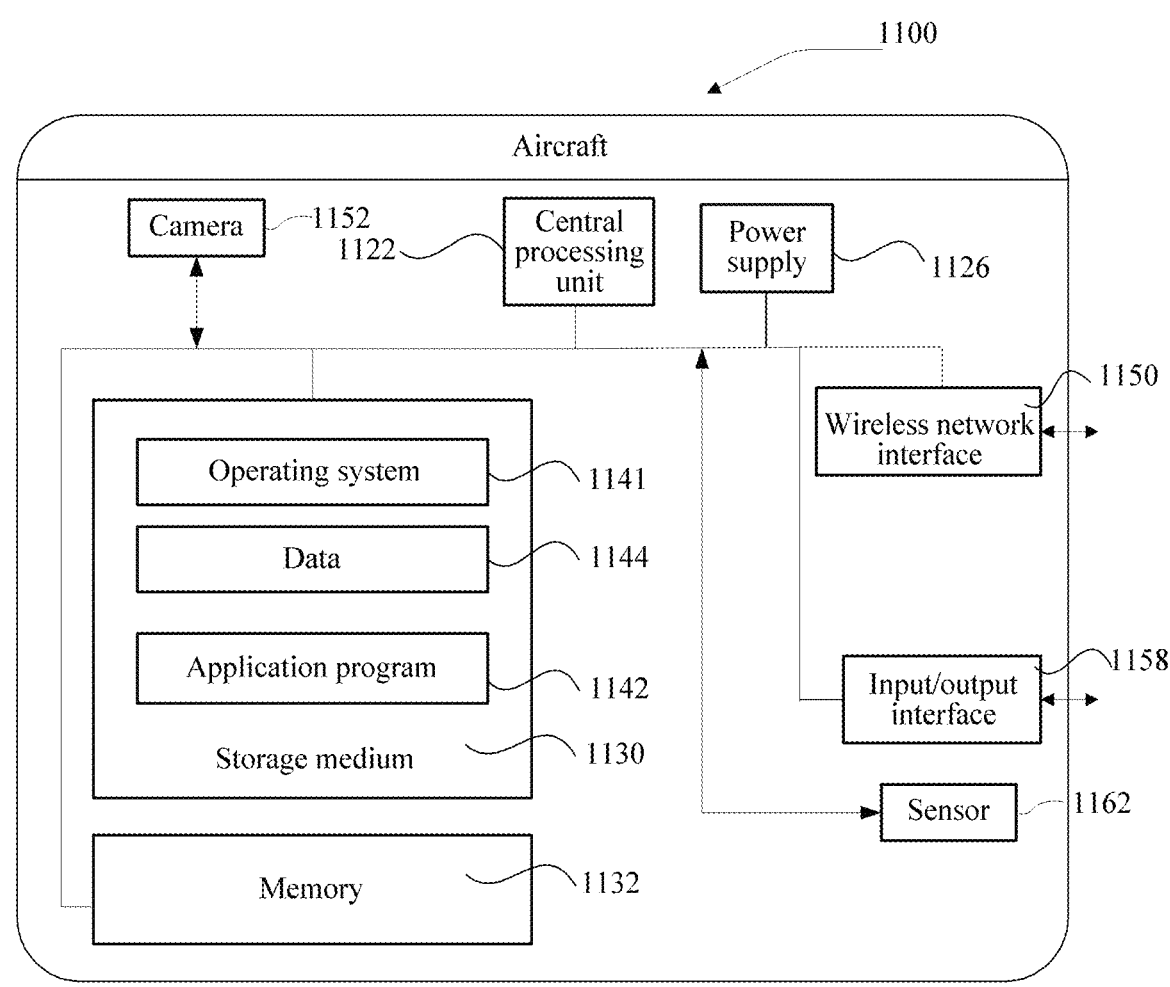
FIG. 6 is a schematic structural composition diagram of an aircraft that an aircraft obstacle detection method is applied to according to an embodiment of the present disclosure.

Referring to FIG. 6, FIG. 6 is a schematic structural diagram of an aircraft according to an embodiment of the present disclosure. The aircraft 1100 may vary greatly due to different configurations or performance, and may include one or more central processing units (CPU) 1122 (for example, one or more processors) and a memory 1132, and one or more storage media 1130 (for example, one or more mass storage devices) that store application programs 1142 or data 1144. The memory 1132 and the storage medium 1130 may be transient or persistent storages. The program stored in the storage medium 1130 may include one or more modules (not shown in the figure), and each module may include a series of instructions and operations for the aircraft. Still further, the CPU 1122 may be configured to communicate with the storage medium 1130, and perform, on the aircraft 1100, a series of instructions and operations in the storage medium 1130. A person skilled in the art may understand that the structure of the aircraft shown in FIG. 6 does not constitute a limitation to the aircraft, and the aircraft may include more components or fewer components than those shown in the figure, or some components may be combined, or a different component deployment may be used.

The aircraft 1100 further may include one or more power supplies 1126, one or more wireless network interfaces 1150, one or more input/output interfaces 1158, and/or one or more operating systems 1141, for example, an Android system.

The aircraft includes a camera 1152. The camera specifically may be a digital camera, or may be an analog camera. The camera 1152 specifically is a binocular camera, and a resolution of the camera may be selected according to an actual requirement. Structural components of the camera may include: a lens and an image sensor, and may be configured with reference to a specific scenario.

The aircraft further may include: a sensor 1162, for example, a motion sensor and other sensors. In an example, as one type of motion sensor, an acceleration sensor may detect magnitude of accelerations in various directions (generally on three axes), may detect magnitude and a direction of the gravity when static, and may be applied to an application that recognizes the attitude of the aircraft (for example, measurement of a yaw angle, a roll angle, and a pitch angle and magnetometer attitude calibration of the aircraft), a function related to recognition, and the like. Other sensors such as a gyroscope, a barometer, a hygrometer, a thermometer, and an infrared sensor, which may be further configured in the aircraft, are not further described herein.

In the embodiment, the steps of the aircraft obstacle detection method performed by the aircraft may be based on the aircraft structure shown in FIG. 6.

Besides, because of lack of external auxiliary navigation, it is difficult for the aircraft to estimate positioning and movement of the aircraft in an unknown environment. This key problem needs to be resolved in an autonomous navigation process of the aircraft. A method for resolving this problem is closely related to a type of an on-board sensor of the aircraft. In an existing solution, a monocular camera, an optical flow camera, or an inertial sensor may be installed on the body of the aircraft to measure positioning information of the aircraft, and the positioning information is used to perform flight control over the aircraft.

However, in an actual application, the monocular camera and the inertial sensor have poor positioning precision and accumulated errors are large, and the optical flow camera or the highly precise inertial sensor usually has high costs. Consequently, costs of the aircraft increase, and prevalent application of the aircraft is not facilitated.

Therefore, this embodiment provides a flight positioning information obtaining method and an aircraft, to obtain the target flight positioning information closer to an actual value. Precise positioning information still may be obtained without using the optical flow camera or the highly precise inertial sensor, to reduce errors and further reduce costs of the aircraft.

Currently, the unmanned aerial vehicle can automatically hover with an error within a precision range of vertical 10 centimeters and horizontal 1 meter. When higher precision is required, slight adjustment needs to be manually performed. Automatic hover of the unmanned aerial vehicle is essentially fixing the unmanned aerial vehicle at a preset height location and a preset horizontal location. That is, to implement the action of hover, the unmanned aerial vehicle reads a location of the unmanned aerial vehicle in advance, that is, a group of three-dimensional coordinates are generated. This step is very important. Accurately determining location information of the unmanned aerial vehicle is premise and basis for the unmanned aerial vehicle to complete the action of positioning and hovering.

The unmanned aerial vehicle uses the following common positioning technologies:

1. Positioning based on a Global Positioning System (GPS) module. GPS may implement space positioning of the unmanned aerial vehicle with reference to location information of at least four satellites. A positioning method using GPS as the center and assisted by various sensors is a mainstream positioning solution currently used by the unmanned aerial vehicle. To respond to an error caused by selective availability (SA) in a GPS system, GPS equipped on the unmanned aerial vehicle usually uses a differential GPS technology to improve positioning precision.

2. Positioning using a vision system. Continuous shooting of an on-board camera provides continuous image frames for the navigation system. In a calculation program of image feature matching, a feature tracker obtains natural landmark information from two continuous image frames, and measures a displacement in a pair of natural features. A new feature point is periodically recorded, and repeated feature points are compared, to measure a homography matrix used for three-dimensional geometric projection between image capture sequences, thereby positioning the unmanned aerial vehicle.

3. Highly precise positioning solution characterized by radio plus a laser fixed spot. In radio positioning, provided that a precise location of a navigation platform is known, a receiver receives a radio signal sent by the navigation platform, and calculates an interval between signal sending and receiving, to perform processing to obtain a relative distance between the navigation platform and a target object to determine a location.

Then, in the three manners, a vision system does not need to receive a GPS signal, and may cooperate with a component such as an inertial sensor without a GPS signal, to maintain stability of the unmanned aerial vehicle. Therefore, the unmanned aerial vehicle using the solution may be applied to some regions with obvious environment features, for example, some working environments where there are rivers, houses, and the like nearby. The present disclosure implements positioning mainly by using a vision system. The following provides detailed descriptions.

Figure 7:
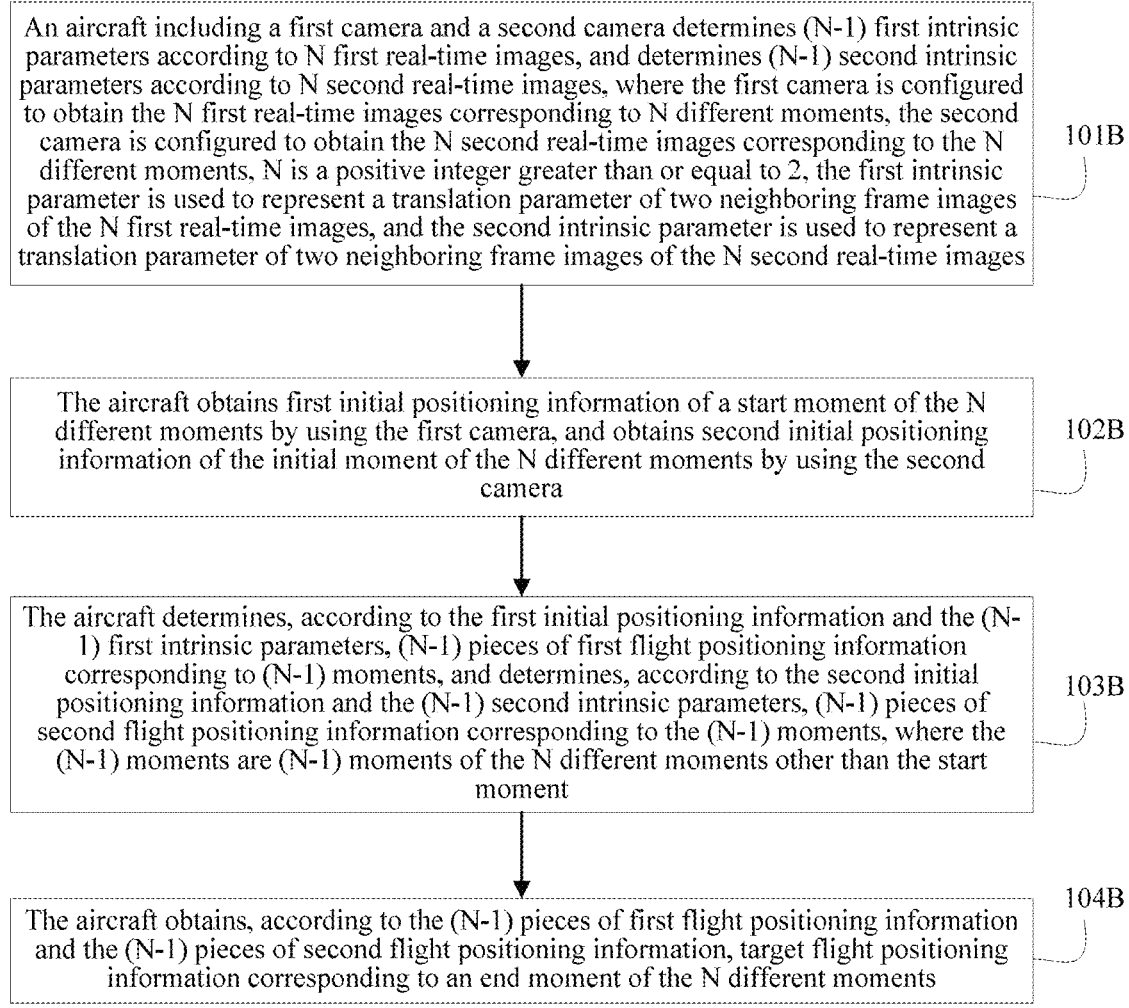
FIG. 7 is a schematic diagram of an embodiment of a flight positioning information obtaining method according to an embodiment of the present disclosure.

Referring to FIG. 7, FIG. 7 is a schematic flowchart of an embodiment of a flight positioning information obtaining method according to an embodiment of the present disclosure. The method includes:

101B: An aircraft including a first camera and a second camera determines (N−1) first essential parameters according to N first real-time images, and determines (N−1) second essential parameters according to N second real-time images, where the first camera is configured to obtain the N first real-time images corresponding to N different moments, the second camera is configured to obtain the N second real-time images corresponding to the N different moments, N is a positive integer greater than or equal to 2, the first essential parameter is used to represent a translation parameter of two neighboring frame images of the N first real-time images, and the second essential parameter is used to represent a translation parameter of two neighboring frame images of the N second real-time images.

In this embodiment, the aircraft includes a binocular camera, that is, includes two cameras that are respectively defined as the first camera and the second camera. The binocular camera may provide both depth information and positioning information, the depth information mainly refers to height information, and a method for obtaining the depth information may be installing the binocular camera vertically below the aircraft, to better capture a height change.

The first camera and the second camera are respectively located at two different positions of the aircraft, and simultaneously capture N frame images, where N is a positive integer greater than or equal to 2. In this way, it can be ensured that two frame images at previous and later moments are obtained to perform feature comparison. Real-time images respectively corresponding to the N moments that are obtained by the first camera are all referred to as the first real-time images, and real-time images respectively corresponding to the N moments obtained by the second camera are all referred to the second real-time images.

The N first real-time images obtained by the first camera are respectively N frame images corresponding to the N moments, and feature comparison is performed on two neighboring frame images of the N frame images to obtain (N−1) translation parameters. In this embodiment, the (N−1) translation parameters are respectively referred to as the first essential parameters. Similarly, the N second real-time images obtained by the second camera are respectively N frame images corresponding to the N moments, and feature comparison is performed on two neighboring frame images of the N frame images to also obtain (N−1) translation parameters. Similarly, in this embodiment, the (N−1) translation parameters are respectively referred to as the second essential parameters.

102B: The aircraft obtains first initial positioning information of a start moment of the N different moments by using the first camera, and obtains second initial positioning information of the start moment of the N different moments by using the second camera.

The first initial positioning information is positioning information shot by the first camera at the start moment of the N different moments, and the second initial positioning information is positioning information shot by the second camera at the start moment of the N different moments. Assuming that the entire flight space of the aircraft is considered as a three-dimensional coordinate system, the first initial positioning information may be used as a location of an origin in the three-dimensional coordinate system shot by the first camera, and the second initial positioning information may be used as a location of an origin in the three-dimensional coordinate system shot by the second camera.

103B: The aircraft determines, according to the first initial positioning information and the (N−1) first essential parameters, (N−1) pieces of first flight positioning information corresponding to (N−1) moments, and determines, according to the second initial positioning information and the (N−1) second essential parameters, (N−1) pieces of second flight positioning information corresponding to the (N−1) moments, where the (N−1) moments are (N−1) moments of the N different moments other than the start moment.

In this embodiment, because the aircraft has obtained the first initial positioning information and has obtained the (N−1) first essential parameters by calculation, the first initial positioning information and the (N−1) first essential parameters may be used to determine the (N−1) pieces of first flight positioning information corresponding to the (N−1) moments. Similarly, the (N−1) pieces of second flight positioning information corresponding to the (N−1) moments may also be determined according to the second initial positioning information and the (N−1) second essential parameters.

In an example, obtaining the first flight positioning information is used as an example. It is assumed that N is 5 and N1 to N5 are included. The first initial positioning information is X1, that is, positioning information at the moment N1 is X1. The first essential parameter at the moment N2 is a, the first essential parameter at the moment N3 is b, the first essential parameter at the moment N4 is c, and the first essential parameter at the moment N5 is d. Therefore, the first flight positioning information at the moment N2 is a X1, the first flight positioning information at the moment N3 is ab X1, the first flight positioning information at the moment N4 is abc X1, and the first flight positioning information at the moment N5 is abcd X1, to obtain the first flight positioning information respectively corresponding to the N2 to N5 (that is, N−1) moments.

104B: The aircraft obtains, according to the (N−1) pieces of first flight positioning information and the (N−1) pieces of second flight positioning information, target flight positioning information corresponding to an end moment of the N different moments.

In this embodiment, the aircraft may correct and adjust the obtained (N−1) pieces of first flight positioning information and (N−1) pieces of second flight positioning information by using the preset positioning restraint condition, and an error of the adjusted (N−1) pieces of first flight positioning information and (N−1) pieces of second flight positioning information is a minimum value. Finally, optimal solution calculation is performed on the adjusted first flight positioning information and second flight positioning information by using a solver, to obtain the target flight positioning information, where the target flight positioning information is used as flight positioning information of the end moment of the N different moments.

The target flight positioning information is sent to the flight control module of the aircraft, so that the flight control module flies or hovers by using the information.

In this embodiment, the aircraft includes the first camera and the second camera, the first camera is configured to obtain the N first real-time images corresponding to the N different moments, and the second camera is configured to obtain the N second real-time images corresponding to the N different moments. The flight positioning information of the aircraft may be obtained, the (N−1) first essential parameters are determined according to the N first real-time images, the (N−1) second essential parameters are determined according to the N second real-time images, the first initial positioning information of the first camera and the second initial positioning information of the second camera at the start moment are obtained, the (N−1) pieces of first flight positioning information corresponding to the (N−1) moments are determined according to the first initial positioning information and the (N−1) first essential parameters, the (N−1) pieces of second flight positioning information corresponding to the (N−1) moments are determined according to the second initial positioning information and the (N−1) second essential parameters, and the target flight positioning information corresponding to the end moment of the N different moments is finally obtained according to the (N−1) pieces of first flight positioning information and the (N−1) pieces of second flight positioning information by using the preset positioning restraint condition. In the foregoing manner, the binocular camera implements aircraft positioning, and can obtain images corresponding to multiple different moments in real time, and obtain the translation parameter of frame images by analysis. The two cameras separately obtain corresponding positioning information by using the translation parameter, and finally correct the positioning information by using the preset positioning restraint condition to obtain the target flight positioning information more close to an actual value. Therefore, precise positioning information can still be obtained without using an optical flow camera or highly precise an inertial sensor, errors can be reduced, and aircraft costs can be further reduced.

In some possible implementations, in an embodiment of the flight positioning information obtaining method provided in this embodiments of the present disclosure, before the obtaining the first initial positioning information of the first camera and the second initial positioning information of the second camera at the start moment, the method further may include:

disposing the first camera and the second camera on a same horizontal line of the aircraft within a preset camera distance range.

Figure 8:
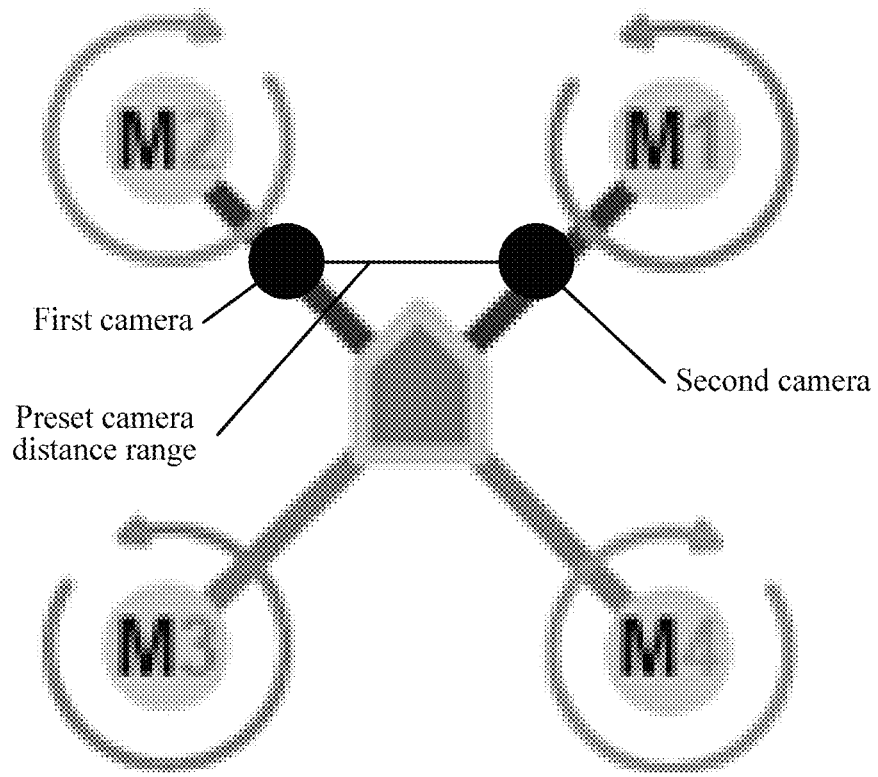
FIG. 8 is a schematic diagram of an aircraft equipped with a binocular camera according to an embodiment of the present disclosure.

In this embodiment, referring to FIG. 8, FIG. 8 is a schematic diagram of an aircraft equipped with a binocular camera according to an embodiment of the present disclosure. As shown in FIG. 8, the first camera and the second camera are installed on a same horizontal line of the aircraft, and an interval between the first camera and the second camera satisfies a preset camera distance range. It should be noted that two camera locations in FIG. 8 are only an example, and shall not be understood as a limitation on the solution.

Generally, the preset camera distance range may be 6 centimeters to 10 centimeters. In an actual application, some adjustments may be made, and this is not limited herein.

However, because two installed cameras cannot mathematically implement a precisely same horizontal line in an actual application, stereo calibration needs to be performed on the two cameras, and a Zhengyou Zhang calibration method may be used in stereo calibration.

In an example, an implementation process of the Zhengyou Zhang calibration method may include the following steps:

1. Print a checkerboard and stick the checkerboard in a plane to serve as a calibrated object.
2. A direction of the calibrated object or the camera is adjusted to shoot some images of different directions for the calibrated object.
3. Extract a feature point (for example, a corner point) from the images.
4. Estimate five intrinsic parameters and all extrinsic parameters when there is no distortion in an ideal case.
5. Perform estimation by using a least square method. A distortion coefficient in radial distortion actually exists.
6. Optimize estimation by using a maximum likelihood method, to improve estimation precision.

In this process, five intrinsic parameters, three extrinsic parameters, and two distortion coefficients having high estimation precision are obtained. The information may be used to perform distortion correction, image correction, and final three-dimensional information recovery.

Parameters that the binocular camera needs to calibrate include, but are not limited to, a parameter matrix, a distortion coefficient matrix, an essential matrix, a basic matrix, a rotation matrix, and a translation matrix in the camera. The parameter matrix and the distortion coefficient matrix in the camera may be calibrated by using a single camera calibration method. A most important difference between binocular camera calibration and monocular camera calibration is that the binocular camera needs to calibrate a relative relationship between coordinate systems of the left and right cameras.

Besides, in this embodiment, the binocular camera located vertically downward is installed on the same horizontal line, and a distance between the two cameras is within the preset camera distance range. It should be noted that if the interval between the two cameras is excessively small, it is difficult to obtain proper depth information and positioning information. If the interval between the two cameras is excessively large, a nearby object cannot be shot, and there is no reference object. In the foregoing installation manner, the first camera and the second camera can both shoot real-time images satisfying requirements.

In some possible implementations, in another embodiment of the flight positioning information obtaining method provided in this embodiments of the present disclosure, before the obtaining the first initial positioning information of the start moment of the N different moments by using the first camera, and obtaining the second initial positioning information of the start moment of the N different moments by using the second camera, the method further may include:

obtaining, by the aircraft by using the first camera, a first sub-image corresponding to a first moment and a second sub-image corresponding to a second moment, where the first moment and the second moment are both two moments of the N different moments, and the first sub-image and the second sub-image both belong to the first real-time image;

obtaining, by the aircraft by using the second camera, a third sub-image corresponding to the first moment and a fourth sub-image corresponding to the second moment, where the third sub-image and the fourth sub-image both belong to the second real-time image; and measuring, by the aircraft, first depth information and second depth information based on binocular stereoscopic vision, where the first depth information is obtained according to the first sub-image and the second sub-image, and the second depth information is obtained according to the third sub-image and the fourth sub-image.

In this embodiment, before obtaining the first initial positioning information and the second initial positioning information, the aircraft further may obtain, by using the first camera, the first sub-image corresponding to the first moment, and obtain a corresponding second sub-image at a next moment, that is, the second moment. Similarly, the second camera is used to obtain the corresponding third sub-image at the first moment, and obtain the fourth sub-image at the second moment. Certainly, the first sub-image and the second sub-image both belong to the first real-time image, and the third sub-image and the fourth sub-image both belong to the second real-time image.

Then, the first depth information and the second depth information may be respectively measured based on binocular stereoscopic vision. Binocular stereoscopic vision is an important form of machine vision, and is a method for using an imaging device to obtain two images of a detected object at different locations based on a disparity principle, and calculating a location deviation between corresponding points of the images to obtain three-dimensional geometric information of the object.

In an example, the first sub-image at the first moment is compared with the third sub-image at the first moment, and the first sub-image and the third sub-image are blended. After the images obtained by two eyes are blended, a difference between the first sub-image and the third sub-image is observed, and an obvious sense of depth may be obtained. A correspondence between features of the first sub-image and the third sub-image is established, and a correspondence between image points of a same spatial physical point in different images is established to obtain the first depth information. Similarly, the second sub-image at the second moment is compared with the fourth sub-image at the second moment to obtain the second depth information.

It should be noted that a binocular stereoscopic vision measurement method has advantages such as high efficiency, suitable precision, simple system structures, and low costs, and is very suitable for detection and quality control of online or noncontact products in a manufacturing site. Because image obtaining is completed in a moment in measurement of a moving object, the stereoscopic vision method is a more effective measurement method.

In this embodiment, the aircraft obtains, by using the first camera, the first sub-image corresponding to the first moment and the second sub-image corresponding to the second moment, and obtains, by using the second camera, the third sub-image corresponding to the second moment and the fourth sub-image corresponding to the second moment, then, based on binocular stereoscopic vision, the first depth information is obtained according to the first sub-image and the second sub-image, and the second depth information is obtained according to the third sub-image and the fourth sub-image. In the foregoing manner, the first camera and the second camera further may obtain depth information, that is, height information, thereby overcoming a defect that a monocular camera and an optical flow camera cannot provide depth information, and improving practicality of the solution. Besides, after the depth information is obtained, the depth information may be further used for topography recognition, object recognition, and height determining, thereby improving diversity of the solution.

In some possible implementations, in another embodiment of the flight positioning information obtaining method provided in this embodiment of the present disclosure, the first essential parameter may include a first rotation matrix and a first translation vector, the second essential parameter includes a second rotation matrix and a second translation vector, the first rotation matrix is used to indicate an angle change of the first camera, the second rotation matrix is used to indicate an angle change of the second camera, the first translation vector is used to indicate a height change of the first camera, and the second translation vector is used to indicate a height change of the second camera.

In this embodiment, the aircraft obtains the first essential parameter and the second essential parameter, the first essential parameter and the second essential parameter are both essential parameters, and the essential parameters include a rotation matrix and a translation vector. The following respectively describes the rotation matrix and the translation vector.

A relative location relationship between any two coordinate systems may be described by using two matrices: a rotation matrix R and a translation matrix T. A relative relationship between coordinate systems of left and right cameras is described herein by using R and T. Specifically, coordinates of the left camera are converted to coordinates of the right camera, that is, coordinates of the first camera are converted to coordinates of the second camera.

It is assumed that a point P exists in space, coordinates of the point are PW in a coordinate system, r indicates the left camera, and l indicates the right camera. Coordinates of the point in the coordinate systems of the left and right cameras may be indicated as:

$$\begin{cases} P_l = R_l P_W + T_l \\ p_r = R_r P_W + T_r \end{cases} \quad (1)$$

$P_l$ and $P^r$ also have the following relationship:

$$P_r = RP + T \quad (2).$$

In binocular camera analysis, the left camera, that is, the first camera is usually used as a main coordinate system, but R and T have left-to-right conversion. Therefore, Tx is a negative number. The following formula can be deduced with reference to formulas (1) and (2):

$$\begin{cases} R = R_r R_l^T \\ T = T_r - RT_L \end{cases} \quad (3)$$

In single camera calibration, extrinsic parameters of the camera are Rl, Tl, Rr, and Tr herein, and may be substituted to formula (3) to obtain a rotation matrix R and a translation matrix T, and a translation vector t may be obtained according to the translation matrix T.

Epipolar Geometry of essential parameters formed by the rotation matrix and the translation vector is very important in a binocular problem, and may simplify problems such as stereo matching. To apply Epipolar Geometry to resolve a problem, for example, find a limit, essential parameters need to be learned. Therefore, in a double camera calibration process, essential parameters are also determined according to the rotation matrix R and the translation matrix T.

The essential parameters are usually indicated by a character E, have a physical meaning of parameters converted in left and right coordinate systems, and may describe a relationship between corresponding points in image planes of left and right cameras.

In this embodiment, the rotation matrix and the translation vector of the binocular camera may be obtained, and the essential parameters are constructed by using the rotation matrix and the translation vector. In the foregoing manner, each camera of the binocular camera needs to be calibrated, to obtain the rotation matrix and the translation vector to describe a relative location relationship between the two cameras. Besides, the essential parameters further may be formed, to ensure feasibility and practicality of the solution.

In some possible implementations, in still another embodiment of the flight positioning information obtaining method provided in this embodiment of the present disclosure, the determining (N−1) first essential parameters according to N first real-time images, and determining (N−1) second essential parameters according to N second real-time images may include:

calculating any first essential parameter according to the following manner:

$$\lambda_1 \begin{bmatrix} z_1^j \\ 1 \end{bmatrix} = CX^j; \text{ and}$$

$$\lambda_2 \begin{bmatrix} z_2^j \\ 1 \end{bmatrix} = C(R_1 X^j + t_1),$$

where $\lambda_1$ indicates first depth information, $\lambda_2$ indicates second depth information, $z_1^j$ indicates three-dimensional space of a target point $X^j$ in the first sub-image, $z_2^j$ indicates three-dimensional space of the target point $X^j$ in the second sub-image, C indicates an intrinsic parameter measured in advance, $R_1$ indicates a first rotation matrix, and $t_1$ indicates a first translation vector; and calculating any second essential parameter according to the following manner:

$$\lambda_3 \begin{bmatrix} z_3^k \\ 1 \end{bmatrix} = CY^k; \text{ and}$$

-continued $$\lambda_4 \begin{bmatrix} z_4^k \\ 1 \end{bmatrix} = C(R_2 Y^k + t_2),$$

where $\lambda_3$ indicates third depth information, $\lambda_4$ indicates fourth depth information, $z_1^k$ indicates three-dimensional space of a target point $Y^k$ in the third sub-image, $z_2^k$ indicates three-dimensional space of the target point $Y^k$ in the fourth sub-image, $R^2$ indicates a second rotation matrix, and $t_2$ indicates a second translation vector.

Figure 9:
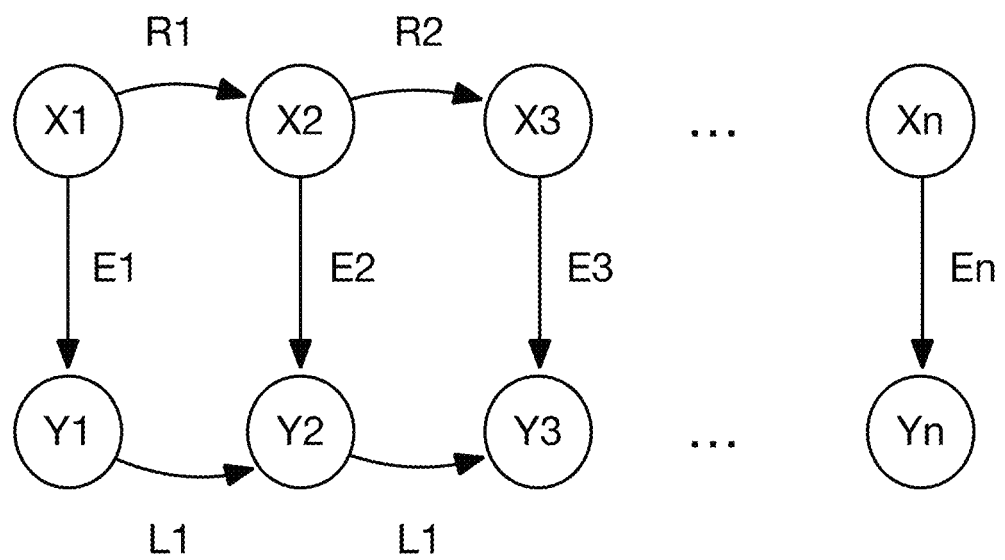
FIG. 9 is a schematic diagram of positioning by a binocular camera according to an embodiment of the present disclosure.

In this embodiment, referring to FIG. 9, FIG. 9 is a schematic diagram of positioning by a binocular camera according to an embodiment of the present disclosure. An (N−1)th first essential parameter is R in FIG. 9, an (N−1)th second essential parameter is L in FIG. 9, and E is a preset positioning restraint condition.

In an example, for a real-time image shot by each camera and corresponding to each moment, a rotation matrix and a translation vector of the real-time image may be calculated based on a feature extraction algorithm (ORB). An ORB feature point of each frame real-time image is extracted first, and is then matched with an ORB feature point of a previous frame real-time image, to obtain ORB feature point sets respectively corresponding to two moments of N moments:

$$z_1 = \{z_1^1, z_1^2, \ldots, z_1^N\} \quad (4); \text{ and}$$

$$z_2 = \{z_2^1, z_2^2, \ldots, z_2^N\} \quad (5).$$

$z_1$ is an image feature point set at a previous moment, $z_2$ is an image feature point set at a current moment. In an actual application, there are n groups of matched points, and only one group of set points is used as an example herein. If $z_1$ and $z_2$ perfectly match, each group of points should satisfy the following formula:

$$\lambda_1 \begin{bmatrix} z_1^j \\ 1 \end{bmatrix} = CX^j; \text{ and} \quad (6)$$

$$\lambda_2 \begin{bmatrix} z_2^j \\ 1 \end{bmatrix} = C(R_1 X^j + t_1). \quad (7)$$

$\lambda_1$ indicates first depth information, $\lambda_2$ indicates second depth information, $z_1^j$ indicates three-dimensional space of a target point $X^j$ in the first sub-image, $z_2^j$ indicates three-dimensional space of the target point $X^j$ in the second sub-image, C indicates an intrinsic parameter measured in advance, $R^1$ indicates a first rotation matrix, and $t^1$ indicates a first translation vector.

Certainly, in the second camera, it is similarly determined by using the foregoing manner that each group of points satisfy the following formula:

$$\lambda_3 \begin{bmatrix} z_3^k \\ 1 \end{bmatrix} = CY^k; \text{ and} \quad (8);$$

$$\lambda_4 \begin{bmatrix} z_4^k \\ 1 \end{bmatrix} = C(R_2 Y^k + t_2); \quad (9).$$

$\lambda_3$ indicates third depth information, $\lambda^4$ indicates fourth depth information, $z_1^k$ indicates three-dimensional space of a target point $Y^k$ the third sub-image, $z_2^k$ indicates three-dimensional space of the target point $Y^k$ in the fourth sub-image, $R_2$ indicates a second rotation matrix, and $t_2$ indicates a second translation vector.

With reference to equations formed by formula (6), formula (7), formula (8), and formula (9), the first essential parameter and the second essential parameter may be calculated, that is, the first rotation matrix, the first translation vector, the second rotation matrix, and the second translation vector are obtained.

It should be noted that in this embodiment, corresponding calculation formulas are provided to determine the (N−1) first essential parameters and the (N−1) second essential parameters, and essential parameters may be calculated by using corresponding formulas, to provide feasible basis for implementation of the solution, and improve feasibility of the solution.

In some possible implementations, in still another embodiment of the flight positioning information obtaining method provided in this embodiment of the present disclosure, the obtaining, according to the (N−1) pieces of first flight positioning information and the (N−1) pieces of second flight positioning information by using the preset positioning restraint condition, the target flight positioning information corresponding to the end moment of the N different moments may include:

A minimum variance value of the second flight positioning information and the first flight positioning information corresponding to a same moment is calculated according to the following manner while the preset positioning restraint condition is satisfied:

$$\min_{X,Y} \sum_{j=1}^{N} \|(R_{ext} Y_j + t_{ext}) - X_j\|^2. \quad (10)$$

X indicates the first flight positioning information, Y indicates the second flight positioning information, N indicates an Nth moment, j indicates a jth moment of the N moments, $X_j$ indicates the second flight positioning information corresponding to the jth moment, $Y_Y$ indicates the second flight positioning information corresponding to the jth moment, $R^{ext}$ indicates a rotation matrix of the first camera and the second camera measured in advance, and $t_{ext}$ indicates a translation vector of the first camera and the second camera measured in advance.

That is, N groups of adjusted flight positioning information may be obtained, for example, the first flight positioning information and the second flight positioning information jointly form {X1, Y1}, {X2, Y2}, . . . , and {Xn,Yn}. Adjusted {X1, Y1}, {X2, Y2}, . . . , and {Xn,Yn} in each group are closer to minimal values, so that a measurement result is more accurate.

$R_{ext}$ indicates a rotation matrix of the first camera and the second camera measured in advance, $t_{ext}$ indicates a translation vector of the first camera and the second camera measured in advance, and $R_{ext}$ $t_{ext}$ jointly serve as extrinsic parameters of the camera and may be obtained by stereo calibration.

Figure 10:
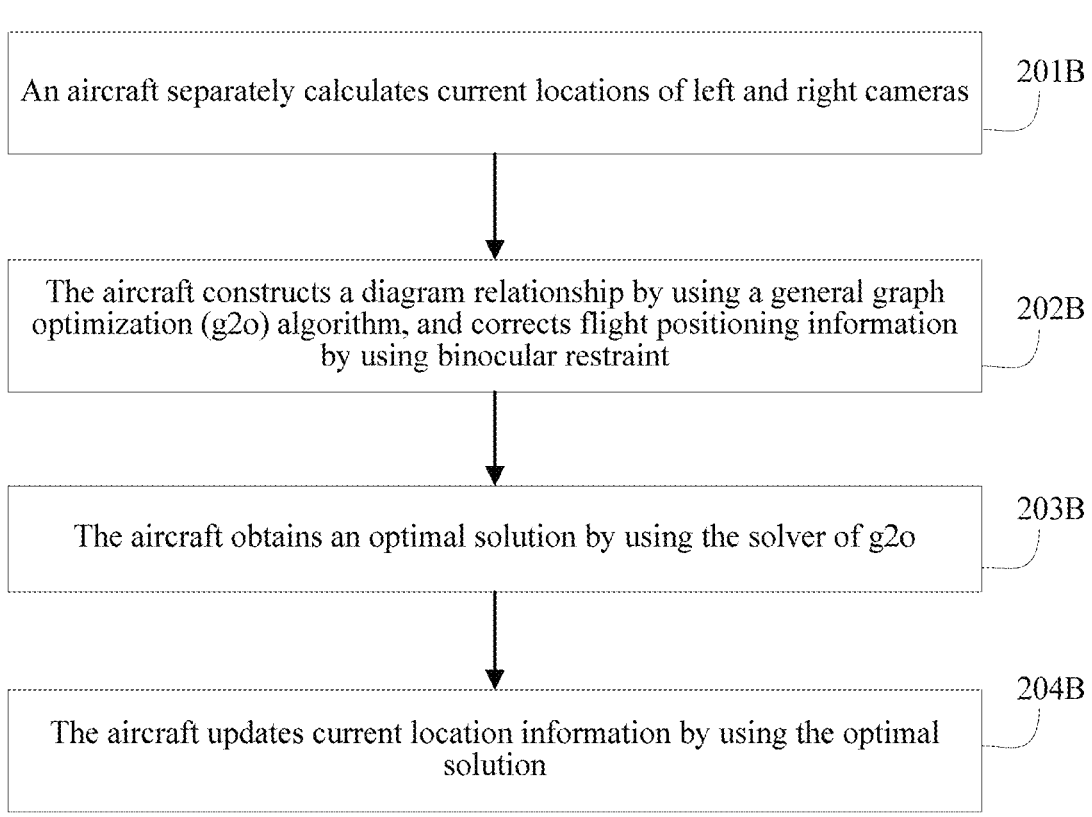
FIG. 10 is a schematic flowchart of obtaining target flight positioning information according to an embodiment of the present disclosure.

For ease of description, referring to FIG. 10, FIG. 10 is a schematic flowchart of obtaining target flight positioning information according to an embodiment of the present disclosure. Step 201B: An aircraft separately calculates current locations of left and right cameras, that is, current flight positioning information, where the flight positioning information specifically may include a coordinate point location in a coordinate system of three-dimensional space and a flight direction. Step 202B: The aircraft constructs a diagram relationship by using a general graph optimization (g2o) algorithm, and corrects flight positioning information by using binocular restraint, that is, a preset positioning restraint condition. g2o is an implementation of an algorithm set. A most suitable algorithm is selected according to a specific problem and according to a theory of solving a non-linear least square. g2o is a platform, and a linear equation solver may be added to write an optimized target function and determine an update manner. Step 203B: The aircraft obtains an optimal solution by using the solver of g2o. Finally, step 204B: The aircraft updates current location information by using the optimal solution, that is, updates the current flight positioning information, where the updated flight positioning information is target flight positioning information.

In this embodiment, restraint between flight positioning information of the binocular camera is established based on the first flight positioning information and the second flight positioning information respectively measured by the binocular camera, and optimal flight positioning information of the aircraft can be obtained by using the restraint, that is, the target flight positioning information is obtained, to reduce errors and improve positioning accuracy.

In some possible implementations, in still another embodiment of the flight positioning information obtaining method provided in this embodiment of the present disclosure, after the obtaining, by the aircraft according to the (N−1) pieces of first flight positioning information and the (N−1) pieces of second flight positioning information, the target flight positioning information corresponding to the end moment of the N different moments, the method may further include:

determining, by the aircraft according to the target flight positioning information, first flight positioning sub-information corresponding to an $(N+1)^{th}$ moment, where the first flight positioning sub-information is one piece of information of the target flight positioning information;

obtaining, by the aircraft by using a preset positioning restraint condition and the first flight positioning sub-information, second flight positioning sub-information corresponding to the $(N+1)^{th}$ moment;

determining, by the aircraft according to the first flight positioning sub-information and the first essential parameter, third flight positioning sub-information corresponding to an $(N+2)^{th}$ moment;

obtaining, by the aircraft by using a preset positioning restraint condition and the third flight positioning sub-information, fourth flight positioning sub-information corresponding to the $(N+2)^{th}$ moment; and calculating, by the aircraft, a first optimal solution of the first flight positioning sub-information and third target flight positioning information, and calculating a second optimal solution of the second flight positioning sub-information and the fourth flight positioning sub-information, where the first optimal solution and the second optimal solution constitute flight positioning information of the $(N+2)^{th}$ moment.

In this embodiment, after the aircraft obtains, by using the preset positioning restraint condition, the target flight positioning information corresponding to the end moment of the N different moments, the target flight positioning information further may be used to calculate subsequent flight positioning information.

In an example, it is known that the target flight positioning information includes positioning information of the first camera and positioning information of the second camera. It is assumed that only positioning information X1 corresponding to an $(N+1)^{th}$ moment is selected, where X1 is referred to as the first flight positioning sub-information. Then, positioning information Y1, that is, the second flight positioning sub-information, corresponding to the $(N+1)^{th}$ moment is inversely deduced by using the preset positioning restraint condition. In this case, obtaining of a group of flight positioning sub-information is completed, and obtaining of a next group of flight positioning sub-information starts.

The aircraft calculates, according to X1 and the first essential parameter, the third flight positioning sub-information, that is, X2, corresponding to an $(N+2)^{th}$ moment; and similarly calculates, by using the preset positioning restraint condition and X2, the fourth flight positioning sub-information, that is, Y2, corresponding to the $(N+2)^{th}$ moment. In this case, obtaining of the next group of flight positioning sub-information is also completed. Therefore, obtaining of subsequent flight positioning sub-information further may continue. Detailed descriptions are not described herein.

In an actual application, the two cameras respectively obtain optimal solutions according to calculated X and Y, for example, obtain optimal solutions by using a least square method, where the two optimal solutions may form flight positioning information of the $(N+2)^{th}$ moment.

Besides, in this embodiment, after the optimal target flight positioning information is obtained, optimal flight positioning information in a future period may be predicted by using the target flight positioning information and the preset positioning restraint condition. In the foregoing manner, in one aspect, a feasible means is provided to obtain accurate flight positioning information, to improve flexibility of the solution. In another aspect, in subsequently obtaining of flight positioning information, more attention is paid to global consideration, to help determine positioning information of the aircraft in a global coordinate system.

In some possible implementations, in still another embodiment of the flight positioning information obtaining method provided in this embodiment of the present disclosure, the determining, by the aircraft according to the first flight positioning sub-information and the first essential parameter, third flight positioning sub-information corresponding to an $(N+2)^{th}$ moment may include:

calculating, according to the following manner, the third flight positioning sub-information corresponding to the $(N+2)^{th}$ moment:

$$X_{N+2}=R_{N+1}X_{N+1}+t_{N+1}, \text{ where}$$

$X_{N+2}$ indicates the third flight positioning sub-information corresponding to the $(N+2)^{th}$ moment, $R_{N+1}$ indicates a rotation matrix at the $(N+1)^{th}$ moment in the first essential parameter, $t_{N+1}$ indicates a translation vector at the $(N+1)^{th}$ moment in the first essential parameter, and $X_{N+1}$ indicates the first flight positioning sub-information corresponding to the $(N+1)^{th}$ moment.

In this embodiment, how to calculate the third flight positioning sub-information corresponding to the $(N+2)^{th}$ moment is specifically described. Because the essential parameter has been obtained, and the essential parameter includes a rotation matrix and a translation vector, the rotation matrix and the translation vector may be used to obtain the third flight positioning sub-information.

The third flight positioning sub-information corresponding to the $(N+2)^{th}$ moment is calculated according to the following formula:

$$X_{N+2}=R_{N+1}X_{N+1}+t_{N+1} \quad (11)$$

In the formula, $X_{N+2}$ indicates the third flight positioning sub-information corresponding to the (N+2)th moment, $R_{N+1}$ indicates a rotation matrix at the (N+1)th moment in the first essential parameter, $t_{N+1}$ indicates a translation vector at the (N+1)th moment in the first essential parameter, and $X_{N+1}$ indicates the first flight positioning sub-information corresponding to the (N+1)th moment.

In the foregoing manner, flight positioning sub-information at a current moment may be calculated each time by using flight positioning sub-information at a previous moment. Then, a series of calculated flight positioning sub-information and the extrinsic parameter of the binocular camera are inputted to g2o to construct a relationship, then, a solver of g2o is invoked to obtain an optimal solution of a least square method, and finally, the optimal solution is used to update the target flight positioning information. Besides, the optimal solution is also sent to the flight control module of the aircraft.

In this embodiment, the first flight positioning sub-information corresponding to a previous moment is used to calculate the third flight positioning sub-information corresponding to a next moment, that is, calculation may be performed by using a corresponding formula. Therefore, practicality and feasibility of the solution can be improved in the foregoing manner.

Figure 11:
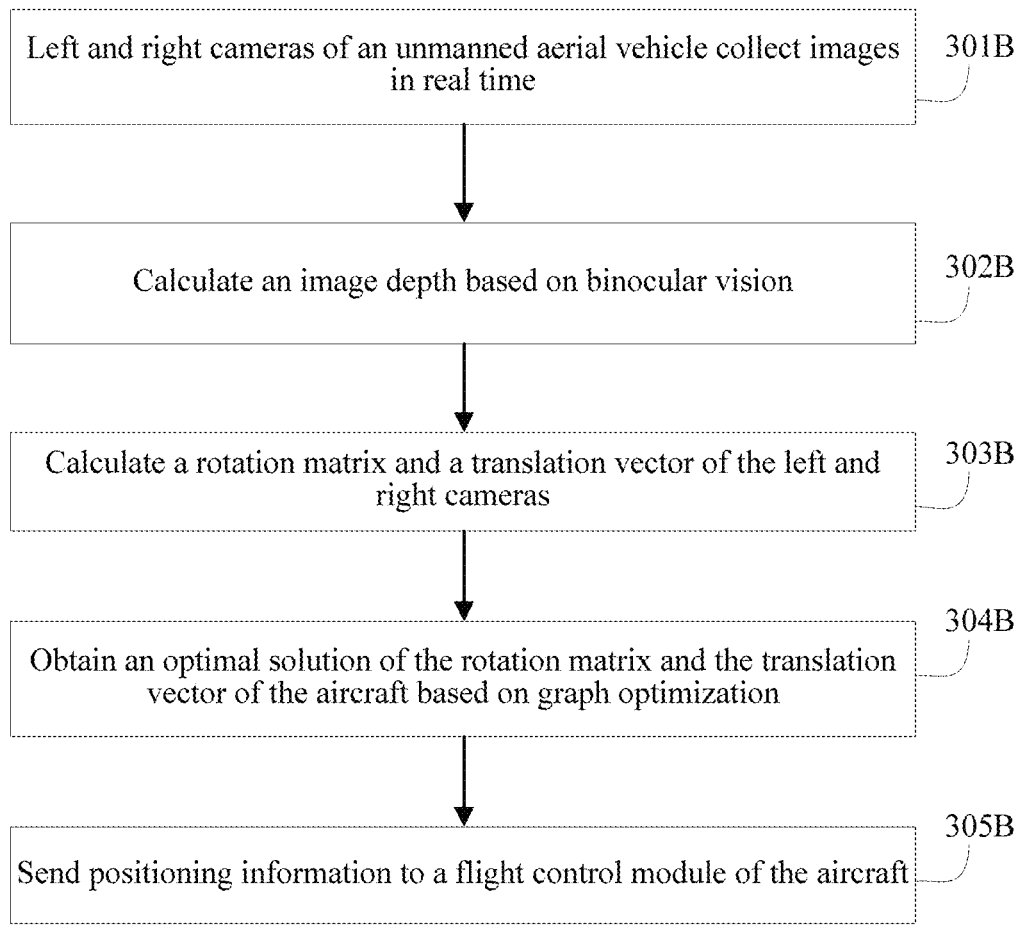
FIG. 11 is a schematic diagram of a working procedure of a binocular camera in an application scenario.

For ease of understanding, the following uses a specific application scenario to describe a flight positioning information obtaining method in the present disclosure in detail. Referring to FIG. 11, FIG. 11 is a schematic diagram of a working procedure of a binocular camera in an application scenario. The procedure includes:

Step 301B: Assuming that a used aircraft is an unmanned aerial vehicle, the unmanned aerial vehicle first separately collects real-time images of left and right eyes by using a vertically downward binocular camera equipped on the unmanned aerial vehicle.

Step 302B: Calculate depth values of the images by using the real-time images of the left and right eyes.

Step 303B: Respectively calculate rotation matrices and translation vectors of the left and right cameras based on ORB image feature points. Because images collected by the left and right cameras are different, and image feature points thereof are different, there is an error between the rotation matrices and the translation vectors calculated by the left and right cameras.

Step 304B: Establish a restraint condition of the two groups of rotation matrices and translation vectors according to restraint of the binocular camera, and obtain an optimal solution of a location of the unmanned aerial vehicle by using a least square method. The optimal solution is positioning information of the unmanned aerial vehicle.

Step 305B: Send the information to the flight control system of the unmanned aerial vehicle, so that the unmanned aerial vehicle may obtain more accurate positioning information.

Figure 12:
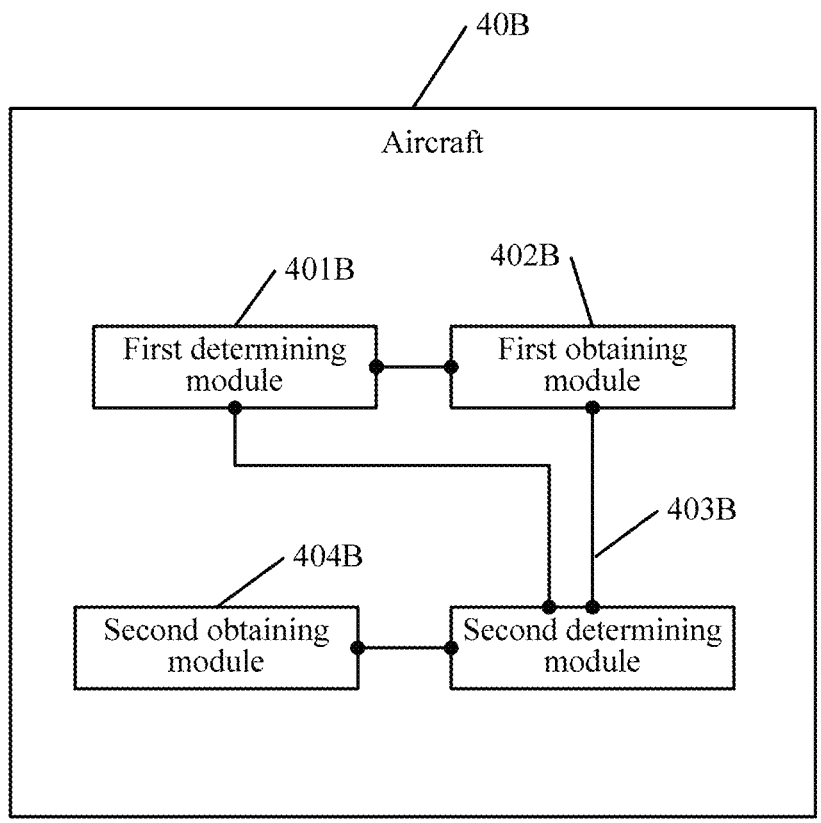
FIG. 12 is a schematic diagram of an embodiment of an aircraft according to an embodiment of the present disclosure.

The following describes an aircraft in the present disclosure in detail. Referring to FIG. 12, the aircraft in this embodiment includes a first camera and a second camera, the first camera is configured to obtain N first real-time images corresponding to N different moments, the second camera is configured to obtain N second real-time images corresponding to the N different moments, N is a positive integer greater than or equal to 2, and the aircraft includes:

a first determining module 401B, configured to: determine (N−1) first essential parameters according to the N first real-time images, and determine (N−1) second essential parameters according to the N second real-time images, where the first essential parameter is used to represent a translation parameter of two neighboring frame images of the N first real-time images, and the second essential parameter is used to represent a translation parameter of two neighboring frame images of the N second real-time images;

a first obtaining module 402B, configured to: obtain first initial positioning information of a start moment of the N different moments by using the first camera, and obtain second initial positioning information of the start moment of the N different moments by using the second camera;

a second determining module 403B, configured to: determine, according to the first initial positioning information obtained by the first obtaining module 402B and the (N−1) first essential parameters determined by the first determining module 401B, (N−1) pieces of first flight positioning information corresponding to (N−1) moments, and determine, according to the second initial positioning information obtained by the first obtaining module 402B and the (N−1) second essential parameters determined by the first determining module 401B, (N−1) pieces of second flight positioning information corresponding to the (N−1) moments, where the (N−1) moments are (N−1) moments of the N different moments other than the start moment; and a second obtaining module 404B, configured to obtain, by using a preset positioning restraint condition according to the (N−1) pieces of first flight positioning information and the (N−1) pieces of second flight positioning information determined by the second determining module 403B, target flight positioning information corresponding to an end moment of the N different moments.

In this embodiment, the first determining module 402B determines the (N−1) first essential parameters according to the N first real-time images, and determines the (N−1) second essential parameters according to the N second real-time images. The first obtaining module 402B obtains first initial positioning information of a start moment of the N different moments by using the first camera, and obtains second initial positioning information of the start moment of the N different moments by using the second camera. The second determining module 403B determines, according to the first initial positioning information obtained by the first obtaining module 402B and the (N−1) first essential parameters determined by the first determining module 401B, (N−1) pieces of first flight positioning information corresponding to (N−1) moments, and determines, according to the second initial positioning information obtained by the first obtaining module 402B and the (N−1) second essential parameters determined by the first determining module 401B, (N−1) pieces of second flight positioning information corresponding to the (N−1) moments. The second obtaining module 404B obtains, by using a preset positioning restraint condition according to the (N−1) pieces of first flight positioning information and the (N−1) pieces of second flight positioning information determined by the second determining module 403B, target flight positioning information corresponding to an end moment of the N different moments.

In this embodiment, the aircraft can implement aircraft positioning by using the binocular camera, and can obtain images corresponding to multiple different moments in real time, and obtain the translation parameter of frame images by analysis. The two cameras separately obtain corresponding positioning information by using the translation parameter, and finally correct the positioning information by using the preset positioning restraint condition to obtain the target flight positioning information more close to an actual value. Therefore, precise positioning information can still be obtained without using an optical flow camera or highly precise an inertial sensor, errors can be reduced, and aircraft costs can be further reduced.

Figure 13:
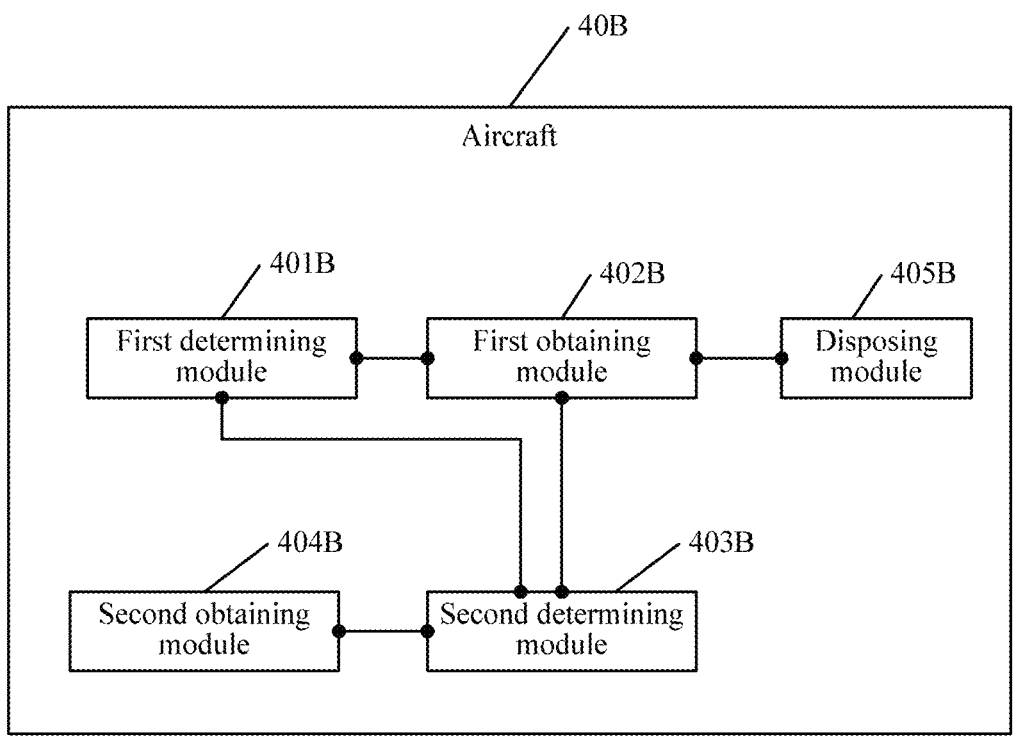
FIG. 13 is a schematic diagram of another embodiment of an aircraft according to an embodiment of the present disclosure.

In some possible implementations, referring to FIG. 13, in another embodiment of the aircraft provided in this embodiment of the present disclosure, the aircraft further includes:

a disposing module 405B, configured to: before the first obtaining module 402B obtains the first initial positioning information of the start moment of the N different moments by using the first camera, and obtains the second initial positioning information of the start moment of the N different moments by using the second camera, dispose the first camera and the second camera on a same horizontal line of the aircraft within a preset camera distance range.

In this embodiment of the present disclosure, the binocular camera located vertically downward needs to be installed on the same horizontal line, and a distance between the two cameras is within the preset camera distance range. In the foregoing installation manner, the first camera and the second camera can both shoot real-time images satisfying requirements. If the interval between the two cameras is excessively small, it is difficult to obtain proper depth information and positioning information. If the interval between the two cameras is excessively large, a nearby object cannot be shot, and there is no reference object.

Figure 14:
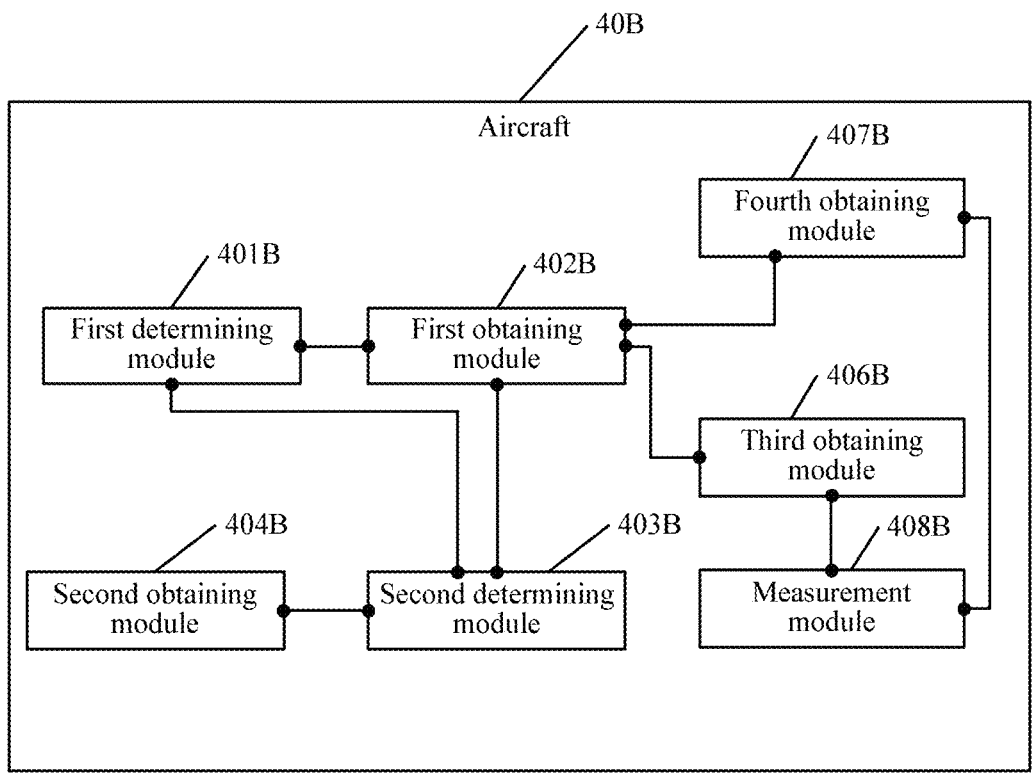
FIG. 14 is a schematic diagram of another embodiment of an aircraft according to an embodiment of the present disclosure.

In some possible implementations, referring to FIG. 14, in another embodiment of the aircraft provided in this embodiment of the present disclosure, the aircraft further includes:

a third obtaining module 406B, configured to: before the first determining module 402B determines the (N−1) first essential parameters according to the N first real-time images, and determines the (N−1) second essential parameters according to the N second real-time images, obtain, by using the first camera, a first sub-image corresponding to a first moment and a second sub-image corresponding to a second moment, where the first moment and the second moment are both two moments of the N different moments, and the first sub-image and the second sub-image both belong to the first real-time image;

a fourth obtaining module 407B, configured to obtain, by using the second camera, a third sub-image corresponding to the second moment and a fourth sub-image corresponding to the second moment, where the third sub-image and the fourth sub-image both belong to the second real-time image; and a measurement module 408B, configured to measure first depth information and second depth information based on binocular stereoscopic vision, where the first depth information is obtained according to the first sub-image and the second sub-image, and the second depth information is obtained according to the third sub-image and the fourth sub-image.

In this embodiment, the aircraft obtains, by using the first camera, the first sub-image corresponding to the first moment and the second sub-image corresponding to the second moment, and obtains, by using the second camera, the third sub-image corresponding to the second moment and the fourth sub-image corresponding to the second moment, and then, the first depth information of the first sub-image, the second depth information of the second sub-image, the third depth information of the third sub-image, and the fourth depth information of the fourth sub-image are measured based on binocular stereoscopic vision. In the foregoing manner, the first camera and the second camera further may obtain depth information, that is, height information, thereby overcoming a defect that a monocular camera and an optical flow camera cannot provide depth information, and improving practicality of the solution. Besides, after the depth information is obtained, the depth information may be further used for topography recognition, object recognition, and height determining, thereby improving diversity of the solution.

In some possible implementations, in another embodiment of the aircraft provided in this embodiment of the present disclosure, the first essential parameter includes a first rotation matrix and a first translation vector, the second essential parameter includes a second rotation matrix and a second translation vector, the first rotation matrix is used to indicate an angle change of the first camera, the second rotation matrix is used to indicate an angle change of the second camera, the first translation vector is used to indicate a height change of the first camera, and the second translation vector is used to indicate a height change of the second camera.

In this embodiment, the binocular camera may obtain the rotation matrix and the translation vector, and construct the essential parameter by using the rotation matrix and the translation vector. In the foregoing manner, each camera of the binocular camera needs to be calibrated to obtain the rotation matrix and the translation vector to describe a relative location relationship between the two cameras, and further may form the essential parameter, to ensure feasibility and practicality of the solution.

Figure 15:
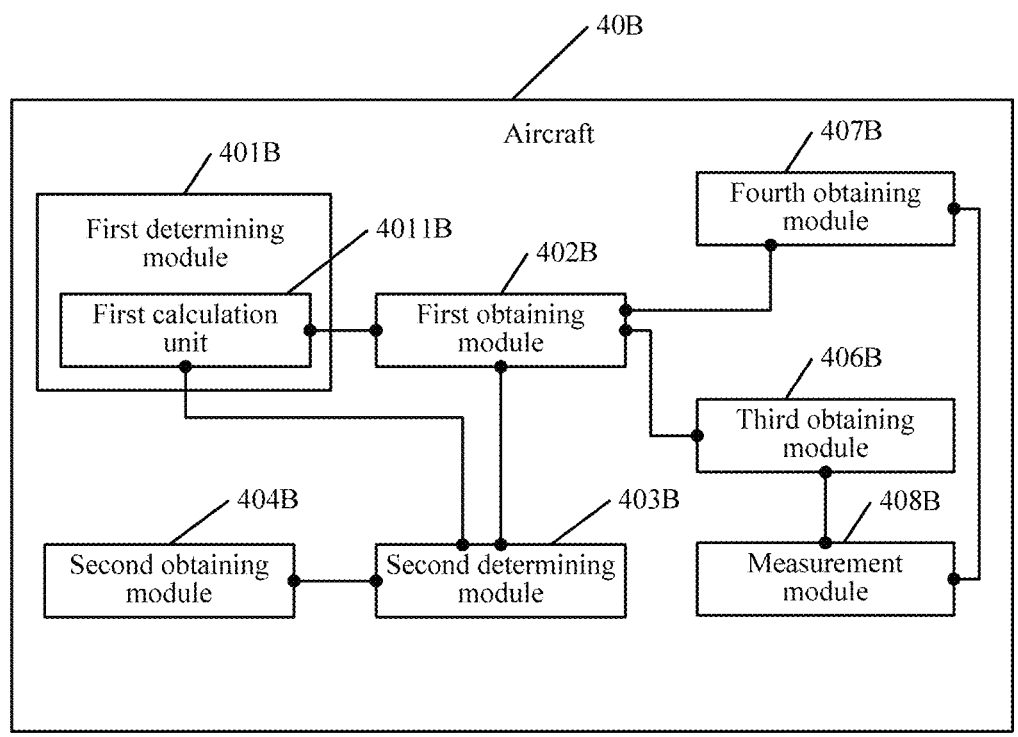
FIG. 15 is a schematic diagram of another embodiment of an aircraft according to an embodiment of the present disclosure.

In some possible implementations, referring to FIG. 15, in another embodiment of the aircraft provided in this embodiment of the present disclosure, the first determining module 401B includes:

a first calculation unit 4011B, configured to: calculate an $(N-1)^{th}$ first essential parameter according to the following manner:

$$\lambda_1 \begin{bmatrix} z_1^j \\ 1 \end{bmatrix} = CX^j; \text{ and}$$

$$\lambda_2 \begin{bmatrix} z_2^j \\ 1 \end{bmatrix} = C(R_1 X^j + t_1),$$

where $\lambda_1$ indicates first depth information, indicates second depth information, $z_1^j$ indicates three-dimensional space of a target point $X^j$ in the first sub-image, $z_2^j$ indicates three-dimensional space of the target point $X^j$ in the second sub-image, C indicates an intrinsic parameter measured in advance, $R_1$ indicates a first rotation matrix, and $t_1$ indicates a first translation vector; and calculate an $(N-1)^{th}$ second essential parameter according to the following manner:

$$\lambda_3 \begin{bmatrix} z_3^k \\ 1 \end{bmatrix} = CY^k; \text{ and}$$

$$\lambda_4 \begin{bmatrix} z_4^k \\ 1 \end{bmatrix} = C(R_2 Y^k + t_2),$$

where $\lambda_3$ indicates third depth information, $\lambda_4$ indicates fourth depth information, $z_1^k$ indicates three-dimensional space of a target point $Y^k$ in the third sub-image, $z_2^k$ indicates three-dimensional space of the target point $Y^k$ in the fourth sub-image, $R_2$ indicates a second rotation matrix, and $t_2$ indicates a second translation vector.

In this embodiment of the present disclosure, corresponding calculation formulas are provided to determine the (N−1) first essential parameters and the (N−1) second essential parameters, and essential parameters may be calculated by using corresponding formulas, to provide feasible basis for implementation of the solution, and improve feasibility of the solution.

Figure 16:
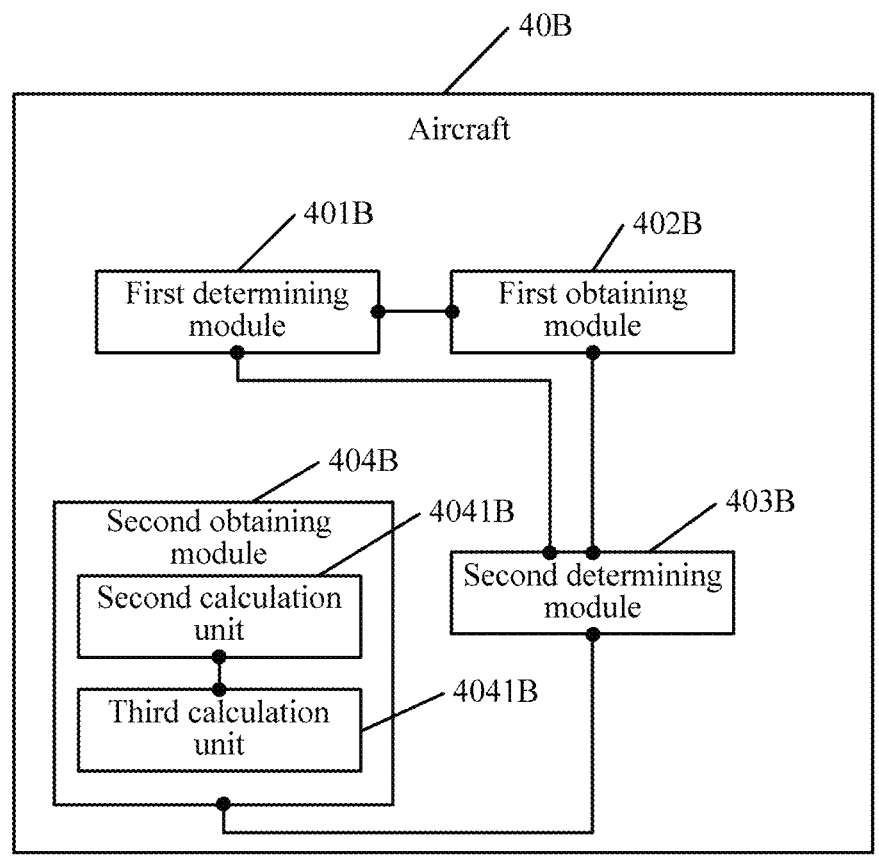
FIG. 16 is a schematic diagram of another embodiment of an aircraft according to an embodiment of the present disclosure.

In some possible implementations, referring to FIG. 16, in another embodiment of the aircraft provided in this embodiment of the present disclosure, the second obtaining module 404B includes:

a second calculation unit 4041B, configured to: while the preset positioning restraint condition is satisfied, calculate, according to the following manner, a minimum variance value of the second flight positioning information and the first flight positioning information:

$$\min_{X,Y} \sum_{j=1}^{N} \|(R_{ext}Y_j + t_{ext}) - X_j\|^2,$$

where X indicates the first flight positioning information, Y indicates the second flight positioning information, $$\min_{X,Y}$$

indicates the minimum variance value of the second flight positioning information and the first flight positioning information while the preset positioning restraint condition is satisfied, N indicates an $N^{th}$ moment, j indicates a $j^{th}$ moment of the N moments, $X_j$ indicates the second flight positioning information corresponding to the $j^{th}$ moment, $Y_j$ indicates the second flight positioning information corresponding to the $j^{th}$ moment, $R_{ext}$ indicates a rotation matrix of the first camera and the second camera measured in advance, and $t^{ext}$ indicates a translation vector of the first camera and the second camera measured in advance; and a third calculation unit 4042B, configured to calculate the target flight positioning information according to the minimum variance value calculated by the second calculation unit 4041B.

In this embodiment, restraint between flight positioning information of the binocular camera is established based on the first flight positioning information and the second flight positioning information respectively measured by the binocular camera, and optimal flight positioning information of the aircraft can be obtained by using the restraint, that is, the target flight positioning information is obtained, to reduce errors and improve positioning accuracy.

Figure 17:
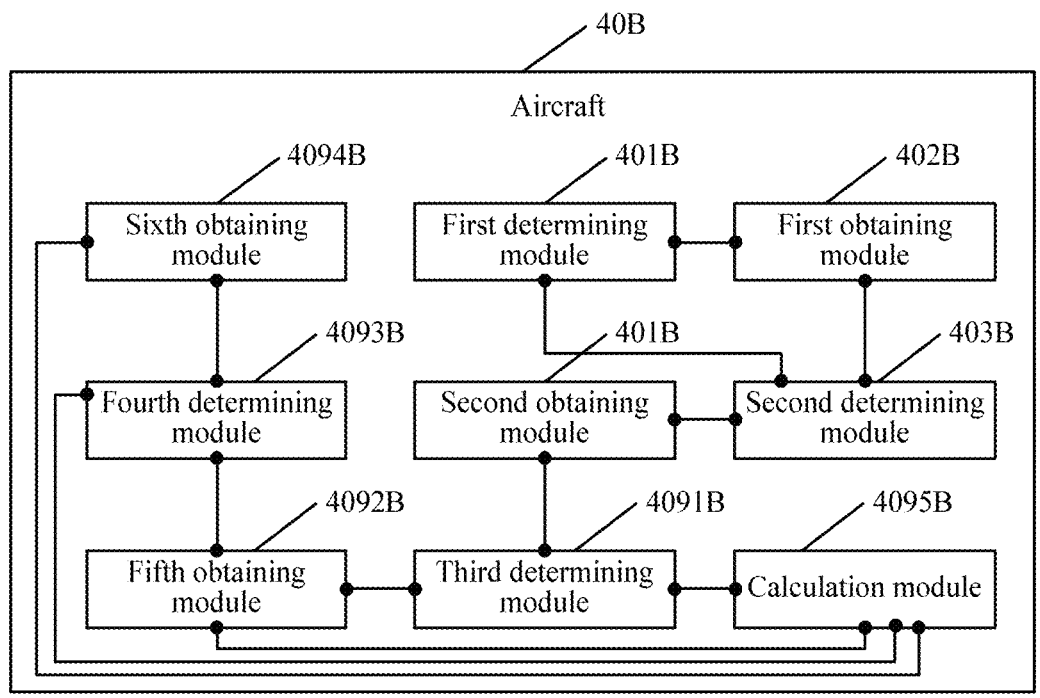
FIG. 17 is a schematic diagram of another embodiment of an aircraft according to an embodiment of the present disclosure.

In some possible implementations, referring to FIG. 17, in another embodiment of the aircraft provided in this embodiment of the present disclosure, the aircraft further includes:

a third determining module 4091B, configured to: after the second obtaining module 404B obtains, by using a preset positioning restraint condition according to the (N−1) pieces of first flight positioning information and the (N−1) pieces of second flight positioning information, target flight positioning information corresponding to an end moment of the N different moments, determine, according to the target flight positioning information, first flight positioning sub-information corresponding to an $(N+1)^{th}$ moment, where the first flight positioning sub-information is one piece of information of the target flight positioning information;

a fifth obtaining module 4092B, configured to obtain, by using a preset positioning restraint condition and the first flight positioning sub-information determined by the third determining module 4091B, second flight positioning sub-information corresponding to the $(N+1)^{th}$ moment;

a fourth determining module 4093B, configured to determine, according to the first flight positioning sub-information determined by the third determining module 4091B and the first essential parameter, third flight positioning sub-information corresponding to an $(N+2)^{th}$ moment;

a sixth obtaining module 4094B, configured to obtain, by using the preset positioning restraint condition and the third flight positioning sub-information determined by the fourth determining module 4093B, fourth flight positioning sub-information corresponding to the $(N+2)^{th}$ moment; and a calculation module 4095B, configured to: calculate a first optimal solution of the first flight positioning sub-information determined by the third determining module 4091B and third target flight positioning information determined by the fourth determining module 4093B, and calculate a second optimal solution of the second flight positioning sub-information obtained by the fifth obtaining module 4092B and the fourth flight positioning sub-information obtained by the sixth obtaining module 4094B, where the first optimal solution and the second optimal solution constitute flight positioning information of the $(N+2)^{th}$ moment.

In this embodiment, after the optimal target flight positioning information is obtained, optimal flight positioning information in a future period may be predicted by using the target flight positioning information and the preset positioning restraint condition. In the foregoing manner, in one aspect, a feasible means is provided to obtain accurate flight positioning information, to improve flexibility of the solution. In another aspect, in subsequently obtaining of flight positioning information, more attention is paid to global consideration, to help determine positioning information of the aircraft in a global coordinate system.

Figure 18:
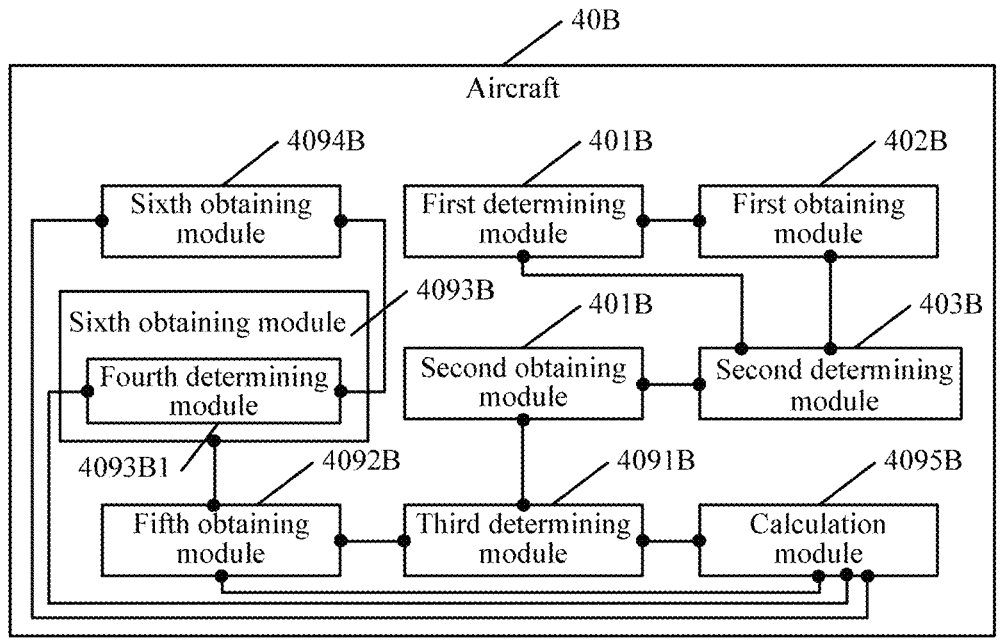
FIG. 18 is a schematic diagram of another embodiment of an aircraft according to an embodiment of the present disclosure.

In some possible implementations, referring to FIG. 18, in another embodiment of the aircraft provided in this embodiment of the present disclosure, the fourth determining module 4093B includes:

a fourth calculation unit 4093B1, configured to calculate, according to the following manner, the third flight positioning sub-information corresponding to the $(N+2)^{th}$ moment:

$$X_{N+2}=R_{N+1}X_{N+1}+t_{N+1}.$$

wherein $X_{N+2}$ indicates the third flight positioning sub-information corresponding to the $(N+2)^{th}$ moment, indicates a rotation matrix at the $(N+1)^{th}$ moment in the first essential parameter, $t_{N+1}$ indicates a translation vector at the $(N+1)^{th}$ moment in the first essential parameter, and $X_{N+1}$ indicates the first flight positioning sub-information corresponding to the $(N+1)^{th}$ moment.

In this embodiment, the first flight positioning sub-information corresponding to a previous moment is used to calculate the third flight positioning sub-information corresponding to a next moment, that is, calculation may be performed by using a corresponding formula. Therefore, practicality and feasibility of the solution can be improved in the foregoing manner.

Besides, because it is difficult for the aircraft to estimate a height of the aircraft from the ground in an unknown environment, in an existing solution, a barometer, an ultrasound apparatus, or a depth camera may be installed on the body of the aircraft to measure the height information of the aircraft, and the height information is used to perform flight control over of the aircraft.

However, in an actual application, flight height measurement with a barometer is affected by air flows generated in flight of the aircraft. Therefore, there is a height change, and measurement precision is poor. Although the ultrasound apparatus has high measurement precision, the ultrasound apparatus cannot perform receiving when there is a complex terrain, for example, the ground protrudes or inclines. Therefore, a measurement result is inaccurate. When the depth camera is used, costs of the aircraft are increased.

Therefore, the embodiments of the present disclosure further provide a flight height information obtaining method, to improve height information measurement precision. Besides, the binocular camera may obtain various complex terrains, and calculate the height information according to different terrains, to improve measurement accuracy. Compared with the depth camera, the binocular camera further has an advantage of low costs.

The flight height information measured in the solution specifically may be an actual height. It should be noted that the flight height information may also be an absolute height, a standard pressure height, or a relative height.

The absolute height indicates a perpendicular distance between the aircraft and a sea level. The absolute height may be directly measured by using a radar when the aircraft flies over a sea.

The standard pressure height indicates a perpendicular distance from the aircraft in the air to a standard pressure plane (that is, a horizontal plane in which an air pressure is 760 mm Hg) that is referred to as a standard pressure height. The air pressure often changes, and therefore, a perpendicular distance from the standard pressure plane to a sea level also often changes. If the standard pressure plane exactly overlaps with the sea level, the standard pressure height is the same as the absolute height. When civil planes fly on an airline and military planes fly in airport transfer, the standard pressure height needs to be used to avoid plane crash.

The relative height indicates a perpendicular distance between the aircraft and a specified horizontal plane (an airport, a shooting field, a battlefield, or the like). When a plane takes off and lands, the plane needs to know a relative height of the plane relative to the airport. In this case, a pressure scale of an altimeter is adjusted to a pressure value of the airport, that is, an airport pressure, and the relative height of the plane from the airport may be shown in the altimeter.

The actual height indicates a perpendicular distance from the aircraft in the air to a target on the ground right below the aircraft. During bombing and reconnaissance for shooting, the actual height of the plane needs to be known. When tasks such as bombing, ground attack, reconnaissance for shooting, searching and rescue, and agricultural and forestry working are performed, the actual height needs to be known. The actual height can be measured by using a cinetheodolite or a radar altimeter. An aircraft can fly only within a height range designed in advance.

Figure 19:
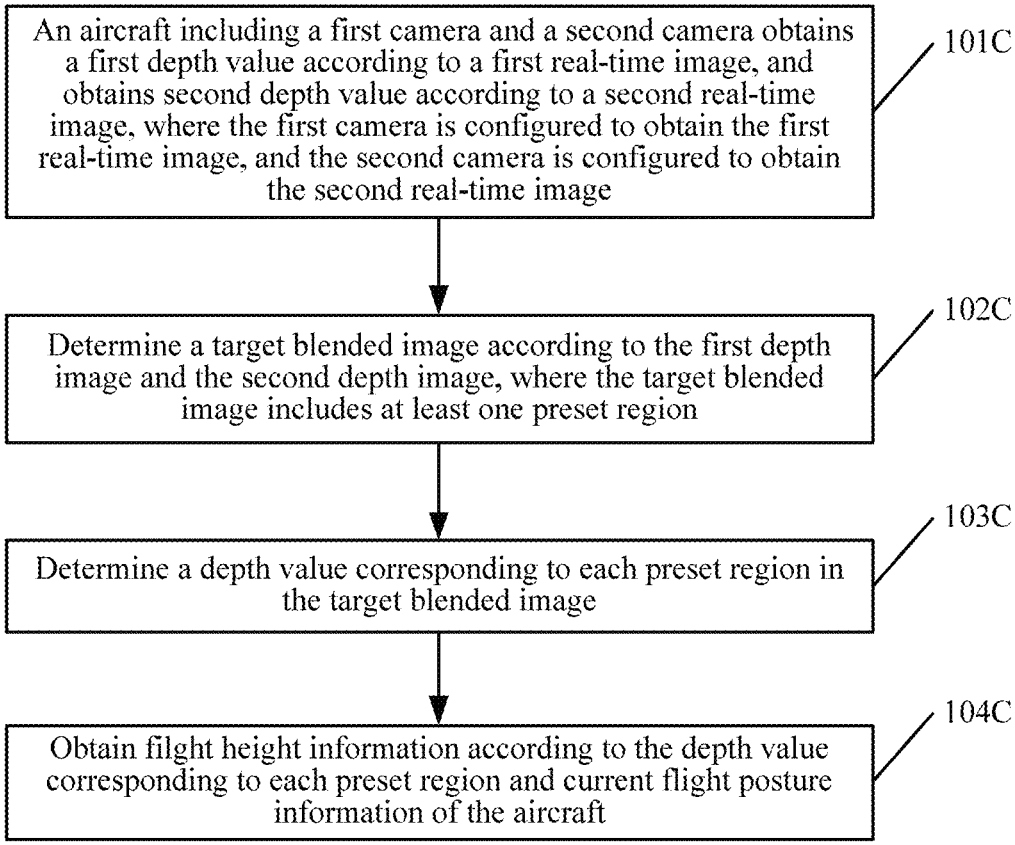
FIG. 19 is a schematic diagram of an embodiment of a flight height information obtaining method according to an embodiment of the present disclosure.

The following describes a flight height information obtaining manner from the perspective of an aircraft. Referring to FIG. 19, FIG. 19 is a schematic flowchart of a flight height information obtaining method according to an embodiment of the present disclosure. The method includes:

101C: An aircraft including a first camera and a second camera obtains a first depth value according to a first real-time image, and obtains a second depth value according to a second real-time image, where the first camera is configured to obtain the first real-time image, and the second camera is configured to obtain the second real-time image.

In this embodiment, the aircraft includes a binocular camera, that is, includes two cameras that are respectively defined as the first camera and the second camera. The binocular camera may capture images in real time, and the first camera shoots the first real-time image and the second camera shoots the second real-time image at a particular moment. Besides, the binocular camera still may collect left and right real-time images at a subsequent moment. In the present disclosure, the flight height information of the aircraft at a current moment may be calculated by using two real-time images corresponding to a moment.

After collecting the first real-time image and the second real-time image, the aircraft processes the two real-time images to obtain the first depth image corresponding to the first real-time image, and the second depth image corresponding to the second real-time image.

102C: The aircraft determines a target blended image according to the first depth image and the second depth image, where the target blended image includes at least one preset region.

In this embodiment, after the aircraft obtains the first depth image and the second depth image, because of a deviation of left and right visual angles, the first depth image and the second depth image are not symmetrical image, and further processing needs to be performed so that the two depth images can combine to form one target blended image. The target blended image includes many pixels, and the target blended image may be divided into at least one preset region. In this way, pixels in the preset region are reduced.

103C: The aircraft determines a depth value corresponding to each preset region in the target blended image.

In this embodiment, the aircraft needs to respectively calculate a depth value corresponding to each preset region in the target blended image.

104C: The aircraft obtains flight height information according to the depth value corresponding to each preset region and current flight posture information of the aircraft.

It may be understood that because the aircraft is not necessarily perpendicular to the ground when flying, the binocular camera installed on the aircraft is not necessarily perpendicular to the ground either. Therefore, the aircraft further needs to obtain the current flight posture information, for example, a pitch angle and a roll angle, by using an apparatus such as a sensor, and may calculate the flight height information of each preset region by using the current flight posture information and the depth value of each preset region. When calculation of the flight height information in all preset regions is completed, all the flight height information may be sent to the control module of the aircraft, so that the flight control module performs flight control over the aircraft according to the flight height information.

In this embodiment, the aircraft includes the first camera and the second camera, the first camera obtains the first real-time image, and the second camera obtains the second real-time image. A specific process is: the aircraft obtains a first depth image according to the first real-time image, and obtains a second depth image according to the second real-time image, the target blended image is determined according to the first depth image and the second depth image; and the aircraft may determine the depth value corresponding to each preset region in the target blended image, and finally obtain the flight height information according to the depth value corresponding to each preset region and the current flight posture information of the aircraft. In the foregoing manner, the height information of the aircraft is measured by using the binocular camera. Compared with height information measurement by a barometer, decrease of precision of height information measurement caused because the aircraft is affected by air flows is avoided. Besides, the binocular camera may obtain various complex terrains, and calculate height information according to different terrains, to improve measurement accuracy. Besides, compared with a depth camera, the binocular camera further has advantages of low costs.

In some possible implementations, in an embodiment of the flight height information obtaining method provided in this embodiment of the present disclosure, before the obtaining a first depth image according to the first real-time image, and obtaining a second depth image according to the second real-time image, the method further may include:

disposing the first camera and the second camera on a same horizontal line of the aircraft within a preset camera distance range.

Figure 20:
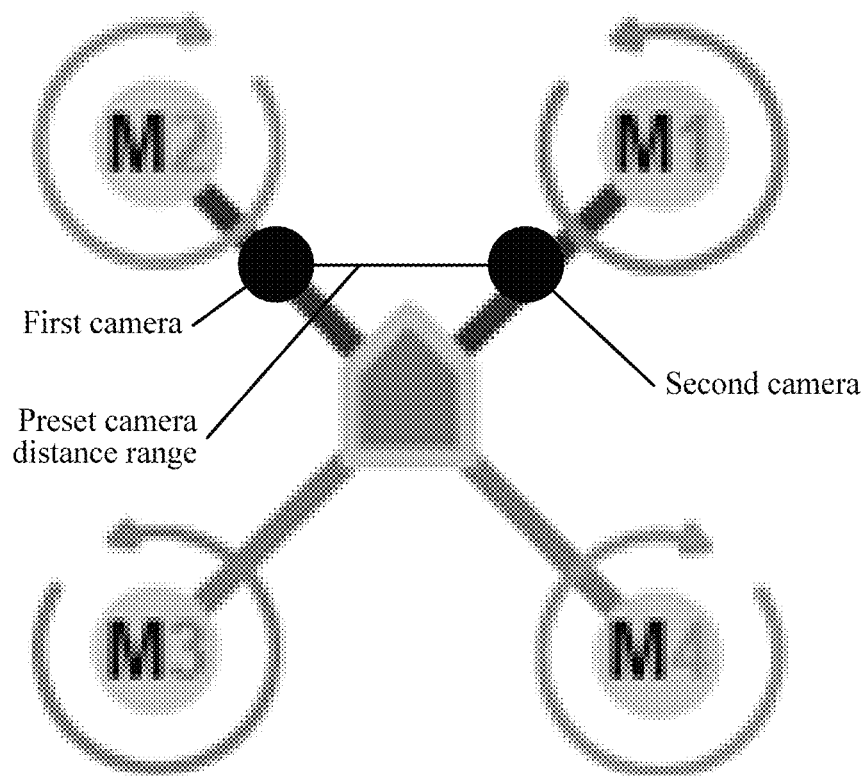
FIG. 20 is a schematic diagram of an aircraft equipped with a binocular camera according to an embodiment of the present disclosure.

In this embodiment, referring to FIG. 20, FIG. 20 is a schematic diagram of an aircraft equipped with a binocular camera according to an embodiment of the present disclosure. As shown in FIG. 20, a first camera and a second camera need to be installed on a same horizontal line of an aircraft, and it is ensured that an interval between the first camera and the second camera satisfies a preset camera distance range. Locations of the two cameras in FIG. 20 are only an example and should not be understood as a limitation on the solution.

It should be noted that the preset camera distance range is usually 6 centimeters to 10 centimeters. In an actual application, some adjustments may be made, and this is not limited herein.

However, because two installed cameras cannot mathematically implement a precisely same horizontal line in an actual application, stereo calibration needs to be performed on the two cameras, and a Zhengyou Zhang calibration method may be used in stereo calibration.

In this process, five intrinsic parameters, three extrinsic parameters, and two distortion coefficients having high estimation precision may be obtained. The information may be used to perform distortion correction, image correction, and final three-dimensional information recovery.

Parameters that the binocular camera needs to calibrate include, but are not limited to, a parameter matrix, a distortion coefficient matrix, an essential matrix, a basic matrix, a rotation matrix, and a translation matrix in the camera. The parameter matrix and the distortion coefficient matrix in the camera may be calibrated by using a single target calibration method. A most important difference between binocular camera calibration and monocular camera calibration is that the binocular camera needs to calibrate a relative relationship between coordinate systems of the left and right cameras.

In this embodiment, the binocular camera located vertically downward needs to be installed on the same horizontal line, and a distance between the two cameras is within the preset camera distance range. In the foregoing installation manner, the first camera and the second camera can both shoot real-time images satisfying requirements. If the interval between the two cameras is excessively small, it is difficult to obtain proper depth information and positioning information. If the interval between the two cameras is excessively large, a nearby object cannot be shot, and there is no reference object. Therefore, a more proper image may be obtained by using the preset camera distance range.

In some possible implementations, in another embodiment of the flight height information obtaining method provided in this embodiment of the present disclosure, the obtaining, by the aircraft, a first depth image according to the first real-time image, and obtaining a second depth image according to the second real-time image, the method may include:

performing, by the aircraft, scaling processing on the first real-time image and the second real-time image according to a preset image specification; and performing, by the aircraft by using an intrinsic parameter and an extrinsic parameter acquired in advance, image correction on the first real-time image and the second real-time image on which scaling processing has been performed, to obtain the first depth image and the second depth image.

In this embodiment, in a process in which the aircraft converts the first real-time image and the second real-time image to the first depth image and the second depth image, the following two steps further may be performed. Specifics are as follows:

When the aircraft calculates the flight height information by using binocular vision, generally, no highly precise image is required. Therefore, the real-time images collected by the binocular camera are first scaled according to a preset image specification. For example, the preset image specification may be 320×240, where 320×240 is a resolution, 240 indicates 240 pixels, and 320 indicates 320 pixels. Because there is a disparity between the left and right cameras, and the edges of the left and right real-time images cannot match either, during processing, the edges of the first real-time image and the second real-time image may be further tailored according to pixels, for example, 20 pixels are cut off from each of the edges. In an actual application, other proper pixels further may be cut off, and this is not limited herein.

Next, image correction may be further performed on the first real-time image and the second real-time image on which scaling processing has been performed. Image correction includes image distortion correction and image alignment correction. Image correction can be implemented by using the intrinsic parameter and the extrinsic parameter obtained after calibrating the camera. The first depth image and the second depth image are obtained after correction, and the first depth image and the second depth image may both be images used to calculate the depth value.

In this embodiment, after obtaining the first real-time image and the second real-time image, the aircraft further should process the first real-time image and the second real-time image. The aircraft first needs to scale the first real-time image and the second real-time image according to a preset image specification, and perform, by using the intrinsic parameter and the extrinsic parameter acquired in advance, image correction on the first real-time image and the second real-time image on which scaling processing has been performed. In the foregoing manner, scaling and tailoring of a real-time image may alleviate mismatch of the edges of the images, and further may reduce a calculation amount of vision processing, to improve processing efficiency. Besides, the real-time images are corrected to obtain images on the same horizontal plane to improve image processing accuracy.

In some possible implementations, in another embodiment of the flight height information obtaining method provided in this embodiment of the present disclosure, the performing, by the aircraft by using an intrinsic parameter and an extrinsic parameter acquired in advance, image correction on the first real-time image and the second real-time image on which scaling processing has been performed may include:

performing, by the aircraft by using the intrinsic parameter acquired in advance, distortion compensation on the first real-time image and the second real-time image on which scaling processing has been performed, where the intrinsic parameter includes a barrel distortion parameter and a tangential distortion parameter of the first camera, and a barrel distortion parameter and a tangential distortion parameter of the second camera; and performing, by the aircraft by using the extrinsic parameter acquired in advance, rotation and translation on the first real-time image and the second real-time image on which scaling processing has been performed, where the extrinsic parameter includes a translation parameter and a rotation parameter of the first camera, and a translation parameter and a rotation parameter of the second camera; and In this embodiment, that the aircraft may perform image correction on the real-time images by using the intrinsic parameter and the extrinsic parameter includes:

performing, by the aircraft by using the intrinsic parameter, distortion compensation on the first real-time image and the second real-time image on which scaling processing has been performed, where the intrinsic parameter is a parameter obtained by calibrating a single camera of the binocular camera, the first camera is calibrated to obtain a barrel distortion parameter and a tangential distortion parameter of the first camera, and the second camera is calibrated to obtain a barrel distortion parameter and a tangential distortion parameter of the second camera; and respectively performing distortion correction on the first real-time image by using the barrel distortion parameter and the tangential distortion parameter of the first camera, and performing distortion correction on the second real-time image by using the barrel distortion parameter and the tangential distortion parameter of the second camera.

An even grid is placed in an object plane and is illuminated as an object. If a stop is placed between the object and a lens, it may be learned that a magnification far away from an optical axis region is less than that near an optical axis, and an outside protrusion scene in an image plane shown in the figure is referred to as the barrel distortion. The tangential distortion is a change of an endpoint of a vector along a direction of a tangent line.

Alignment correction is performed, by using the extrinsic parameter, on the first real-time image and the second real-time image on which scaling processing has been performed. By performing stereo calibration on the first camera and the second camera, the rotation matrix and the translation matrix of the two cameras are extrinsic parameters, where a rotation parameter is the rotation matrix, and a translation parameter is the translation matrix.

In this embodiment, how to perform image correction on the real-time image is specifically described. That is, distortion compensation is performed, by using the intrinsic parameter acquired in advance, on the first real-time image and the second real-time image on which scaling processing has been performed, and rotation and translation is performed, by using the extrinsic parameter acquired in advance, on the first real-time image and the second real-time image on which scaling processing has been performed. In the foregoing manner, correction and alignment may be performed on the real-time images according to the intrinsic parameter and the extrinsic parameter obtained by calibrating the camera, so that the real-time images satisfy a requirement of being on the same horizontal line in mathematical meanings, to help the images obtained by the two cameras to blend in subsequent processing, to obtain the target blended image.

In some possible implementations, in still another embodiment of the flight height information obtaining method provided in this embodiment of the present disclosure, the determining, by the aircraft, a target blended image according to the first depth image and the second depth image may include:

determining, by the aircraft, a disparity between the first depth image and the second depth image by using a stereoscopic vision algorithm; and blending, by the aircraft, the first depth image and the second depth image to form the target blended image according to the disparity.

In this embodiment, as can be known from content described in the embodiment, a depth image is obtained after performing processing on the real-time image, that is, depth images may be blended to obtain the required target blended image.

It should be noted that in depth value calculation by using binocular vision, a disparity between corresponding points of the left and right images need to be first obtained. When a same object in actual space is projected to the left and right cameras, locations of the object are different. When a same point in actual space is projected to a camera, there is a pixel location, pixel locations of the left and right cameras have an offset value, that is, a disparity.

Figure 21:
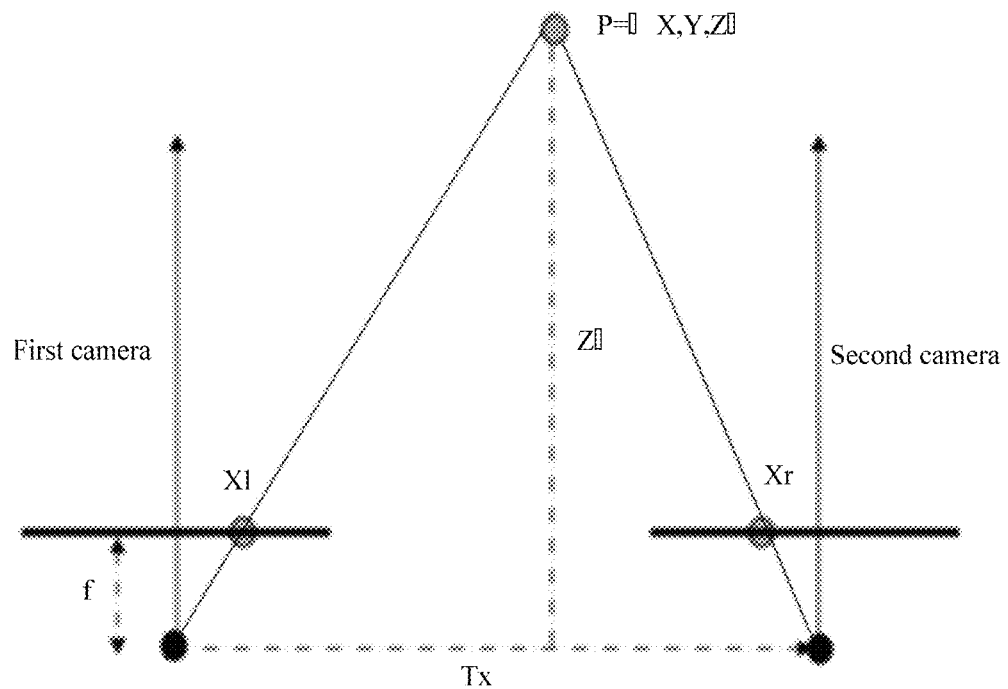
FIG. 21 is a schematic diagram of obtaining a disparity between left and right images according to an embodiment of the present disclosure.

Referring to FIG. 21, FIG. 21 is a schematic diagram of obtaining a disparity between left and right images according to an embodiment of the present disclosure. As shown in FIG. 21, projections of a physical point P (X,Y,Z) respectively are Xl and Xr in the left and right cameras. Because the binocular vision requires a same horizontal line, values of Y are all the same, and the disparity is d=Xl−Xr.

As shown in FIG. 21, in an open source computer vision library (OpenCV), a parameter off is a number of pixels, and a dimension of Tx depends on an actual size of a calibration template checkerboard and a value inputted by a user. Generally, millimeter is used as a unit (certainly, to improve precision, an order of magnitude of 0.1 millimeter may be set), and a dimension of d=Xl−Xr is also a pixel. Therefore, when reduction is performed on a numerator and a denominator, a dimension of Z is the same as that of T, and d and Z satisfy the following relationship:

$$\frac{Tx-(Xl-Xr)}{Z-f} = \frac{T}{Z} \Rightarrow Z = \frac{fT}{Xl-Xr} \Rightarrow Z = \frac{fT}{d}.$$

A semi-global matching and mutual information (SGBM) algorithm provided by OpenCV is used to calculate the disparity between the first depth image and the second depth image, and then, the first depth image and the second depth image may be blended according to the disparity to obtain the target blended image.

In this embodiment, a process of determining the target blended image by the aircraft further includes, first determining the disparity between the first depth image and the second depth image by using a stereoscopic vision algorithm, and then blending the first depth image and the second depth image to form the target blended image according to the disparity. In the foregoing manner, the target blended image may be obtained by blending according to the calculated disparity, to improve accuracy of the target blended image.

In some possible implementations, in still another embodiment of the flight height information obtaining method provided in this embodiment of the present disclosure, the determining, by the aircraft, a depth value corresponding to each preset region in the target blended image may include:

determining, by the aircraft, a depth value of each pixel in the target blended image according to the disparity; and separately determining, by the aircraft according to the depth value of each pixel, the depth value corresponding to each preset region.

In this embodiment, the aircraft further may use the obtained disparity of each pixel to determine the depth value of each pixel in the target blended image, and the depth value corresponding to each preset region is calculated according to the depth value of each pixel.

In an example, a binocular vision module may be used by the aircraft to obtain depth values (a unit is a physical value unit, for example, meter) of all pixels in the image. Because terrains are complex, it is impossible that the image has a same depth value. Therefore, the image is divided into multiple grids, that is, divided into multiple preset regions, for example, 6×6 grids. A depth value is separately calculated for each grid.

The depth value of each grid is calculated by using median average filtering. For example, first 5% of maximum values and last 5% of minimum values may be removed from depth values of all effective points in the grid, and an average is obtained. When the grid is divided to be sufficiently small, an obtained average may accurately describe a height of a terrain.

In this embodiment, the aircraft may specifically determine the depth value corresponding to each preset region in the target blended image in two steps: first determining the depth value of each pixel in the target blended image according to the disparity, and then respectively determining the depth value corresponding to each preset region according to the depth value of each pixel. In the method, the depth value corresponding to each preset region is predicted by using the depth value of the pixel used as a minimum unit, and the obtained depth value corresponding to each preset region is more accurate, to improve feasibility and practicality of the solution.

In some possible implementations, in still another embodiment of the flight height information obtaining method provided in this embodiment of the present disclosure, the determining, by the aircraft, a depth value of each pixel in the target blended image according to the disparity may include:

calculating the depth value of each pixel according to the following manner:

$$[X\ Y\ Z\ W]^T = Q \times [x\ y\ \text{disparity}(x,y)\ 1]^T, \text{ and } Z_{(x,y)} = Z/W.$$

x indicates horizontal coordinates formed when a pixel is projected in the target blended image in three-dimensional space, y indicates vertical coordinates formed when a pixel is projected in the target blended image in three-dimensional space, disparity(x,y) indicates a disparity at a pixel (x,y), Q indicates a disparity-to-depth mapping matrix, $[X\ Y\ Z\ W]^T$ indicates a target matrix, $[X\ Y\ Z\ W]$ is a transposed matrix of the target matrix, $Z_{(x,y)}$ indicates a depth value of the pixel (x,y), Z is a submatrix formed by the third column of the transposed matrix, and W is a submatrix formed by the fourth column of the transposed matrix.

In this embodiment, for the depth value, matrix multiplication is performed by using a disparity and a disparity-to-depth mapping matrix to obtain an actual three-dimensional point location. A calculation formula thereof is as follows:

$$[X\ Y\ Z\ W]^T = Q \times [x\ y\ \text{disparity}(x,y)\ 1]^T$$

x and y are projection coordinates of an actual point in three-dimensional space in the image, and a unit is pixel. disparity(x,y) indicates a disparity at a pixel (x,y), and the matrix Q is the disparity-to-depth mapping matrix and is calculated by using the intrinsic parameter and the extrinsic parameter of the camera. In this solution, a stereorectify function provided by OpenCV is used to obtain the mapping matrix. $[X\ Y\ Z\ W]^T$ obtained by matrix multiplication is homogeneous coordinates of an actual three-dimensional point, and an actual depth value thereof is $Z_{(x,y)} = Z/W$.

To precisely obtain a distance Z of a point in three-dimensional space, parameters that need to be obtained include a focal length f, a disparity d, and a center distance Tx of the camera. If a coordinate X and a coordinate Y further need to be obtained, offsets cx and cy of origins in coordinate systems of left and right image planes and a stereo coordinate system need to be further learned. Initial values of f, Tx, cx, and cy may be obtained by stereo calibration. By stereo alignment and optimization, the two cameras are completely placed in parallel mathematically, and cx, cy, and f of the left and right cameras are the same. In stereo matching, the last variable, that is, a disparity d is obtained on the foregoing basis. Preparations required for obtaining three-dimensional coordinates of a point are finally completed.

Figure 22:
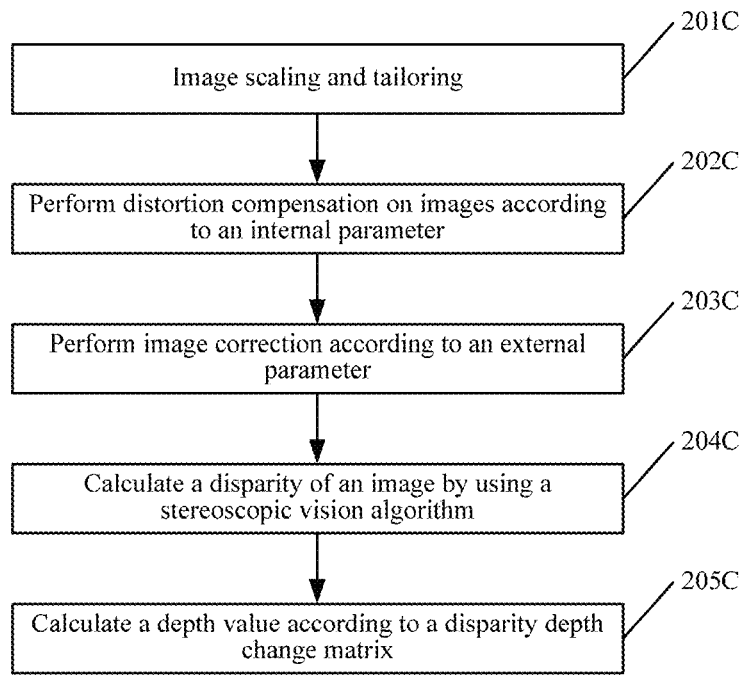
FIG. 22 is a schematic flowchart of obtaining an image depth value according to an embodiment of the present disclosure.

For ease of description, referring to FIG. 22, FIG. 22 is a schematic flowchart of obtaining an image depth value according to an embodiment of the present disclosure. What is shown in FIG. 22 is as follows:

Step 201C: The aircraft first scales and tailors collected real-time images corresponding to the left and right eyes, to obtain images having particular pixel sizes.

Step 202C: The aircraft calibrates a single camera to obtain the intrinsic parameter, and performs distortion compensation on the real-time image by using the intrinsic parameter.

Step 203C: The aircraft performs stereo calibration on the binocular camera to obtain the extrinsic parameter, and performs alignment correction on the real-time image by using the extrinsic parameter. Step 201 and step 202 are used to perform initial processing on the real-time image, to obtain a depth image that may be used to calculate the depth value.

Step 204C: The aircraft uses an SGBM algorithm provided by OpenCV to implement image point matching and disparity calculation.

Step 205C: The aircraft uses a disparity depth conversion matrix to calculate a depth value of the image.

In this embodiment, a method for calculating the depth value of each pixel in the target blended image according to the disparity is described, and a related formula may be used to calculate a required result, to improve practicality and feasibility of the solution and operability of the solution.

In some possible implementations, in still another embodiment of the flight height information obtaining method provided in this embodiment of the present disclosure, the obtaining, by the aircraft, the flight height information according to the depth value corresponding to each preset region and the current flight posture information of the aircraft may include:

calculating the flight height information according to the following manner:

$$\beta = \arctan \frac{1}{\sqrt{\tan^2 \alpha + \tan^2 \gamma}}; \text{ and}$$

$$h = d \sin \beta.$$

β indicates an oblique angle formed by the ground and a normal line of the aircraft, α indicates a roll angle in the current flight posture information, γ indicates a pitch angle in the current flight posture information, d indicates the depth value corresponding to each preset region, and h indicates the flight height information.

In this embodiment, when the aircraft flies, the camera located vertically downward is not perpendicular to the ground, and therefore a slanting angle β exists between the ground and a normal line of the camera on the body of the aircraft. Therefore, trigonometric function conversion further needs to be performed on the depth value d of the image to obtain an actual height value h of each grid. A calculation formula thereof is as follows:

$$h = d \sin \beta$$

A pitch angle γ and a roll angle α of the aircraft may be obtained from the control module of the aircraft, and the angle β may be calculated by using the following formula:

$$\beta = \arctan \frac{1}{\sqrt{\tan^2 \alpha + \tan^2 \gamma}}.$$

After height values of all preset regions are calculated, the values are sent to the control module of the aircraft for processing.

In this embodiment, a method for calculating the flight height information according to the depth value corresponding to each preset region and the current flight posture information of the aircraft is described, that is, a related formula may be used to calculate a required result, to improve practicality and feasibility of the solution and operability of the solution.

Figure 23:
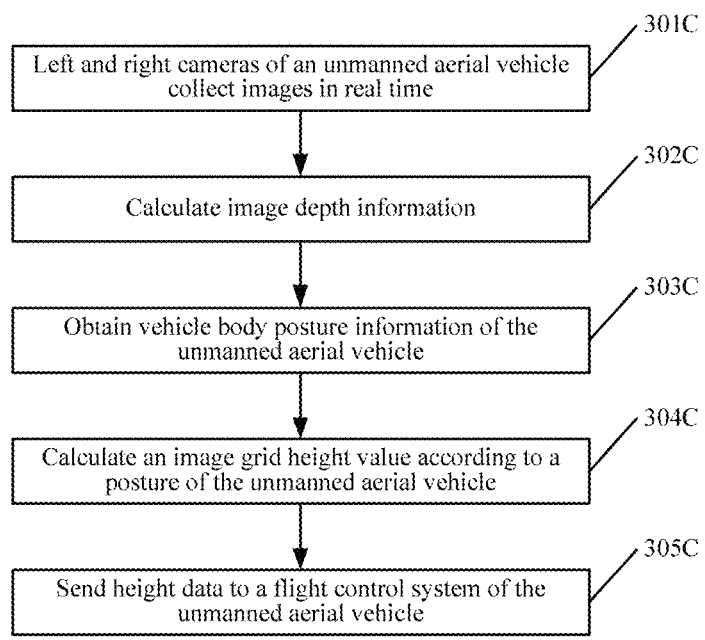
FIG. 23 is a schematic diagram of a working procedure of a binocular camera in an application scenario.

For ease of understanding, the following uses a specific application scenario to describe a flight positioning information obtaining method in the present disclosure in detail. Referring to FIG. 23, FIG. 23 is a schematic diagram of a working procedure of a binocular camera in an application scenario. The procedure includes:

Step 301C: An unmanned aerial vehicle respectively collects real-time images of left and right eyes by using a binocular camera located vertically downward and equipped on the unmanned aerial vehicle.

Step 302C: Next, perform image scaling and tailoring and image correction processing on real-time images of the left and right eyes to obtain depth images, perform disparity processing on the depth images of the left and right eyes to obtain a target blended image, and calculate a depth value of each pixel in the target blended image.

Step 303C: Obtain current body posture information of the unmanned aerial vehicle, where information such as a pitch angle and a roll angle is used.

Step 304C: Calculate a height value of the unmanned aerial vehicle by using a current attitude angle of the unmanned aerial vehicle and an image depth value. Because terrains on the ground may be very complex, it is impossible that a single height value is obtained. Therefore, the image is divided into multiple grids, and heights in the grids are separately calculated, to obtain rough terrain height values.

Step 305C: Finally, send the group of height values to a flight control system of the unmanned aerial vehicle.

Figure 24:
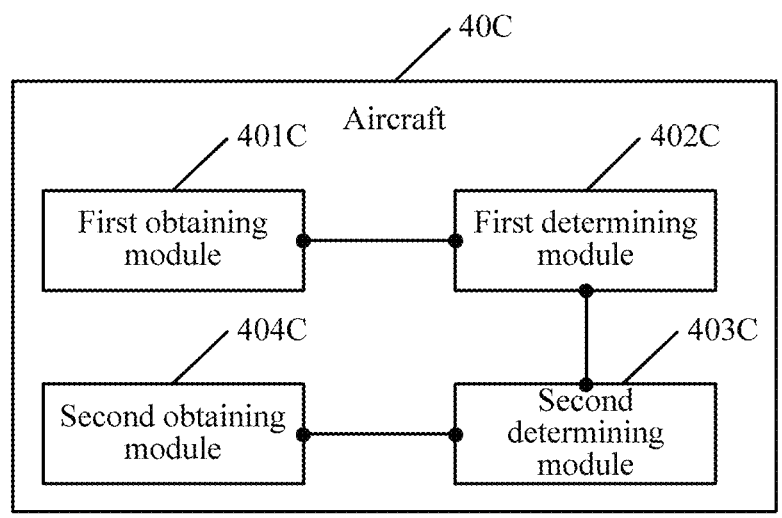
FIG. 24 is a schematic diagram of an embodiment of an aircraft according to an embodiment of the present disclosure.

The following describes an aircraft in an embodiment of the present disclosure in detail. Referring to FIG. 24, the aircraft in this embodiment of the present disclosure includes a first camera and a second camera, the first camera is configured to obtain a first real-time image, and the second camera is configured to obtain a second real-time image. The aircraft 40C includes:

a first obtaining module 401C, configured to: obtain a first depth image according to the first real-time image, and obtain a second depth image according to the second real-time image;

a first determining module 402C, configured to determine a target blended image according to the first depth image and the second depth image obtained by the first obtaining module 401, where the target blended image includes at least one preset region;

a second determining module 403C, configured to determine a depth value corresponding to each preset region in the target blended image obtained by the first determining module 402; and a second obtaining module 404C, configured to obtain flight height information according to the depth value corresponding to each preset region determined by the second determining module 403 and current flight posture information of the aircraft.

In this embodiment, the aircraft includes the first camera and the second camera, the first camera is configured to obtain the first real-time image, and the second camera is configured to obtain the second real-time image. The first obtaining module 401C obtains a first depth image according to the first real-time image, and obtains a second depth image according to the second real-time image. The first determining module 402C determines a target blended image according to the first depth image and the second depth image obtained by the first obtaining module 401C, where the target blended image includes at least one preset region. The second determining module 403C determines a depth value corresponding to each preset region in the target blended image obtained by the first determining module 402C. The second obtaining module 404C obtains flight height information according to the depth value corresponding to each preset region determined by the second determining module 403C and current flight posture information of the aircraft.

In this embodiment, the aircraft includes the first camera and the second camera, the first camera obtains the first real-time image, and the second camera obtains the second real-time image. A specific process may be: the aircraft obtains a first depth image according to the first real-time image, and obtains a second depth image according to the second real-time image; the target blended image is determined according to the first depth image and the second depth image; and the aircraft may determine the depth value corresponding to each preset region in the target blended image, and finally obtain the flight height information according to the depth value corresponding to each preset region and the current flight posture information of the aircraft. In the foregoing manner, the height information of the aircraft is measured by using the binocular camera. Compared with height information measurement by a barometer, decrease of precision of height information measurement caused because the aircraft is affected by air flows is avoided. Besides, the binocular camera may obtain various complex terrains, and calculate height information according to different terrains, to improve measurement accuracy. Besides, compared with a depth camera, the binocular camera further has advantages of low costs.

Figure 25:
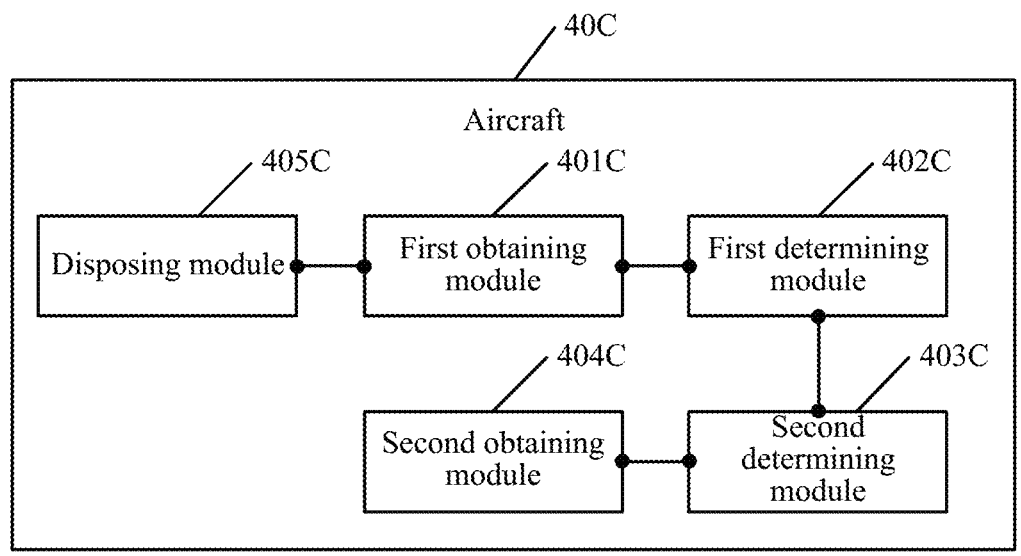
FIG. 25 is a schematic diagram of another embodiment of an aircraft according to an embodiment of the present disclosure.

In some possible implementations, referring to FIG. 25, in another embodiment of the aircraft provided in this embodiment of the present disclosure, the aircraft 40C further includes:

a disposing module 405C, configured to: before the first obtaining module 401C obtains the first depth image according to the first real-time image, and obtains the second depth image according to the second real-time image, dispose the first camera and the second camera on a same horizontal line of the aircraft within a preset camera distance range.

In this embodiment, the binocular camera located vertically downward needs to be installed on the same horizontal line, and a distance between the two cameras is within the preset camera distance range. In the foregoing installation manner, the first camera and the second camera can both shoot real-time images satisfying requirements. If the interval between the two cameras is excessively small, it is difficult to obtain proper depth information and positioning information. If the interval between the two cameras is excessively large, a nearby object cannot be shot, and there is no reference object. Therefore, a more proper image may be obtained by using the preset camera distance range.

Figure 26:
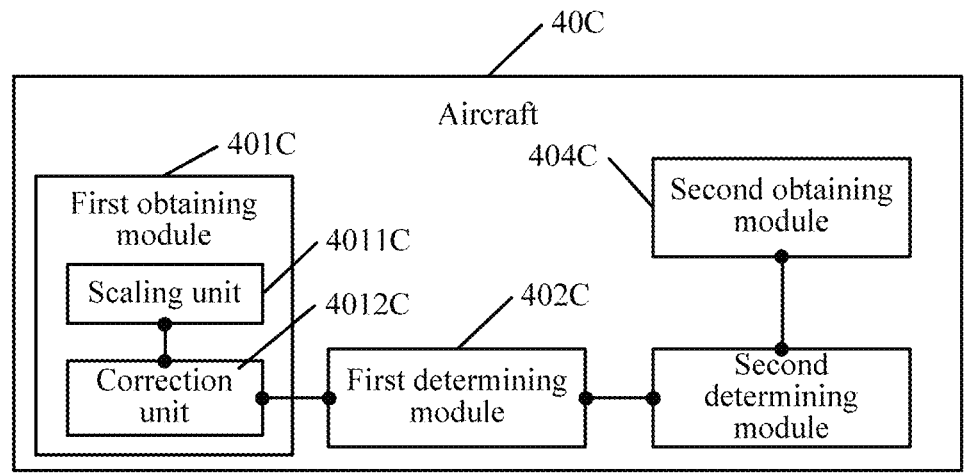
FIG. 26 is a schematic diagram of another embodiment of an aircraft according to an embodiment of the present disclosure.

In some possible implementations, referring to FIG. 26, in another embodiment of the aircraft provided in this embodiment of the present disclosure, the first obtaining module 401C includes:

a scaling unit 4011C, configured to perform scaling processing on the first real-time image and the second real-time image according to a preset image specification; and a correction unit 4012C, configured to perform, by using an intrinsic parameter and an extrinsic parameter acquired in advance, image correction on the first real-time image and the second real-time image on which the scaling unit 4011C has performed scaling processing, to obtain the first depth image and the second depth image.

In this embodiment, after obtaining the first real-time image and the second real-time image, the aircraft further should process the first real-time image and the second real-time image. The aircraft first needs to scale the first real-time image and the second real-time image according to a preset image specification, and perform, by using the intrinsic parameter and the extrinsic parameter acquired in advance, image correction on the first real-time image and the second real-time image on which scaling processing has been performed. In the foregoing manner, scaling and tailoring of a real-time image may alleviate mismatch of the edges of the images, and further may reduce a calculation amount of vision processing, to improve processing efficiency. Besides, the real-time images are corrected to obtain images on the same horizontal plane to improve image processing accuracy.

Figure 27:
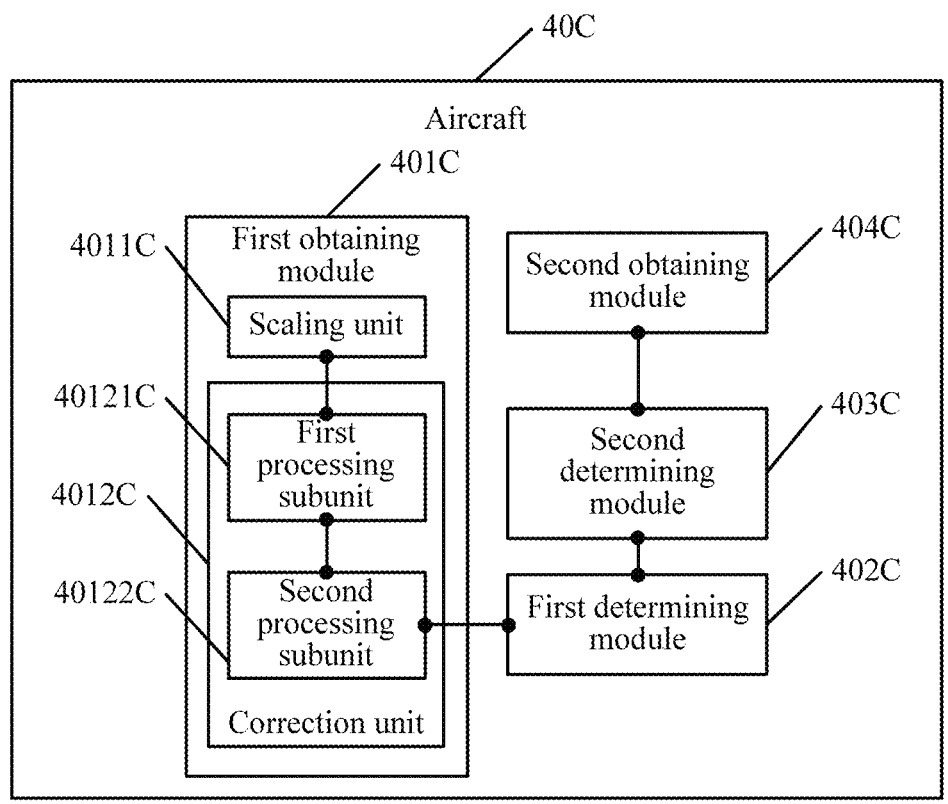
FIG. 27 is a schematic diagram of another embodiment of an aircraft according to an embodiment of the present disclosure.

In some possible implementations, referring to FIG. 27, in another embodiment of the aircraft provided in this embodiment of the present disclosure, the correction unit 4012C includes:

a first processing subunit 40121C, configured to perform, by using the intrinsic parameter acquired in advance, distortion compensation on the first real-time image and the second real-time image on which scaling processing has been performed, where the intrinsic parameter includes a barrel distortion parameter and a tangential distortion parameter of the first camera, and a barrel distortion parameter and a tangential distortion parameter of the second camera; and a second processing subunit 40122C, configured to perform, by using the extrinsic parameter acquired in advance, rotation and translation on the first real-time image and the second real-time image on which scaling processing has been performed, where the extrinsic parameter includes a translation parameter and a rotation parameter of the first camera, and a translation parameter and a rotation parameter of the second camera.

In this embodiment, how to perform image correction on the real-time image is specifically described. That is, distortion compensation is performed, by using the intrinsic parameter acquired in advance, on the first real-time image and the second real-time image on which scaling processing has been performed, and rotation and translation is performed, by using the extrinsic parameter acquired in advance, on the first real-time image and the second real-time image on which scaling processing has been performed. In the foregoing manner, correction and alignment may be performed on the real-time images according to the intrinsic parameter and the extrinsic parameter obtained by calibrating the camera, so that the real-time images satisfy a requirement of being on the same horizontal line in mathematical meanings, to help the images obtained by the two cameras to blend in subsequent processing, to obtain the target blended image.

Figure 28:
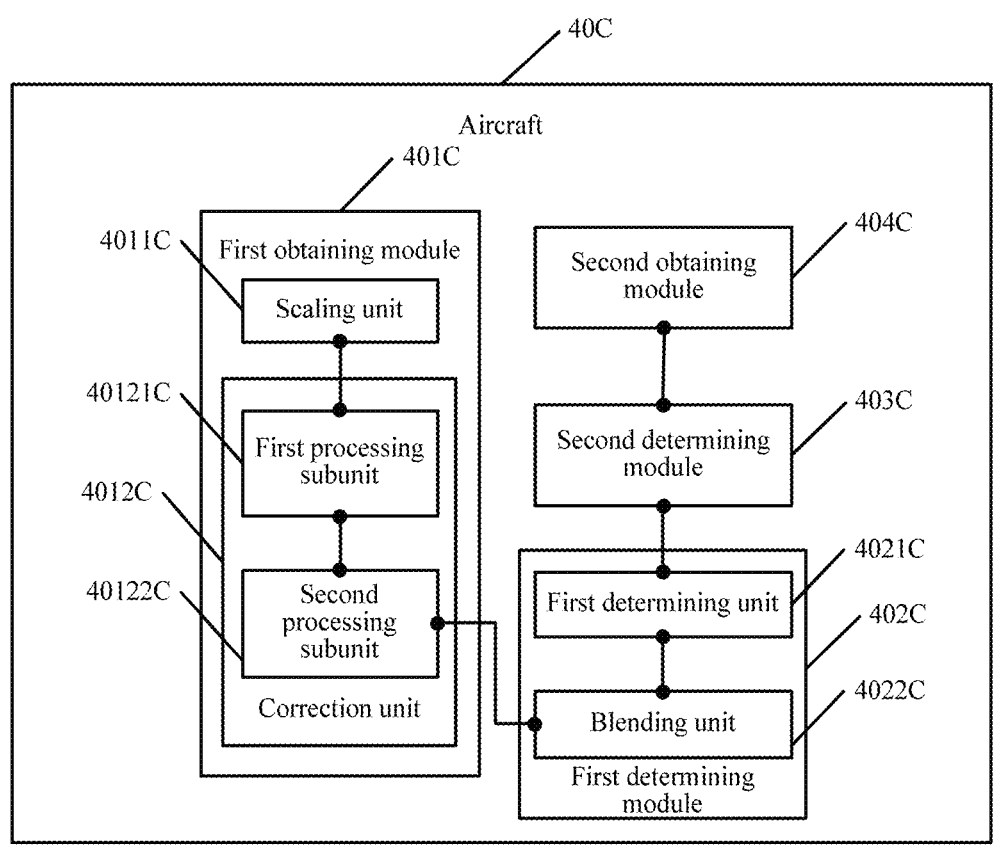
FIG. 28 is a schematic diagram of another embodiment of an aircraft according to an embodiment of the present disclosure.

In some possible implementations, referring to FIG. 28, in another embodiment of the aircraft provided in this embodiment of the present disclosure, the first determining module 402C includes:

a first determining unit 4021C, configured to determine a disparity between the first depth image and the second depth image by using a stereoscopic vision algorithm; and a blending unit 4022C, configured to blend the first depth image and the second depth image to form the target blended image according to the disparity determined by the first determining unit 4021C.

In this embodiment, a process of determining the target blended image by the aircraft further includes, first determining the disparity between the first depth image and the second depth image by using a stereoscopic vision algorithm, and then blending the first depth image and the second depth image to form the target blended image according to the disparity. In the foregoing manner, the target blended image may be obtained by blending according to the calculated disparity, to improve accuracy of the target blended image.

Figure 29:
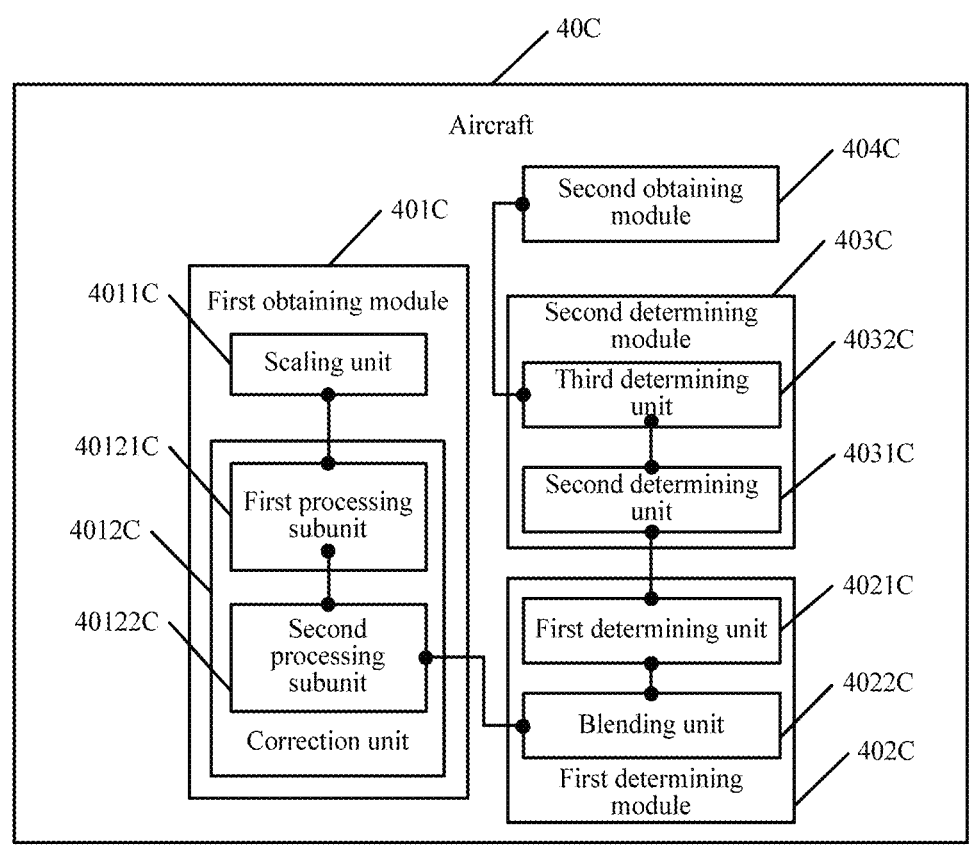
FIG. 29 is a schematic diagram of another embodiment of an aircraft according to an embodiment of the present disclosure.

In some possible implementations, referring to FIG. 29, in another embodiment of the aircraft provided in this embodiment of the present disclosure, the second determining module 403C includes:

a second determining unit 4031C, configured to determine a depth value of each pixel in the target blended image according to the disparity; and a third determining unit 4032C, configured to separately determine, according to the depth value of each pixel determined by the second determining unit 4031, the depth value corresponding to each preset region.

In this embodiment, the aircraft may specifically determine the depth value corresponding to each preset region in the target blended image in two steps: first determining the depth value of each pixel in the target blended image according to the disparity, and then respectively determining the depth value corresponding to each preset region according to the depth value of each pixel. In the method, the depth value corresponding to each preset region is predicted by using the depth value of the pixel used as a minimum unit, and the obtained depth value corresponding to each preset region is more accurate, to improve feasibility and practicality of the solution.

Figure 30:
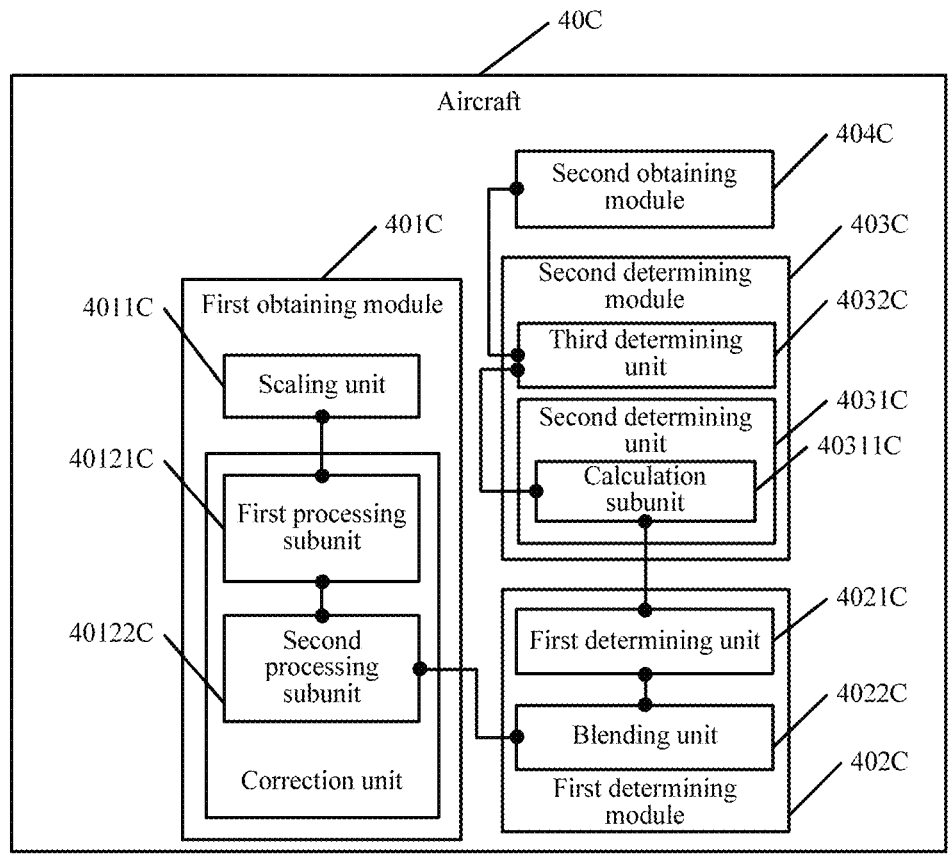
FIG. 30 is a schematic diagram of another embodiment of an aircraft according to an embodiment of the present disclosure.

In some possible implementations, referring to FIG. 30, in another embodiment of the aircraft provided in this embodiment of the present disclosure, the second determining unit 4031C includes:

a calculation subunit 40311C, configured to calculate the depth value of each pixel according to the following manner:

$[X\ Y\ Z\ W]^T = Q \times [x\ y\ \text{disparity}(x,y)1]^T$, and $Z_{(x,y)} = Z/W$ x indicates horizontal coordinates formed when a pixel is projected in the target blended image in three-dimensional space, y indicates vertical coordinates formed when a pixel is projected in the target blended image in three-dimensional space, disparity(x,y) indicates a disparity at a pixel (x,y), Q indicates a disparity-to-depth mapping matrix, $[X\ Y\ Z\ W]^T$ indicates a target matrix, [X Y Z W] is a transposed matrix of the target matrix, $Z_{(x,y)}$ indicates a depth value of the pixel (x,y), Z is a submatrix formed by the third column of the transposed matrix, and W is a submatrix formed by the fourth column of the transposed matrix.

In this embodiment, a method for calculating the depth value of each pixel in the target blended image according to the disparity is described, and a related formula may be used to calculate a required result, to improve practicality and feasibility of the solution and operability of the solution.

Figure 31:
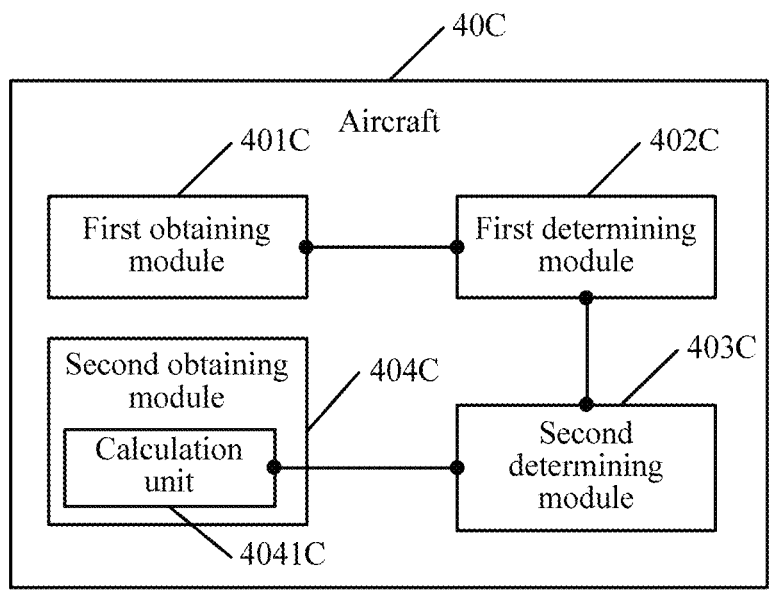
FIG. 31 is a schematic diagram of another embodiment of an aircraft according to an embodiment of the present disclosure.

In some possible implementations, referring to FIG. 31, in another embodiment of the aircraft provided in this embodiment of the present disclosure, the second obtaining module 404C includes:

a calculation unit 4041C, configured to calculate the flight height information according to the following manner:

$$\beta = \arctan \frac{1}{\sqrt{\tan^2 \alpha + \tan^2 \gamma}}; \text{ and}$$

$$h = d \sin \beta.$$

β indicates an oblique angle formed by the ground and a normal line of the aircraft, α indicates a roll angle in the current flight posture information, γ indicates a pitch angle in the current flight posture information, d indicates the depth value corresponding to each preset region, and h indicates the flight height information.

In this embodiment, a method for calculating the flight height information according to the depth value corresponding to each preset region and the current flight posture information of the aircraft is described, that is, a related formula may be used to calculate a required result, to improve practicality and feasibility of the solution and operability of the solution.

In addition, an embodiment of the present disclosure further provides a device, including:

a processor and a memory;

the memory is configured to: store program code, and transmit the program code to the processor; and the processor is configured to perform the aircraft obstacle detection method, the flight positioning information obtaining method, and the flight height information obtaining method according to an instruction in the program code.

In addition, an embodiment of the present disclosure further provides a storage medium, where the storage medium is configured to store program code, and the program code is used to perform the aircraft obstacle detection method, the flight positioning information obtaining method, and the flight height information obtaining method.

In addition, an embodiment of the present disclosure further provides a computer program product including an instruction, where when the computer program product runs on a computer, the computer is caused to perform the aircraft obstacle detection method, the flight positioning information obtaining method, and the flight height information obtaining method.

Figure 32:
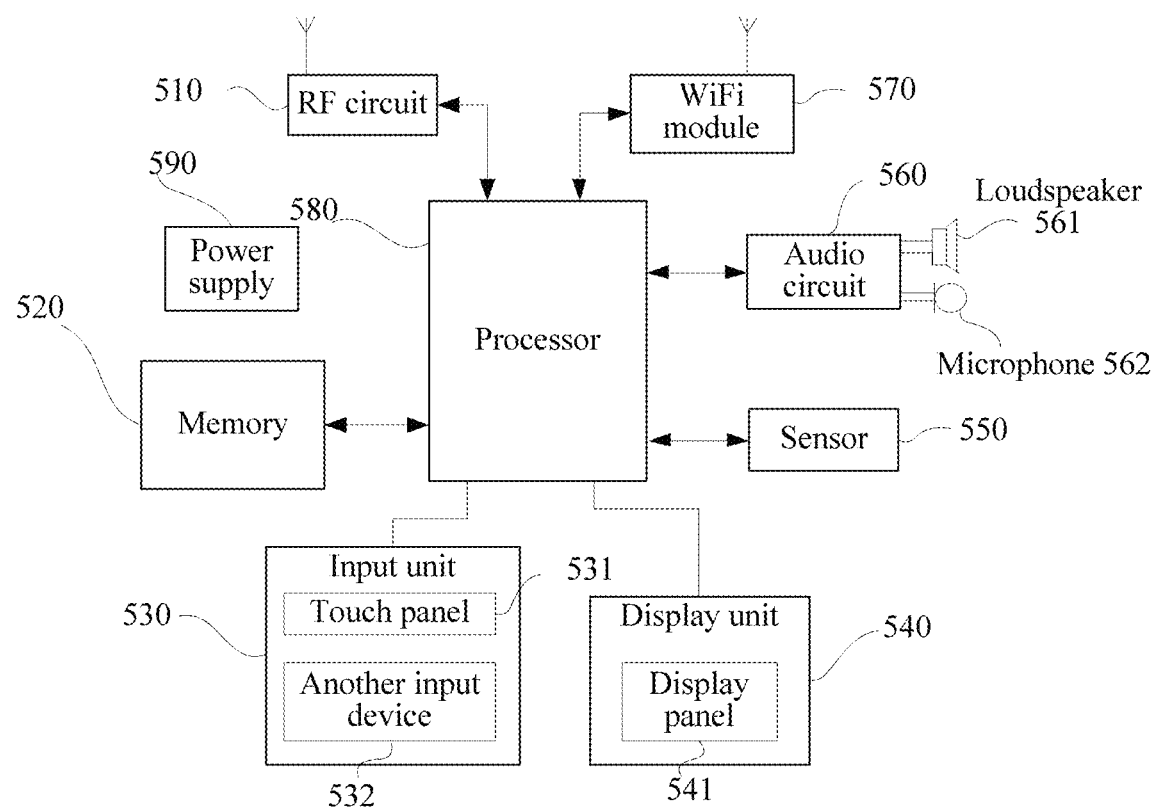
FIG. 32 is a schematic structural diagram of an aircraft according to an embodiment of the present disclosure.

Besides, the embodiment of the present disclosure further provides another aircraft, as shown in FIG. 32, and for convenience of description, only parts related to the embodiment of the present disclosure relevant are shown. For specific technical details that are not disclosed, refer to the method part of the embodiments of the present disclosure. An example in which the aircraft is an unmanned aerial vehicle is used.

FIG. 32 is a structural block diagram of a part of an unmanned aerial vehicle related to an aircraft according to an embodiment of the present disclosure. Referring to FIG. 32, the unmanned aerial vehicle includes components such as a radio frequency (RF) circuit 510, a memory 520, an input unit 530, a display unit 540, a sensor 550, an audio circuit 560, a wireless fidelity (WiFi) module 570, a processor 580, and a power supply 590. A person skilled in the art may understand that the structure of the unmanned aerial vehicle shown in FIG. 13 does not constitute a limitation to the unmanned aerial vehicle, and the unmanned aerial vehicle may include more components or fewer components than those shown in the figure, or some components may be combined, or a different component deployment may be used.

The following specifically describes the components of the unmanned aerial vehicle with reference to FIG. 32.

The RF circuit 510 may be configured to receive and send a signal during an information receiving and sending process or a call process. Specifically, the RF circuit receives downlink information from an aircraft control apparatus, then delivers the downlink information to the processor 580 for processing, and sends related uplink data to the aircraft control apparatus. Generally, the RF circuit 510 includes, but is not limited to, an antenna, at least one amplifier, a transceiver, a coupler, a low noise amplifier (LNA), and a duplexer. In addition, the RF circuit 510 may also communicate with a network and another device by wireless communication. The wireless communication may use any communication standard or protocol, which includes, but is not limited to, Global System for Mobile communications (GSM), General Packet Radio Service (GPRS), Code Division Multiple Access (CDMA), Wideband Code Division Multiple Access (WCDMA), Long Term Evolution (LTE), e-mail, Short Messaging Service (SMS), and the like.

The memory 520 may be configured to store a software program and module. The processor 580 runs the software program and module stored in the memory 520, to implement various functional applications and data processing of the unmanned aerial vehicle. The memory 520 may mainly include a program storage area and a data storage area. The program storage area may store an operating system, an application program required by at least one function (such as a sound playback function and an image display function), and the like. The data storage area may store data (such as audio data and a phonebook) created according to use of the unmanned aerial vehicle, and the like. In addition, the memory 520 may include a high speed random access memory, and may also include a non-volatile memory, such as at least one magnetic disk storage device, a flash memory, or another volatile solid-state storage device.

The input unit 530 may be configured to receive inputted digit or character information, and generate a keyboard signal input related to the user setting and function control of the unmanned aerial vehicle. In an example, the input unit 530 may include a touch panel 531 and another input device 532. The touch panel 531 may also be referred to as a touch screen, and may collect a touch operation of a user on or near the touch panel (such as an operation of a user on or near the touch panel 531 by using any suitable object or attachment, such as a finger or a touch pen), and drive a corresponding connection apparatus according to a preset program. In a possible implementation, the touch panel 531 may include two parts: a touch detection apparatus and a touch controller. The touch detection apparatus detects a touch position of the user, detects a signal generated by the touch operation, and transfers the signal to the touch controller. The touch controller receives the touch information from the touch detection apparatus, converts the touch information into touch point coordinates, and sends the touch point coordinates to the processor 580. Moreover, the touch controller can receive and execute a command sent from the processor 580. In addition, the touch panel 531 may be a resistive, capacitive, infrared, or surface sound wave type touch panel. In addition to the touch panel 531, the input unit 530 may further include the another input device 532. For example, the another input device 532 may include, but is not limited to, one or more of a physical keyboard, a functional key (such as a volume control key or a switch key), a track ball, a mouse, and a joystick.

The display unit 540 may be configured to display information input by the user or information provided for the user, and various menus of the unmanned aerial vehicle. The display unit 540 may include a display panel 541. In some possible implementations, the display panel 541 may be configured by using a liquid crystal display (LCD), an organic light-emitting diode (OLED), or the like. Besides, the touch panel 531 may cover the display panel 541. After detecting a touch operation on or near the touch panel 531, the touch panel 531 transfers the touch operation to the processor 580, so as to determine a type of a touch event. Then, the processor 580 provides corresponding visual output on the display panel 541 according to the type of the touch event. Although, in FIG. 13, the touch panel 531 and the display panel 541 are used as two separate parts to implement input and output functions of the mobile phone, in some embodiments, the touch panel 531 and the display panel 541 may be integrated to implement the input and output functions of the mobile phone.

The unmanned aerial vehicle may further include at least one sensor 550 such as an optical sensor, a motion sensor, and other sensors. In an example, the optical sensor may include an ambient light sensor and a proximity sensor. The ambient light sensor may adjust luminance of the display panel 541 according to brightness of the ambient light. The proximity sensor may switch off the display panel 541 and/or backlight when the unmanned aerial vehicle is moved to a bright area. As one type of motion sensor, an acceleration sensor may detect magnitude of accelerations in various directions (generally on three axes), may detect magnitude and a direction of the gravity when static, and may be applied to an application that recognizes the attitude of the unmanned aerial vehicle (for example, switching between landscape orientation and portrait orientation), a related game, and magnetometer attitude calibration), a function related to vibration recognition (such as a pedometer and a knock), and the like. Other sensors such as a gyroscope, a barometer, a hygrometer, a thermometer, and an infrared sensor, which may be configured in the mobile phone, are not further described herein.

The audio circuit 560, a loudspeaker 561, and a microphone 562 may provide audio interfaces between the user and the unmanned aerial vehicle. The audio circuit 560 may convert received audio data into an electric signal and transmit the electric signal to the loudspeaker 561. The loudspeaker 561 converts the electric signal into a sound signal for output. On the other hand, the microphone 562 converts a collected sound signal into an electric signal. The audio circuit 560 receives the electric signal and converts the electric signal into audio data, and outputs the audio data to the processor 580 for processing. Then, the processor 880 sends the audio data to, for example, another mobile phone by using the RF circuit 510, or outputs the audio data to the memory 520 for further processing.

The WiFi is based on a short distance wireless transmission technology. The unmanned aerial vehicle may help, by using the WiFi module 570, the user to receive and send e-mails, browse a webpage, access streaming media, and so on, which provides wireless broadband Internet access for the user. Although FIG. 13 shows the WiFi module 570, it may be understood that the WiFi module 870 is not a necessary component of the mobile phone, and when required, the WiFi module 870 may be omitted as long as the scope of the essence of the present disclosure is not changed.

The processor 580 is the control center of the unmanned aerial vehicle, and is connected to various parts of the unmanned aerial vehicle by using various interfaces and lines. By running or executing the software program and/or module stored in the memory 520, and invoking data stored in the memory 520, the processor 880 performs various functions and data processing of the unmanned aerial vehicle, thereby performing overall monitoring on the unmanned aerial vehicle. In an example, the processor 580 may include one or more processing units. For example, the processor 580 may integrate an application processor and a modem. The application processor mainly processes an operating system, a user interface, an application program, and the like. The modem mainly processes wireless communication. It may be understood that the foregoing modem processor may also not be integrated into the processor 580.

The unmanned aerial vehicle further includes the power supply 590 (such as a battery) for supplying power to the components. Preferably, the power supply may be logically connected to the processor 580 by using a power management system, thereby implementing functions such as charging, discharging and power consumption management by using the power management system.

Although not shown, the unmanned aerial vehicle may further include a camera, a Bluetooth module, and the like, which are not further described herein.

In this embodiment of the present disclosure, the processor 580 included in the terminal further has functions corresponding to the aircraft obstacle detection method and/or the flight positioning information obtaining method and/or the flight height information obtaining method.

A person skilled in the art may clearly know that for ease of convenient and brief description, for specific working processes of the systems, the apparatuses, and units described above, refer to corresponding processes in the foregoing method embodiments. Details are not described herein again.

In the several embodiments provided in the present application, it should be understood that the disclosed system, apparatus, and method may be implemented in other manners. For example, the described apparatus embodiments are merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and the parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the present disclosure may be integrated into one processing unit, or each of the units may exist alone physically, or two or more units may be integrated into one unit. The integrated unit may be implemented in a form of hardware, or may be implemented in a form of a software functional unit.

If implemented in the form of software functional modules and sold or used as an independent product, the integrated units may also be stored in a computer-readable storage medium. Based on such an understanding, the technical solutions of the present disclosure essentially, or the part contributing to the existing technology, or some or all of the technical solutions may be implemented in a form of a software product. The computer software product is stored in a storage medium and includes several instructions for instructing a computer device (which may be a personal computer, a server, a network device, or the like) to perform all or some steps of the methods described in the embodiments of the present disclosure. The foregoing storage medium includes: various mediums that can store program code, such as a USB flash drive, a removable hard disk, a read-only memory (ROM), a random access memory (RAM), a magnetic disk, or an optical disc.

The foregoing embodiments are merely intended for describing the technical solutions of the present disclosure, but not for limiting the present disclosure. Although the present disclosure is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of the embodiments of the present disclosure.

What is claimed is:

1. An aircraft obstacle detection method performed at a computing device having one or more processors and memory storing programs to be executed by the one or more processors, the method comprising:
    performing real-time image collection on a target obstacle by using a binocular camera equipped on an aircraft, to obtain a first image and a second image, wherein the first image is shot by a left eye of the binocular camera, and the second image is shot by a right eye of the binocular camera;
    determining a first pixel location obtained by projecting the target obstacle in the first image, and a second pixel location obtained by projecting the target obstacle in the second image, and calculating a disparity between the first pixel location and the second pixel location according to the first pixel location and the second pixel location;
    calculating a depth value between the binocular camera and the target obstacle according to the disparity between the first pixel location and the second pixel location, and a preset disparity-to-depth mapping matrix, to detect whether a flight direction of the aircraft is blocked by an obstacle; and
    sending the depth value between the binocular camera and the target obstacle to a flight control module of the aircraft, so that the flight control module determines, according to the depth value between the binocular camera and the target obstacle, whether the flight direction of the aircraft is blocked by an obstacle.

2. The method according to claim 1, further comprising:
    after performing real-time image collection on a target obstacle by using a binocular camera equipped on an aircraft, to obtain a first image and a second image:
        performing scaling processing and tailoring processing on the first image and the second image separately; and
        converting the processed first image and the processed second image to a first greyscale image and a second greyscale image separately, and performing equalization processing on the first greyscale image and the second greyscale image separately; and
    wherein the operation of determining a first pixel location obtained by projecting the target obstacle in the first image, and a second pixel location obtained by projecting the target obstacle in the second image further comprises:
        determining the projected first pixel location of the target obstacle in the first greyscale image on which equalization processing has been performed, and determining the projected second image location of the target obstacle in the second greyscale image on which equalization processing has been performed.

3. The method according to claim 1, further comprising:
    after performing real-time image collection on a target obstacle by using a binocular camera equipped on an aircraft, to obtain a first image and a second image:
        obtaining intrinsic parameter information and extrinsic parameter information of the binocular camera, wherein the intrinsic parameter information comprises: a radial distortion parameter and a tangential distortion parameter of the left eye, and a radial distortion parameter and a tangential distortion parameter of the right eye, and the extrinsic parameter information comprises: a rotation matrix and an offset matrix of the left eye and the right eye of the binocular camera;
        performing distortion compensation on the first image and the second image separately according to the intrinsic parameter information, to obtain the first image on which distortion compensation has been performed and the second image on which distortion compensation has been performed; and
        performing, in a same horizontal plane according to the extrinsic parameter information, image correction processing on the first image on which distortion compensation has been performed and the second image on which distortion compensation has been performed.

4. The method according to claim 1, wherein the operation of determining a first pixel location obtained by projecting the target obstacle in the first image, and a second pixel location obtained by projecting the target obstacle in the second image further comprises:

determining an image selection window according to an aircraft body size image formed by the aircraft in the binocular camera, wherein a total pixel value of the image selection window is greater than a total pixel value of the aircraft body size image, and is less than a total pixel value of the first image and less than a total pixel value of the second image;

selecting a first sub-image and a second sub-image corresponding to the image selection window separately from the first image and the second image by using the image selection window; and performing, by using a semi-global block matching SGBM algorithm, image point matching on the target obstacle shot in the first sub-image and the second sub-image separately, and determining, by using a successfully matched image point, a first pixel location obtained by projecting the target obstacle in the first sub-image, and a second pixel location obtained by projecting the target obstacle in the second sub-image.

5. The method according to claim 4, wherein the operation of calculating a depth value between the binocular camera and the target obstacle according to the disparity between the first pixel location and the second pixel location, and a preset disparity-to-depth mapping matrix further comprises:

separately calculating depth values of all pixels corresponding to the image selection window according to a disparity between the first pixel location and the second pixel location, and the preset disparity-to-depth mapping matrix;

dividing the image selection window into multiple image sub-windows, and separately calculating a depth value of each image sub-window according to the depth values of all the pixels corresponding to the image selection window; and selecting an image sub-window with a minimum depth value according to the depth value of each image sub-window, and determining the depth value of the image sub-window with the minimum depth value as the depth value between the binocular camera and the target obstacle.

6. The method according to claim 5, further comprising:

after determining the depth value of the image sub-window with the minimum depth value as the depth value between the binocular camera and the target obstacle:

sending the depth value of each image sub-window to the flight control module of the aircraft, so that the flight control module selects an obstacle avoiding direction according to the depth value of each image sub-window and then adjusts a flight posture of the aircraft.

7. A computing device for aircraft obstacle detection, comprising:

one or more processors;

memory coupled to the one or more processors; and a plurality of programs stored in the memory that, when executed by the one or more processors, cause the computing device to perform a plurality of operations including:

performing real-time image collection on a target obstacle by using a binocular camera equipped on an aircraft, to obtain a first image and a second image, wherein the first image is shot by a left eye of the binocular camera, and the second image is shot by a right eye of the binocular camera;

determining a first pixel location obtained by projecting the target obstacle in the first image, and a second pixel location obtained by projecting the target obstacle in the second image, and calculating a disparity between the first pixel location and the second pixel location according to the first pixel location and the second pixel location;

calculating a depth value between the binocular camera and the target obstacle according to the disparity between the first pixel location and the second pixel location, and a preset disparity-to-depth mapping matrix, to detect whether a flight direction of the aircraft is blocked by an obstacle; and sending the depth value between the binocular camera and the target obstacle to a flight control module of the aircraft, so that the flight control module determines, according to the depth value between the binocular camera and the target obstacle, whether the flight direction of the aircraft is blocked by an obstacle.

8. The computing device according to claim 7, wherein the plurality of operations further comprise:

after performing real-time image collection on a target obstacle by using a binocular camera equipped on an aircraft, to obtain a first image and a second image:

performing scaling processing and tailoring processing on the first image and the second image separately; and converting the processed first image and the processed second image to a first greyscale image and a second greyscale image separately, and performing equalization processing on the first greyscale image and the second greyscale image separately; and wherein the operation of determining a first pixel location obtained by projecting the target obstacle in the first image, and a second pixel location obtained by projecting the target obstacle in the second image further comprises:

determining the projected first pixel location of the target obstacle in the first greyscale image on which equalization processing has been performed, and determining the projected second image location of the target obstacle in the second greyscale image on which equalization processing has been performed.

9. The computing device according to claim 7, wherein the plurality of operations further comprise:

after performing real-time image collection on a target obstacle by using a binocular camera equipped on an aircraft, to obtain a first image and a second image:

obtaining intrinsic parameter information and extrinsic parameter information of the binocular camera, wherein the intrinsic parameter information comprises: a radial distortion parameter and a tangential distortion parameter of the left eye, and a radial distortion parameter and a tangential distortion parameter of the right eye, and the extrinsic parameter information comprises: a rotation matrix and an offset matrix of the left eye and the right eye of the binocular camera;

performing distortion compensation on the first image and the second image separately according to the intrinsic parameter information, to obtain the first image on which distortion compensation has been performed and the second image on which distortion compensation has been performed; and performing, in a same horizontal plane according to the extrinsic parameter information, image correction processing on the first image on which distortion compensation has been performed and the second image on which distortion compensation has been performed.

10. The computing device according to claim 7, wherein the operation of determining a first pixel location obtained by projecting the target obstacle in the first image, and a second pixel location obtained by projecting the target obstacle in the second image further comprises:
  determining an image selection window according to an aircraft body size image formed by the aircraft in the binocular camera, wherein a total pixel value of the image selection window is greater than a total pixel value of the aircraft body size image, and is less than a total pixel value of the first image and less than a total pixel value of the second image;
  selecting a first sub-image and a second sub-image corresponding to the image selection window separately from the first image and the second image by using the image selection window; and
  performing, by using a semi-global block matching SGBM algorithm, image point matching on the target obstacle shot in the first sub-image and the second sub-image separately, and determining, by using a successfully matched image point, a first pixel location obtained by projecting the target obstacle in the first sub-image, and a second pixel location obtained by projecting the target obstacle in the second sub-image.

11. The computing device according to claim 10, wherein the operation of calculating a depth value between the binocular camera and the target obstacle according to the disparity between the first pixel location and the second pixel location, and a preset disparity-to-depth mapping matrix further comprises:
  separately calculating depth values of all pixels corresponding to the image selection window according to a disparity between the first pixel location and the second pixel location, and the preset disparity-to-depth mapping matrix;
  dividing the image selection window into multiple image sub-windows, and separately calculating a depth value of each image sub-window according to the depth values of all the pixels corresponding to the image selection window; and
  selecting an image sub-window with a minimum depth value according to the depth value of each image sub-window, and determining the depth value of the image sub-window with the minimum depth value as the depth value between the binocular camera and the target obstacle.

12. The computing device according to claim 11, wherein the plurality of operations further comprise:
  after determining the depth value of the image sub-window with the minimum depth value as the depth value between the binocular camera and the target obstacle:
    sending the depth value of each image sub-window to the flight control module of the aircraft, so that the flight control module selects an obstacle avoiding direction according to the depth value of each image sub-window and then adjusts a flight posture of the aircraft.

13. A non-transitory computer readable storage medium storing a plurality of instructions in connection with a computing device having one or more processors for aircraft obstacle detection, wherein the plurality of instructions, when executed by the one or more processors, cause the computing device to perform a plurality of operations including:
  performing real-time image collection on a target obstacle by using a binocular camera equipped on an aircraft, to obtain a first image and a second image, wherein the first image is shot by a left eye of the binocular camera, and the second image is shot by a right eye of the binocular camera;
  determining a first pixel location obtained by projecting the target obstacle in the first image, and a second pixel location obtained by projecting the target obstacle in the second image, and calculating a disparity between the first pixel location and the second pixel location according to the first pixel location and the second pixel location;
  calculating a depth value between the binocular camera and the target obstacle according to the disparity between the first pixel location and the second pixel location, and a preset disparity-to-depth mapping matrix, to detect whether a flight direction of the aircraft is blocked by an obstacle; and
  sending the depth value between the binocular camera and the target obstacle to a flight control module of the aircraft, so that the flight control module determines, according to the depth value between the binocular camera and the target obstacle, whether the flight direction of the aircraft is blocked by an obstacle.

14. The non-transitory computer readable storage medium according to claim 13, wherein the plurality of operations further comprise:
  after performing real-time image collection on a target obstacle by using a binocular camera equipped on an aircraft, to obtain a first image and a second image:
    performing scaling processing and tailoring processing on the first image and the second image separately; and
    converting the processed first image and the processed second image to a first greyscale image and a second greyscale image separately, and performing equalization processing on the first greyscale image and the second greyscale image separately; and
  wherein the operation of determining a first pixel location obtained by projecting the target obstacle in the first image, and a second pixel location obtained by projecting the target obstacle in the second image further comprises:
    determining the projected first pixel location of the target obstacle in the first greyscale image on which equalization processing has been performed, and determining the projected second image location of the target obstacle in the second greyscale image on which equalization processing has been performed.

15. The non-transitory computer readable storage medium according to claim 13, wherein the plurality of operations further comprise:
  after performing real-time image collection on a target obstacle by using a binocular camera equipped on an aircraft, to obtain a first image and a second image:
    obtaining intrinsic parameter information and extrinsic parameter information of the binocular camera, wherein the intrinsic parameter information comprises: a radial distortion parameter and a tangential distortion parameter of the left eye, and a radial distortion parameter and a tangential distortion parameter of the right eye, and the extrinsic parameter information comprises: a rotation matrix and an offset matrix of the left eye and the right eye of the binocular camera;

performing distortion compensation on the first image and the second image separately according to the intrinsic parameter information, to obtain the first image on which distortion compensation has been performed and the second image on which distortion compensation has been performed; and performing, in a same horizontal plane according to the extrinsic parameter information, image correction processing on the first image on which distortion compensation has been performed and the second image on which distortion compensation has been performed.

16. The non-transitory computer readable storage medium according to claim 13, wherein the operation of determining a first pixel location obtained by projecting the target obstacle in the first image, and a second pixel location obtained by projecting the target obstacle in the second image further comprises:

determining an image selection window according to an aircraft body size image formed by the aircraft in the binocular camera, wherein a total pixel value of the image selection window is greater than a total pixel value of the aircraft body size image, and is less than a total pixel value of the first image and less than a total pixel value of the second image;

selecting a first sub-image and a second sub-image corresponding to the image selection window separately from the first image and the second image by using the image selection window; and performing, by using a semi-global block matching SGBM algorithm, image point matching on the target obstacle shot in the first sub-image and the second sub-image separately, and determining, by using a successfully matched image point, a first pixel location obtained by projecting the target obstacle in the first sub-image, and a second pixel location obtained by projecting the target obstacle in the second sub-image.

17. The non-transitory computer readable storage medium according to claim 16, wherein the operation of calculating a depth value between the binocular camera and the target obstacle according to the disparity between the first pixel location and the second pixel location, and a preset disparity-to-depth mapping matrix further comprises:

separately calculating depth values of all pixels corresponding to the image selection window according to a disparity between the first pixel location and the second pixel location, and the preset disparity-to-depth mapping matrix;

dividing the image selection window into multiple image sub-windows, and separately calculating a depth value of each image sub-window according to the depth values of all the pixels corresponding to the image selection window; and selecting an image sub-window with a minimum depth value according to the depth value of each image sub-window, and determining the depth value of the image sub-window with the minimum depth value as the depth value between the binocular camera and the target obstacle.

* * * * *